United States Patent
Sakamoto et al.

(10) Patent No.: US 9,144,095 B2
(45) Date of Patent: Sep. 22, 2015

(54) WIRELESS COMMUNICATION TERMINAL, WIRELESS COMMUNICATION METHOD, AND COMPUTER PROGRAM PRODUCT

(71) Applicant: OLYMPUS CORPORATION, Tokyo (JP)

(72) Inventors: Akihiko Sakamoto, Sagamihara (JP); Kazuyuki Shibuya, Sagamiharai (JP)

(73) Assignee: OLYMPUS CORPORATION, Tokyo (JP)

( * ) Notice: Subject to any disclaimer, the term of this patent is extended or adjusted under 35 U.S.C. 154(b) by 96 days.

(21) Appl. No.: 14/038,081

(22) Filed: Sep. 26, 2013

(65) Prior Publication Data

US 2014/0106804 A1    Apr. 17, 2014

(30) Foreign Application Priority Data

Oct. 16, 2012 (JP) ................. 2012-228878

(51) Int. Cl.
- *H04W 76/02* (2009.01)
- *H04W 74/08* (2009.01)
- *H04W 74/00* (2009.01)

(52) U.S. Cl.
CPC .............. *H04W 76/02* (2013.01); *H04W 74/08* (2013.01); *H04W 74/002* (2013.01)

(58) Field of Classification Search
CPC .... H04W 74/002; H04W 74/08; H04W 76/02
See application file for complete search history.

(56) References Cited

U.S. PATENT DOCUMENTS

| | | | | |
|---|---|---|---|---|
| 7,822,422 B2* | 10/2010 | Tatara | ............................ | 455/453 |
| 2003/0117984 A1* | 6/2003 | Gavette | ......................... | 370/338 |
| 2004/0039817 A1* | 2/2004 | Lee et al. | ....................... | 709/225 |
| 2004/0095911 A1* | 5/2004 | Benveniste et al. | ........... | 370/338 |
| 2005/0239474 A9* | 10/2005 | Liang | ............................ | 455/454 |

FOREIGN PATENT DOCUMENTS

JP        2005-020656 A      1/2005

* cited by examiner

*Primary Examiner* — Bobbak Safaipour
(74) *Attorney, Agent, or Firm* — Westerman, Hattori, Daniels & Adrian, LLP

(57) ABSTRACT

A wireless communication terminal including a wireless communication unit which performs wireless communication of streaming data for use in streaming of content and control data for use in control of the streaming and a network construction unit which performs one of a first connection process of acquiring format information of streaming data that another wireless communication terminal supports and a second connection process in which no format information is acquired when a wireless network is constructed, a connection request from the other wireless communication terminal for the constructed wireless network is received by the wireless communication unit, and a connection to the other wireless communication terminal is made.

17 Claims, 28 Drawing Sheets

FIG. 11A
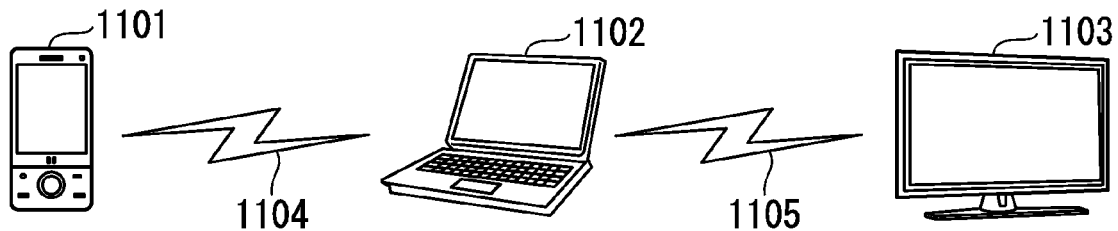
FIG. 11B
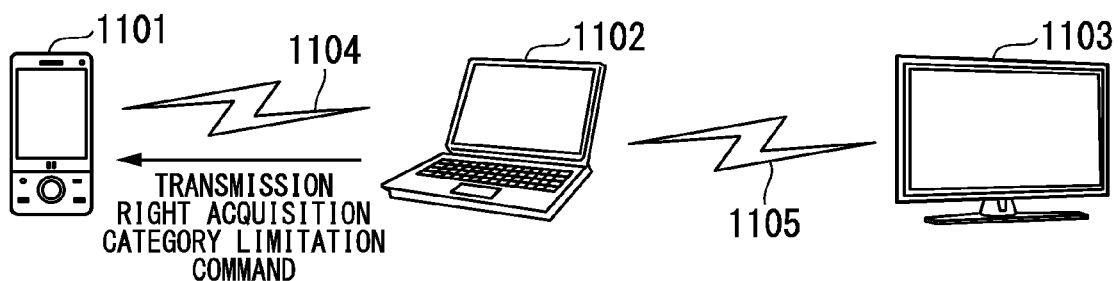
FIG. 11C
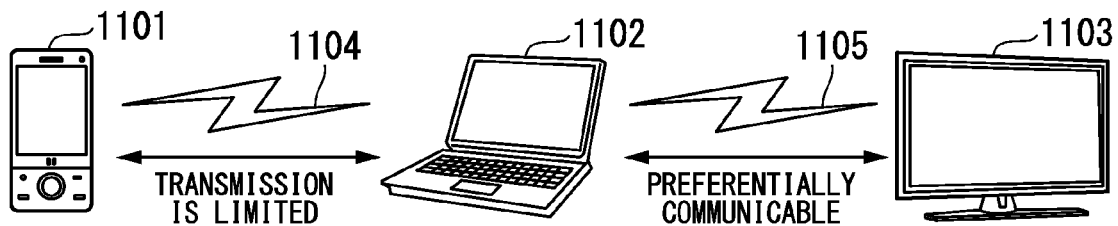
FIG. 12
| CATEGORY NAME | PRIORITY | AIFS | CW | TXOP |
|---|---|---|---|---|
| Voice | 1 | 2 | 3〜7 | 3264 |
| Video | 2 | 2 | 7〜15 | 6016 |
| Best Effort | 3 | 3 | 15〜1023 | 0 |
| Back Ground | 4 | 7 | 15〜1023 | 0 |

FIG. 15A
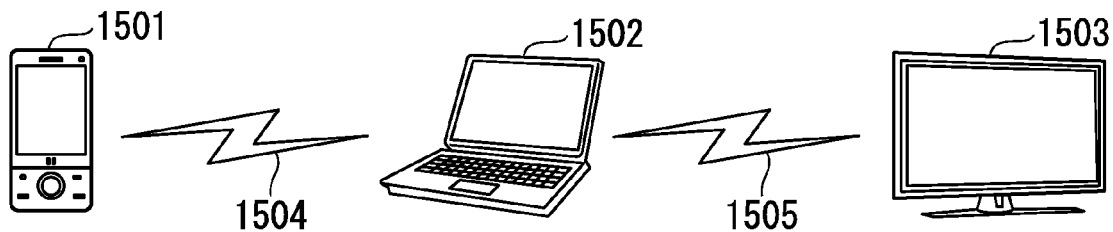
FIG. 15B
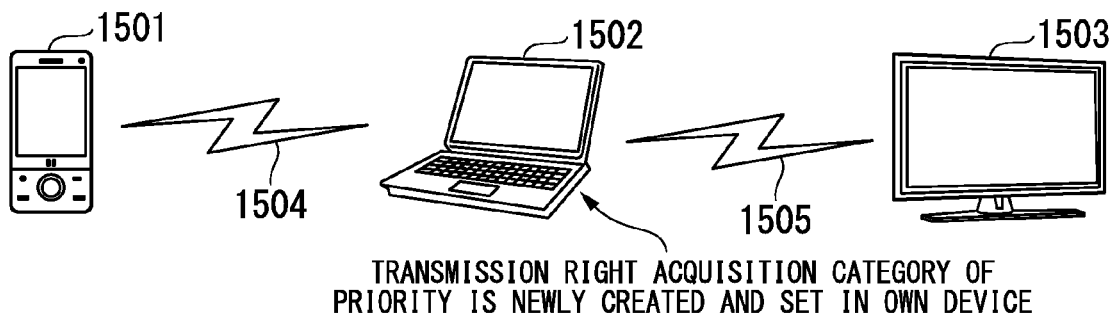
TRANSMISSION RIGHT ACQUISITION CATEGORY OF PRIORITY IS NEWLY CREATED AND SET IN OWN DEVICE
FIG. 15C
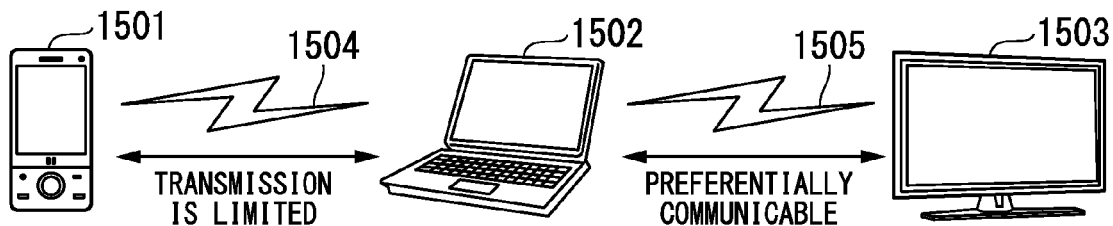
FIG. 16
| CATEGORY NAME | PRIORITY | AIFS | CW | TXOP |
|---|---|---|---|---|
| Best Priority | 1 | 1 | 1~3 | 6016 |
| Voice | 2 | 1 | 3~7 | 3264 |
| Video | 3 | 1 | 7~15 | 6016 |
| Best Effort | 4 | 3 | 15~1023 | 0 |
| Back Ground | 5 | 7 | 15~1023 | 0 |

WIRELESS COMMUNICATION TERMINAL, WIRELESS COMMUNICATION METHOD, AND COMPUTER PROGRAM PRODUCT

BACKGROUND OF THE INVENTION

Field of the Invention

The present invention relates to technology for performing wireless communication of streaming data for use in streaming of content of a video, audio, or the like.

Priority is claimed on Japanese Patent Application No. 2012-228878, filed Oct. 16, 2012, the content of which is incorporated herein by reference.

A wireless communication system, which preferentially transmits data by shortening a retransmission start time after a carrier is busy for a terminal that performs communication in a communication protocol with high real time property, is disclosed in Japanese Unexamined Patent Application, First Publication No. 2005-20656. The wireless communication system disclosed in Japanese Unexamined Patent Application, First Publication No. 2005-20656 is a wireless communication system in which information in which a communication protocol and a reconnection request time setting window value are associated is set by a management system in a base station and the base station can preferentially transmit data to a terminal that performs communication in a communication protocol requiring a real time property by setting the reconnection request time setting window value in each terminal according to a used communication protocol.

SUMMARY OF THE INVENTION

According to a first aspect of the present invention, a wireless communication terminal is provided, including: a wireless communication unit which performs wireless communication of streaming data for use in streaming of content and control data for use in control of the streaming; a network construction unit which performs one of a first connection process of acquiring format information of streaming data corresponding to another wireless communication terminal and a second connection process in which no format information is acquired when a wireless network is constructed, a connection request from the other wireless communication terminal for the constructed wireless network is received by the wireless communication unit, and a connection to the other wireless communication terminal is made; and a communication control unit which sets a communication parameter in which a probability of acquiring a right to transmit at a data link level of the wireless communication is higher in its own wireless communication terminal than in a second connection terminal in the wireless communication unit or to cause control data to be transmitted from the wireless communication unit to the second connection terminal, wherein the control data is used to cause the second connection terminal to set a communication parameter in which the probability is lower in the second connection terminal than in its own wireless communication terminal when the first connection process is performed by designating a first connection terminal as an object to be connected and the second connection process is performed by designating the second connection terminal as an object to be connected.

According to a second aspect of the present invention, a wireless communication method is provided for use in a wireless communication terminal for constructing a wireless network and performing wireless communication of streaming data for use in streaming of content and control data for use in control of the streaming, the wireless communication method including: performing a first connection process of establishing a connection to a first connection terminal by acquiring format information of streaming data corresponding to the first connection terminal after a connection request from the first connection terminal for the wireless network has been received by a wireless communication unit; performing a second connection process of establishing a connection to a second connection terminal without acquiring the format information after a connection request from the second connection terminal for the wireless network has been received by the wireless communication unit; and setting a communication parameter in which a probability of acquiring a right to transmit at a data link level of the wireless communication is higher in the wireless communication terminal than in a second connection terminal in the wireless communication unit or causing control data to be transmitted from the wireless communication unit to the second connection terminal, wherein the control data is used to cause the second connection terminal to set a communication parameter in which the probability is lower in the second connection terminal than in the wireless communication terminal.

According to a third aspect of the present invention, a computer program product is provided, embodied on a computer readable device, for causing a computer of a wireless communication terminal for constructing a wireless network and performing wireless communication of streaming data for use in streaming of content and control data for use in control of the streaming to execute: performing a first connection process of establishing a connection to a first connection terminal by acquiring format information of streaming data corresponding to the first connection terminal after a connection request from a first connection terminal for the wireless network has been received by a wireless communication unit; performing a second connection process of establishing a connection to a second connection terminal without acquiring the format information after a connection request from the second connection terminal for the wireless network has been received by the wireless communication unit; and setting a communication parameter in which a probability of acquiring a right to transmit at a data link level of the wireless communication is higher in the wireless communication terminal than in a second connection terminal in the wireless communication unit or causing control data to be transmitted from the wireless communication unit to the second connection terminal, wherein the control data is used to cause the second connection terminal to set a communication parameter in which the probability is lower in the second connection terminal than in the wireless communication terminal.

BRIEF DESCRIPTION OF THE DRAWINGS

FIG. 11A is a reference diagram each illustrating a communication state in a system according to a second embodiment of the present invention.

FIG. 11B is a reference diagram each illustrating a communication state in a system according to the second embodiment of the present invention.

FIG. 11C is a reference diagram each illustrating a communication state in a system according to the second embodiment of the present invention.

FIG. 12 is a reference diagram illustrating a transmission right acquisition category in the second embodiment of the present invention.

FIG. 15A is a reference diagram each illustrating a communication state in a system according to a third embodiment of the present invention.

FIG. 15B is a reference diagram each illustrating a communication state in a system according to the third embodiment of the present invention.

FIG. 15C is a reference diagram each illustrating a communication state in a system according to the third embodiment of the present invention.

FIG. 16 is a reference diagram illustrating a transmission right acquisition category in the third embodiment of the present invention.

DETAILED DESCRIPTION OF THE INVENTION

Figure 1A:
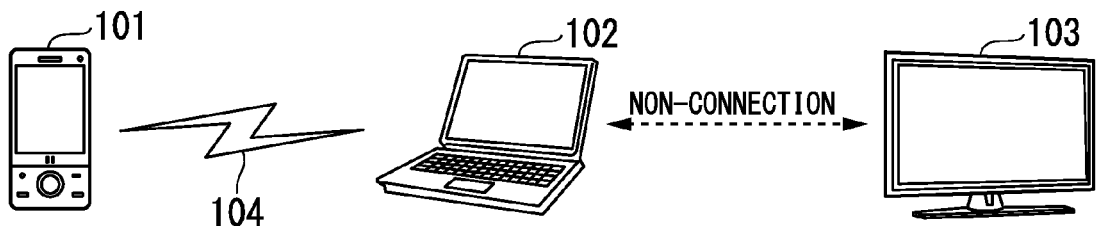
FIG. 1A is a reference diagram each illustrating a state of communication in a system according to a first embodiment of the present invention.

Hereinafter, embodiments of the present invention will be described with reference to the drawings. Based on the disclosure herein, it is apparent to those of ordinary skill in the art that the following description of the embodiments of the present invention is provided only for the purpose of illustrating the invention as defined by the appended claims and their equivalents in detail and not for the purpose of limiting them.

Hereinafter, a system, which preferentially performs wireless communication of streaming data using streaming of content, will be described in each embodiment. The streaming data is data including one or both of video and audio.

First Embodiment

First, the first embodiment of the present invention will be described. FIGS. 1A to 1E illustrate examples of a dedicated video transmission path priority system in which communication between an external terminal 101 and a video transmission terminal 102 is limited and communication between the video transmission terminal 102 and a video reception terminal 103 is preferentially performed when the video transmission terminal 102 has already been connected to the external terminal 101 in a transmission path (hereinafter referred to as dedicated non-video transmission path) 104 not dedicated for video at a timing at which the video transmission terminal 102 that wirelessly transmits video and the video reception terminal 103 that receives and displays the video transmitted from the video transmission terminal 102 have been connected in a transmission path (hereinafter referred to as dedicated video transmission path) 105 dedicated for video.

In the examples illustrated in FIGS. 1A to 1E, wireless communication between the external terminal 101 and the video transmission terminal 102 and between the video transmission terminal 102 and the video reception terminal 103 is performed. The video transmission terminal 102 functions as an access point, and each of the external terminal 101 and the video reception terminal 103 functions as a station. The access point refers to a terminal which constructs a new network in which the station can participate, and the station refers to a terminal capable of joining the network constructed by the access point.

The examples illustrated in FIGS. 1A to 1E illustrate communication states of respective terminals when the video transmission terminal 102 and the video reception terminal 103 have established a connection in the dedicated video transmission path 105 in an environment in which the connection in the dedicated non-video transmission path 104 has been established in a network constructed by the video transmission terminal 102. In the examples illustrated in FIGS. 1A to 1E, a transmission right acquisition waiting time change command for changing a transmission right acquisition waiting time is transmitted from the video transmission terminal 102 to the external terminal 101 so that the transmission right acquisition waiting time is more than or equal to a transmission right acquisition waiting time of the video transmission terminal 102. The transmission right acquisition waiting time of the external terminal 101 is changed based on the transmission right acquisition waiting time change command, and hence an opportunity for the external terminal 101 to acquire the right to transmit is reduced and communication between the video transmission terminal 102 and the video reception terminal 103 has priority. That is, a probability of the video transmission terminal 102 acquiring the right to transmit is higher than a probability of the external terminal 101 acquiring the right to transmit. The acquisition of the right to transmit will be described later.

FIG. 1A illustrates a state in which, in a network constructed by the video transmission terminal 102, the external terminal 101 and the video transmission terminal 102 have established a connection in the dedicated non-video transmission path 104.

Figure 1B:
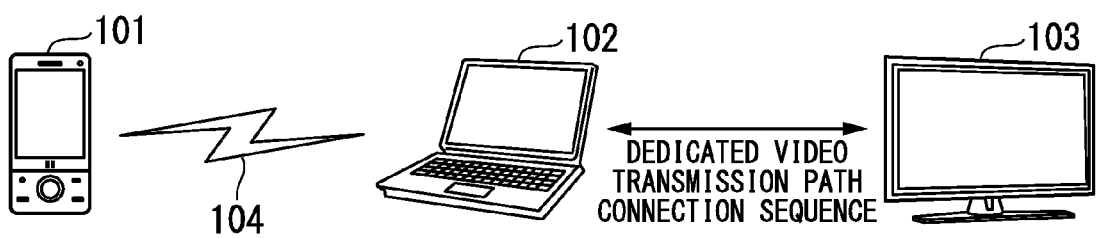
FIG. 1B is a reference diagram each illustrating a state of communication in a system according to the first embodiment of the present invention.

FIG. 1B illustrates a state in which, in a network constructed by the video transmission terminal 102, the external terminal 101 and the video transmission terminal 102 have established a connection in the dedicated non-video transmission path 104, and the video transmission terminal 102 and the video reception terminal 103 perform a connection sequence in the dedicated video transmission path 105.

Figure 1C:
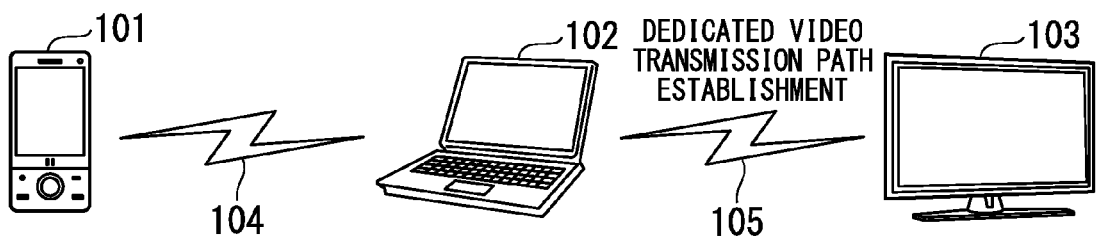
FIG. 1C is a reference diagram each illustrating a state of communication in a system according to the first embodiment of the present invention.

FIG. 1C illustrates a state in which, in a network constructed by the video transmission terminal 102, the external terminal 101 and the video transmission terminal 102 have established a connection in the dedicated non-video transmission path 104, and the video transmission terminal 102 and the video reception terminal 103 have established a connection in the dedicated video transmission path 105.

Figure 1D:
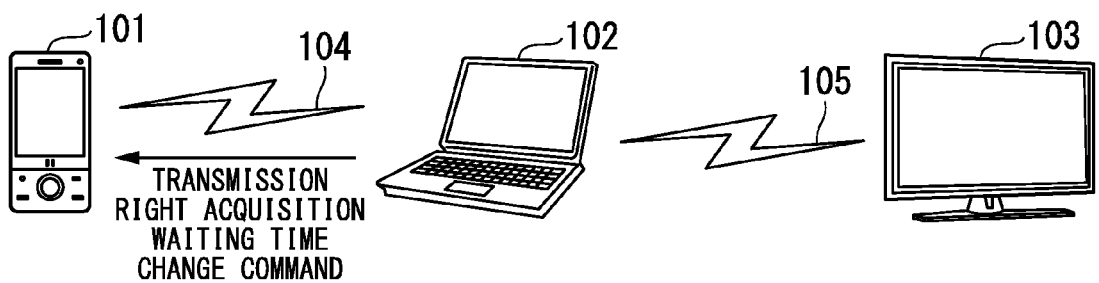
FIG. 1D is a reference diagram each illustrating a state of communication in a system according to the first embodiment of the present invention.

FIG. 1D illustrates a state in which, in a network constructed by the video transmission terminal 102, the external terminal 101 and the video transmission terminal 102 have established a connection in the dedicated non-video transmission path 104, the video transmission terminal 102 and the video reception terminal 103 have established a connection in the dedicated video transmission path 105, and a transmission right acquisition waiting time change command (control data) is transmitted from the video transmission terminal 102 to the external terminal 101.

Figure 1E:
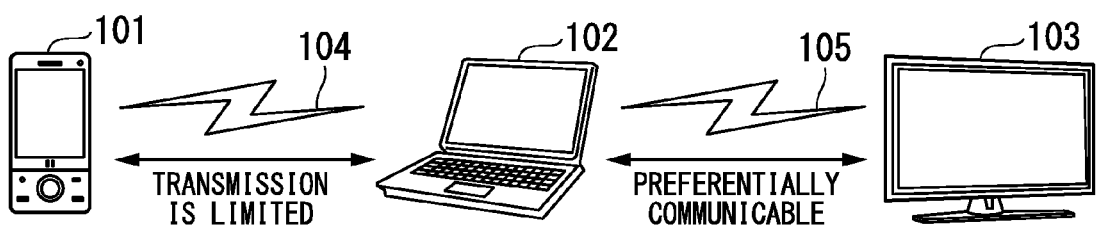
FIG. 1E is a reference diagram each illustrating a state of communication in a system according to the first embodiment of the present invention.

FIG. 1E illustrates a state in which, in a network constructed by the video transmission terminal 102, the external terminal 101 and the video transmission terminal 102 have established a connection in the dedicated non-video transmission path 104, the video transmission terminal 102 and the video reception terminal 103 have established a connection in the dedicated video transmission path 105, transmission is limited due to the reduction of an opportunity for the external terminal 101 to acquire the right to transmit, and communication between the video transmission terminal 102 and the video reception terminal 103 has priority.

Figure 2:
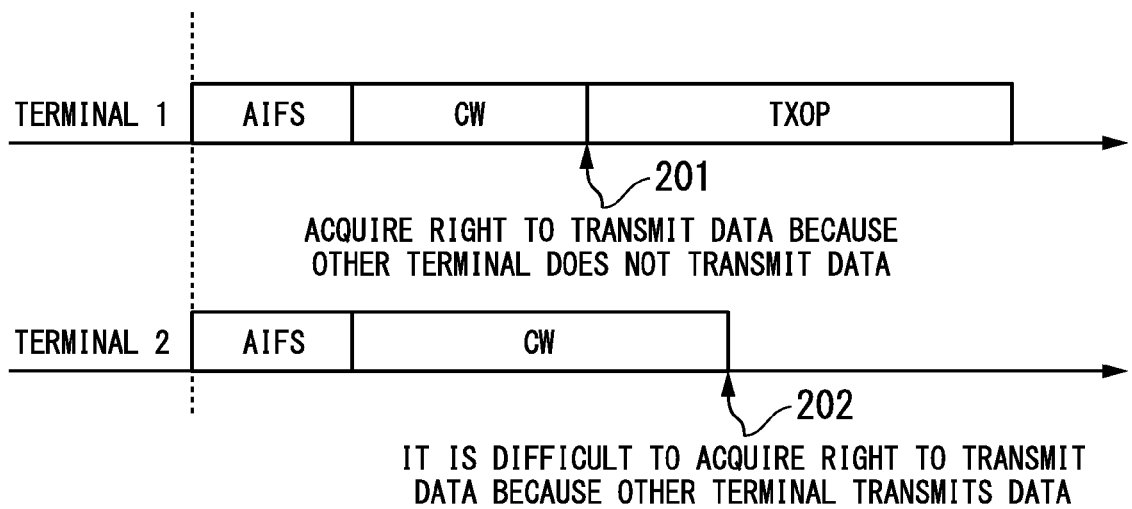
FIG. 2 is a reference diagram illustrating a state in which a terminal acquires the right to transmit in the first embodiment of the present invention.

The acquisition of the right to transmit will be described using FIG. 2. FIG. 2 is a state in which a terminal acquires the right to transmit. In FIG. 2, there are two terminals (terminals 1 and 2), and a horizontal direction represents the passage of time.

After a transmission right acquisition waiting time has elapsed, the right to transmit is acquired by a terminal when another terminal belonging to the same network does not perform data transmission. The terminal acquiring the right to transmit can transmit for only a prescribed transmission-enabled period (referred to as a transmission opportunity (TXOP)). The transmission right acquisition waiting time is a time determined by a frame transmission interval (referred to as an arbitration inter frame space (AIFS)) and a random number value (referred to as a contention window (CW)) of the number of slots waiting for transmission. Control of data transmission by the transmission right acquisition waiting time determined by the AIFS and the CW serves as transmission control of a data link level of wireless communication.

In FIG. 2, a terminal 1 of terminals 1 and 2 has a short transmission right acquisition waiting time (a sum of the AIFS and the CW in the drawing) and the terminal 1 has the right to transmit at a time point 201 at which the transmission right acquisition waiting time of the terminal 1 has ended.

Thereafter, at a time point 202 at which the transmission right acquisition waiting time of the terminal 2 has ended, it is difficult for the terminal 2 to have the right to transmit because the terminal 1 acquires the right to transmit and the terminal 1 has the transmission-enabled period (TXOP).

Figure 3:
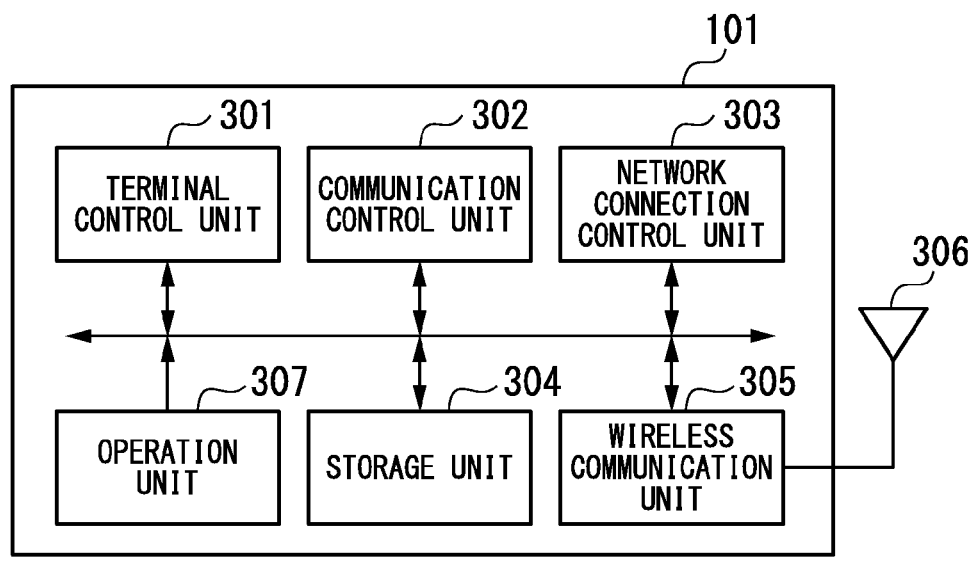
FIG. 3 is a block diagram illustrating a configuration of an external terminal in the first embodiment of the present invention.

FIG. 3 illustrates a configuration of the external terminal 101. The configuration of the external terminal 101 will be described using FIG. 3. The external terminal 101 includes a terminal control unit 301, a communication control unit 302, a network connection control unit 303, a storage unit 304, a wireless communication unit 305, an antenna 306, and an operation unit 307.

The terminal control unit 301 controls an operation of the external terminal 101. Based on a transmission right acquisition waiting time change command received from the video transmission terminal 102, the communication control unit 302 changes the transmission right acquisition waiting time of the external terminal 101, sets the changed transmission right acquisition waiting time in the wireless communication unit 305, and controls data transmission by way of the wireless communication unit 305 and the antenna 306. The network connection control unit 303 establishes a network connection in the dedicated non-video transmission path 104 by way of the wireless communication unit 305 and the antenna 306. The storage unit 304 stores initial values of the AIFS and the CW, which determine the transmission right acquisition waiting time, data to be transmitted, and the like. The wireless communication unit 305 and the antenna 306 wirelessly communicate with the video transmission terminal 102. The operation unit 307 is a user interface which receives an input based on an operation performed by the user.

Figure 4:
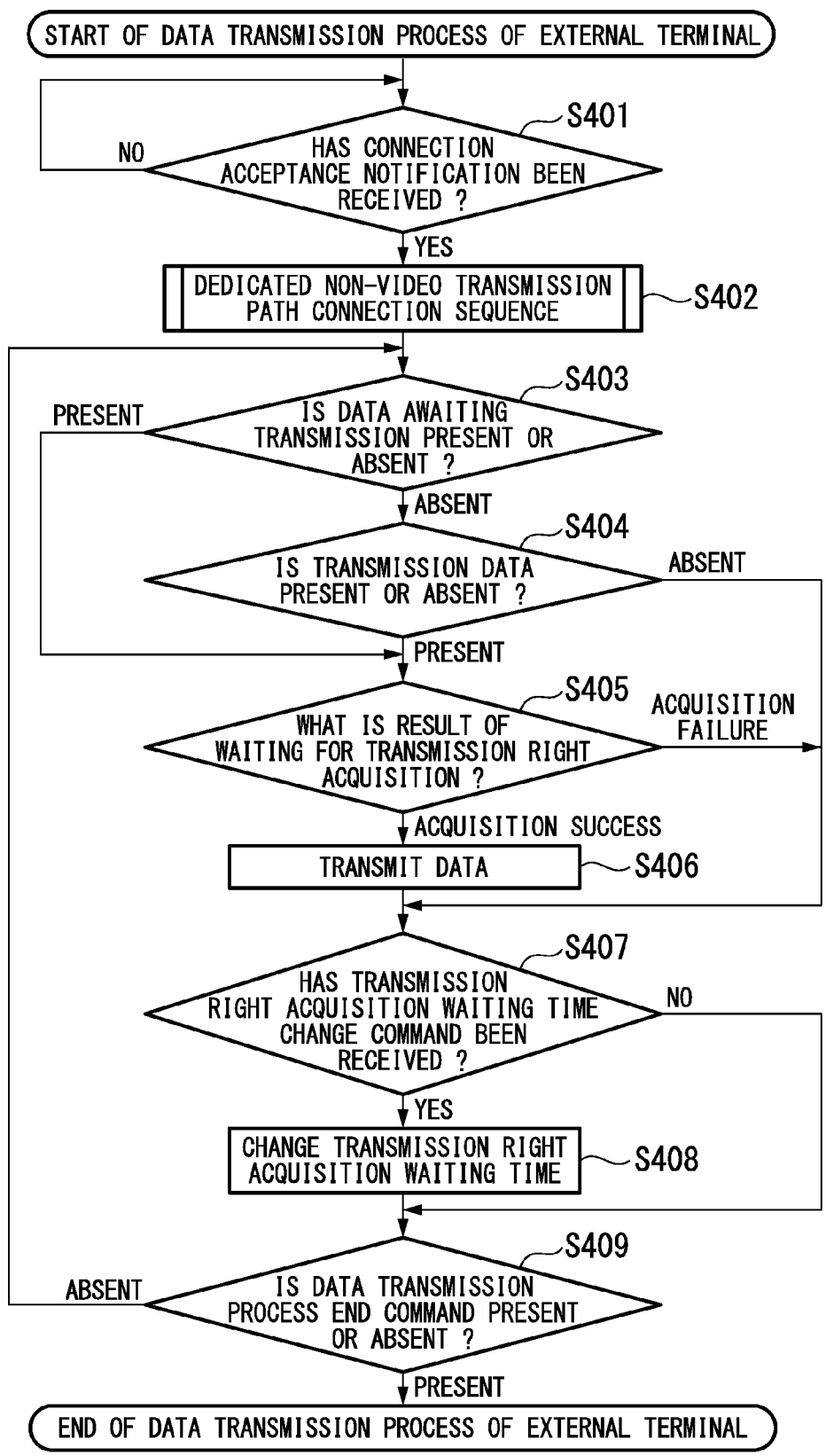
FIG. 4 is a flowchart illustrating a procedure of an operation of the external terminal in the first embodiment of the present invention.

FIG. 4 illustrates an operation of the external terminal 101. The operation of the external terminal 101 will be described using FIG. 4.

The terminal control unit 301 starts a data transmission process of the external terminal using the activation of power of the external terminal 101 through an operation of the operation unit 307 as a trigger.

Although the data transmission process of the external terminal in the first embodiment is a process to be started using the activation of power of the external terminal 101 as a trigger, the data transmission process may be started using an input of a start command for the data transmission process of the external terminal through the operation of the operation unit 307 as the trigger. A start condition of the data transmission process of the external terminal is not limited to only the activation of power to the external terminal 101 as long as the start condition does not depart from the scope of the present invention.

When the data transmission process of the external terminal is started, the terminal control unit 301 issues a connection acceptance notification reception command, which is a command for causing the connection acceptance notification reception process to be performed, to the wireless communication unit 305. Upon receiving the connection acceptance notification reception command, the wireless communication unit 305 searches for whether a connection acceptance notification has been transmitted from the video transmission terminal 102 by way of the antenna 306 (step S401). The wireless communication unit 305 issues a connection acceptance notification reception completion notification to the terminal control unit 301 after storing the received connection acceptance notification in the storage unit 304 when the connection acceptance notification has been transmitted, and researches for whether the connection acceptance notification has been transmitted after waiting for a fixed time when no connection acceptance notification has been transmitted.

Upon receiving the connection acceptance notification reception completion notification, the terminal control unit 301 issues a dedicated non-video transmission path connection start command, which is a command for causing a connection sequence in the dedicated non-video transmission path 104 to be started with the video transmission terminal 102, to the communication control unit 302. Upon receiving the dedicated non-video transmission path connection start command, the communication control unit 302 starts the connection sequence in the dedicated non-video transmission path 104 with the video transmission terminal 102, and issues a connection completion notification for providing a notification indicating that a connection of the dedicated non-video transmission path 104 has been completed to the terminal control unit 301 after the connection has been completed (step S402). Also, the connection sequence of the dedicated non-video transmission path 104 will be described later.

Upon receiving the connection completion notification, the terminal control unit 301 determines whether there is data awaiting transmission in the wireless communication unit 305 (step S403). When there is data awaiting transmission in the wireless communication unit 305, the terminal control unit 301 transitions to a process of determining waiting for transmission right acquisition shown in step S405. In addition, when there is no data awaiting transmission in the wireless communication unit 305, the terminal control unit 301 transitions to a process of determining the presence/absence of transmission data shown in step S404. The data awaiting transmission in the first embodiment is data to be buffered in the wireless communication unit 305 when it is difficult to acquire the right to transmit in step S405.

When it is determined that there is no data awaiting transmission in the wireless communication unit 305 in step S403, the terminal control unit 301 determines whether data to be transmitted to the video transmission terminal 102 is stored in the storage unit 304 (step S404). When data to be transmitted to the video transmission terminal 102 is stored in the storage unit 304, the terminal control unit 301 transitions to a process of determining waiting for transmission right acquisition shown in step S405 and stores transmission data in the wireless communication unit 305. In addition, when no data to be transmitted to the video transmission terminal 102 is stored in the storage unit 304, the terminal control unit 301 transitions to a process of determining whether a transmission right acquisition waiting time change command has been received shown in step S407.

When it is determined that there is data awaiting transmission in the wireless communication unit 305 in step S403 or when it is determined that the data to be transmitted to the video transmission terminal 102 is stored in the storage unit 204 in step S404, the terminal control unit 301 issues a data transmission command to the wireless communication unit 305. Upon receiving the data transmission command, the wireless communication unit 305 is in a transmission right acquisition waiting state for a period indicated by the transmission right acquisition waiting time set in the wireless communication unit 305 (step S405). The wireless communication unit 305 transitions to a data transmission process shown in step S406 when the acquisition of the right to transmit has succeeded, and issues a data transmission completion notification indicating that data transmission has failed to the terminal control unit 301 when the acquisition of the right to transmit has failed.

Also, in the first embodiment, it is assumed that the communication control unit 302 sets an initial value of the transmission right acquisition waiting time in the wireless communication unit 305 based on the initial value of the transmission right acquisition time pre-stored in the storage unit 304 using the establishment of the dedicated non-video transmission path 104 as a trigger in relation to the initial value of the transmission right acquisition waiting time of the wireless communication unit 305. Also, the wireless communication unit 305 may receive the initial value of the transmission right acquisition waiting time from the video transmission terminal 102 when the data transmission process of the external terminal is started, and the initial value of the transmission right acquisition time may be set in the wireless communication unit 305 based on received information. As long as a method of setting the initial value of the transmission right acquisition waiting time does not depart from the scope of the present invention, the present invention is not limited to the above-described method.

When the acquisition of the right to transmit has succeeded in step S405, the wireless communication unit 305 transmits buffered data to the video transmission terminal 102, and issues a data transmission completion notification indicating that data transmission has succeeded to the terminal control unit 301 (step S406).

Upon receiving the data transmission completion notification issued in steps S405 and S406, the terminal control unit 301 transitions to a process of determining whether a transmission right acquisition waiting time change command has been received from the video transmission terminal 102 by way of the wireless communication unit 305 and the antenna 306 (step S407). The terminal control unit 301 transitions to a process of changing a transmission right acquisition waiting time shown in step S408 when the transmission right acquisition waiting time change command has been received, and transitions to a process of determining whether a data transmission process end command has been issued shown in step S409 when no transmission right acquisition waiting time change command has been received.

Also, the transmission right acquisition waiting time change command in the first embodiment is a control command including at least transmission right acquisition waiting time change information, which is a parameter for changing a transmission right acquisition waiting time, that is, information designating one or both of the AIFS and the CW, or a control command for returning the transmission right acquisition waiting time to an initial value stored in the storage unit 304.

When the transmission right acquisition waiting time change command has been received in step S407, the terminal control unit 301 notifies the communication control unit 302 of the transmission right acquisition waiting time change command. When the transmission right acquisition waiting time change command is a control command including transmission right acquisition waiting time change information upon receiving the transmission right acquisition waiting time change command, the communication control unit 302 sets the transmission right acquisition waiting time for the wireless communication unit 305 based on the transmission right acquisition waiting time change information. In addition, when the transmission right acquisition waiting time change command is a control command for returning the transmission right acquisition waiting time to an initial value, the communication control unit 302 sets the transmission right acquisition waiting time for the wireless communication unit 305 based on the initial value of the transmission right acquisition waiting time stored in the storage unit 304 (step S408).

Also, if information designating only the AIFS is included in the transmission right acquisition waiting time change information when the transmission right acquisition waiting time is set based on the transmission right acquisition waiting time change information, the transmission right acquisition waiting time is set based on the designated AIFS. If information designating only the CW is included in the transmission right acquisition waiting time change information, the transmission right acquisition waiting time is set based on the designated CW. If information designating the AIFS and the CW is included in the transmission right acquisition waiting time change information, the transmission right acquisition waiting time is set based on the designated AIFS and CW.

When no transmission right acquisition waiting time change command has been received in step S407 and after the setting of the transmission right acquisition waiting time has been completed in step S408, the terminal control unit 301 determines whether the data transmission process end command has been issued (step S409). The terminal control unit 301 ends the data transmission process of the external terminal when the data transmission process end command has been issued, and re-performs the process from the process of determining whether there is data awaiting transmission shown in step S403 when no data transmission process end command has been issued.

Although the data transmission process end command in the first embodiment is a command to be issued using a disconnection of the dedicated non-video transmission path 104 between the external terminal 101 and the video transmission terminal 102 as a trigger, the data transmission process end command may be issued when the trigger has been input through the operation of the operation unit 307. As long as a condition of issuance of the data transmission process end command does not depart from the scope of the present invention, the condition is not limited to only the disconnection of the dedicated non-video transmission path 104.

Figure 5:
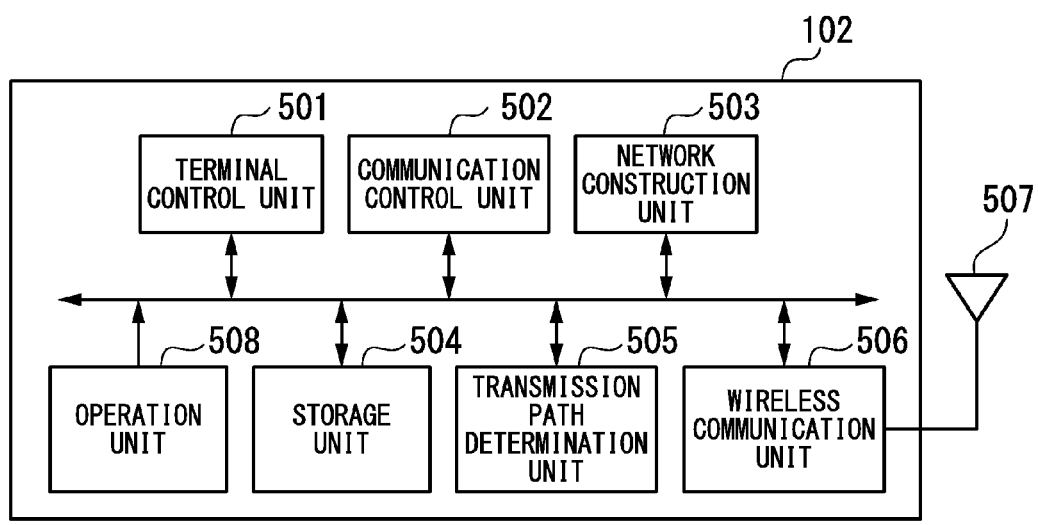
FIG. 5 is a block diagram illustrating a configuration of a video transmission terminal in the first embodiment of the present invention.

FIG. 5 illustrates a configuration of the video transmission terminal 102. The configuration of the video transmission terminal 102 will be described using FIG. 5.

The video transmission terminal 102 includes a terminal control unit 501, a communication control unit 502, a network construction unit 503, a storage unit 504, a transmission path determination unit 505, a wireless communication unit 506, an antenna 507, and an operation unit 508.

The terminal control unit 501 controls an operation of the video transmission terminal 102. The communication control unit 502 transmits the transmission right acquisition waiting time change command to the external terminal 101 by way of the wireless communication unit 506 and the antenna 507, and controls data transmission by way of the wireless communication unit 506 and the antenna 507. The network construction unit 503 constructs a network in which the external terminal 101 and the video reception terminal 103 can participate, establishes a connection of the dedicated non-video transmission path 104 with the external terminal 101, and establishes a connection of the dedicated video transmission path 105 with the video reception terminal 103. The storage unit 504 stores data received from the external terminal 101 by way of the wireless communication unit 506 and the antenna 507 and video data to be transmitted to the video reception terminal 103. The transmission path determination unit 505 determines which of connections of the dedicated non-video transmission path 104 and the dedicated video transmission path 105 is a connection established by the network construction unit 503 by way of the wireless communication unit 506 and the antenna 507. The wireless communication unit 506 and the antenna 507 wirelessly communicate with the external terminal 101 and the video reception terminal 103. The operation unit 508 is a user interface which receives an input based on an operation performed by the user.

In addition, the storage unit 504 stores a program for controlling an operation of the video transmission terminal 102 or necessary data. Functions of the terminal control unit 501, the communication control unit 502, and the network construction unit 503 of the video transmission terminal 102, for example, are implemented by causing a CPU (not illustrated) of the video transmission terminal 102 to read and execute the program for controlling the operation of the video transmission terminal 102. In addition, the program for controlling the operation of the video transmission terminal 102, for example, may be provided through a "computer readable recording medium" such as a flash memory. The above-described program may be transmitted from a computer in which the program is stored in a storage device or the like to the video transmission terminal 102 via a transmission medium, or by transmission waves within the transmission medium, and hence input to the video transmission terminal 102. Here, for example, the "transmission medium" on which the program is transmitted is a medium having an information transmission function like a network (communication network) such as the Internet or a communication circuit (communication line) such as a telephone circuit. In addition, the above-described program may be used to implement some of the above-described functions. Further, the above-described program may be a so-called differential file (differential program) capable of implementing the above-described function in combination with a program already recorded on the computer.

Figure 6:
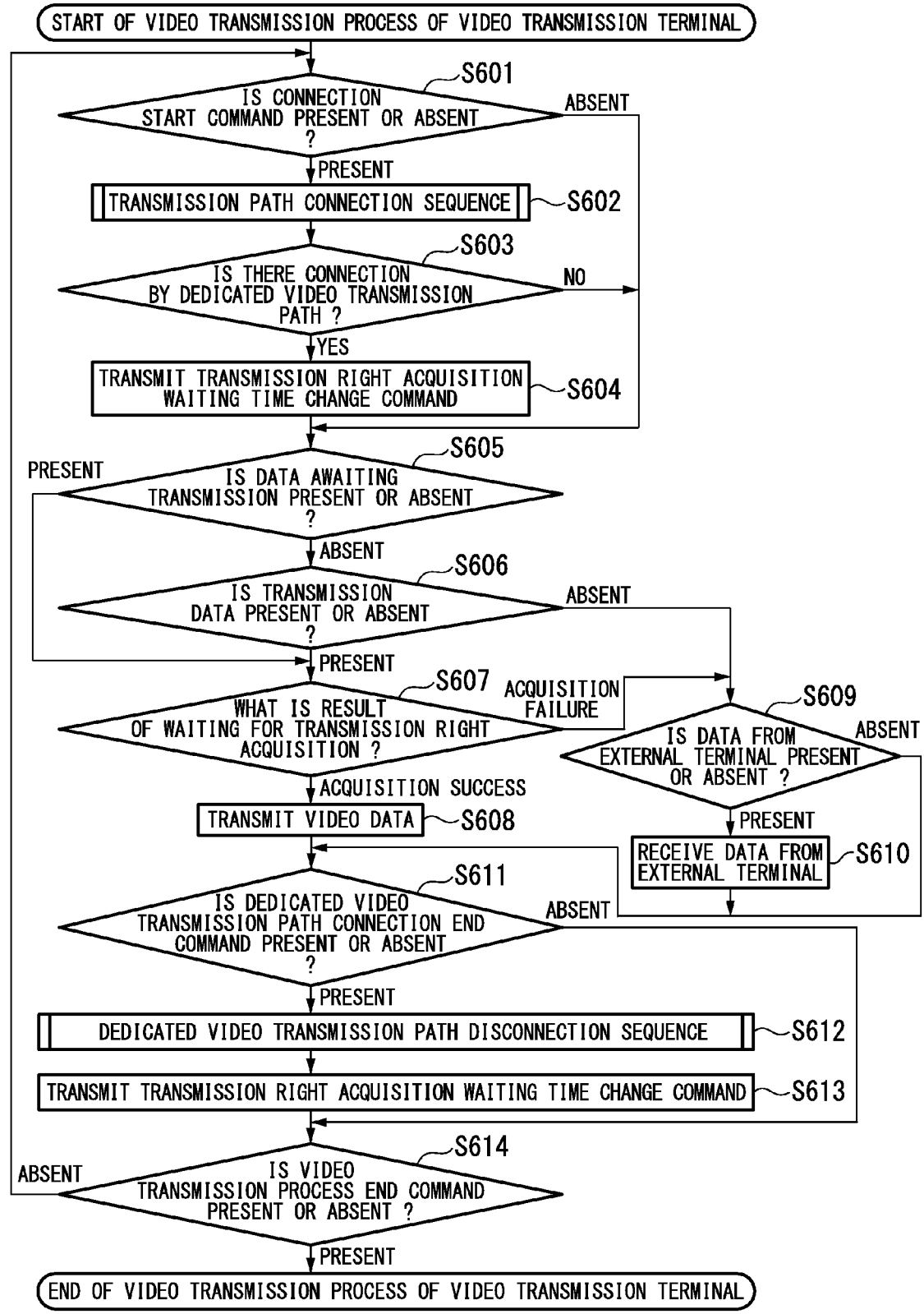
FIG. 6 is a flowchart illustrating a procedure of an operation of the video transmission terminal in the first embodiment of the present invention.

FIG. 6 illustrates an operation of the video transmission terminal 102. The operation of the video transmission terminal 102 will be described using FIG. 6.

The terminal control unit 501 starts a video transmission process of the video transmission terminal using the activation of power of the video transmission terminal 102 through an operation of the operation unit 508 as the trigger.

Although the video transmission process of the video transmission terminal in the first embodiment is a process to be started using the activation of power of the video transmission terminal 102 as a trigger, the data transmission process may be started using an input of a start command for the video transmission process of the video transmission terminal through the operation of the operation unit 508 as the trigger. A start condition of the video transmission process of the video transmission terminal is not limited to only the activation of power to the video transmission terminal 102 as long as the start condition does not depart from the scope of the present invention.

When the video transmission process of the video transmission terminal is started, the terminal control unit 501 determines whether a connection start command has been issued (step S601). The terminal control unit 501 transitions to a transmission path connection process shown in step S602 when the connection start command has been issued, and transitions to a process of determining the presence/absence of data awaiting transmission shown in step S605 when no connection start command has been issued.

Also, when the video transmission process of the video transmission terminal is started, the video transmission terminal 102 in the first embodiment controls the network construction unit 503 to construct a network using the video transmission terminal 102 as the access point. In addition, when the video transmission process of the video transmission terminal is started and the network using the video transmission terminal 102 as the access point is constructed, the video transmission terminal 102 in the first embodiment starts cyclic transmission by multicasting a connection acceptance notification indicating that the video transmission terminal 102 is in the connection reception state by way of the wireless communication unit 506 and the antenna 507.

In addition, the connection acceptance notification is information including at least a service set identifier (SSID) of the network in which the network construction unit 503 of the video transmission terminal 102 has been constructed. In addition, the connection start command in the first embodiment is a command issued using reception of a dedicated non-video transmission path connection request or a dedicated video transmission path connection request as the trigger from the external terminal 101 or the video reception terminal 103 by way of the wireless communication unit 506 and the antenna 507.

When it is determined that the connection start command has been issued in step S601, the terminal control unit 501 issues a transmission path connection sequence start command, which is a command for causing a transmission path connection sequence to be started, to the network construction unit 503. Upon receiving the transmission path connection sequence start command, the network construction unit 503 performs a transmission path connection process with the external terminal 101 or the video reception terminal 103 transmitting a connection request to the video transmission terminal 102 by way of the wireless communication unit 506 and the antenna 507, and simultaneously controls the transmission path determination unit 505 to monitor a transmission path connection sequence. When a connection of a transmission path to the external terminal 101 or the video reception terminal 103 is completed, the network construction unit 503 issues a connection completion notification to the terminal control unit 501 (step S602).

Also, simultaneously, when the connection of the transmission path is completed, the transmission path determination unit 505 stores transmission path determination result information, which includes at least information indicating which of the dedicated non-video transmission path 104 and the dedicated video transmission path 105 is the connected transmission path, in the storage unit 504.

Upon receiving the connection completion notification, the terminal control unit 501 determines whether the video transmission terminal 102 has been connected in the dedicated video transmission path 105 based on transmission path determination result information stored in the storage unit 504 (step S603). The terminal control unit 501 issues a transmission right acquisition waiting time change command transmission notification, which is a command for causing the transmission right acquisition waiting time change command to be transmitted, to the communication control unit 502 when the video transmission terminal 102 has been connected in the dedicated video transmission path 105, and transitions to a process of determining the presence/absence of data awaiting transmission shown in step S605 when the video transmission terminal 102 has been connected in the dedicated non-video transmission path 104. Also, the transmission path connection process and the transmission path determination process will be described later.

Upon receiving the transmission right acquisition waiting time change command transmission notification, the communication control unit 502 determines values of one or both of the AIFS and the CW in which the transmission right acquisition waiting time is longer than the transmission right acquisition waiting time set in the wireless communication unit 506, and transmits a transmission right acquisition waiting time change command obtained by adding the determined values as the transmission right acquisition waiting time change information to the external terminal 101 by way of the wireless communication unit 506 and the antenna 507. Upon completing the transmission of the transmission right acquisition waiting time change command, the communication control unit 502 issues a transmission right acquisition waiting time change command transmission completion notification to the terminal control unit 501 (step S604).

When it is determined that no connection start command has been issued in step S601, when it is determined that the video transmission terminal 102 has been connected in the dedicated non-video transmission path 104 in step S603, and when it is determined that the transmission right acquisition waiting time change command transmission completion notification has been received in step S604, the terminal control unit 501 determines whether there is data awaiting transmission in the wireless communication unit 506 (step S605). The terminal control unit 501 transitions to the transmission right acquisition waiting process shown in step S607 when there is data awaiting transmission, and transitions to a process of determining the presence/absence of transmission data shown in step S606 when there is no data awaiting transmission. Also, the data awaiting transmission in the first embodiment is assumed to be data to be buffered in the wireless communication unit 506 when it is difficult to acquire the right to transmit in step S607.

When it is determined that there is no data awaiting transmission in the wireless communication unit 506 in step S605, the terminal control unit 501 determines whether video data to be transmitted to the video reception terminal 103 is stored in the storage unit 504 (step S606). The terminal control unit 501 transitions to a process of determining transmission right acquisition waiting shown in step S607 by buffering video data in the wireless communication unit 506 when video data is stored, and determines whether data is transmitted from the external terminal 101 to the video transmission terminal 102 shown in step S609 when no video data is stored.

When it is determined that there is data awaiting transmission in step S605 or when it is determined that video data to be transmitted to the video reception terminal 103 is stored in the storage unit 504 in step S606, the terminal control unit 501 issues a video data transmission command to the wireless communication unit 506.

Upon receiving the video data transmission command, the wireless communication unit 506 is in a transmission right acquisition waiting state for a period of a transmission right acquisition waiting time set in the wireless communication unit 506 (step S607). The terminal control unit 501 transitions to the video data transmission process shown in step S608 when the acquisition of the right to transmit has succeeded, and issues a video data transmission completion notification indicating that the transmission of the video data has failed to the terminal control unit 501 when the acquisition of the right to transmit has failed.

Also, in the first embodiment, it is assumed that the initial value of the transmission right acquisition waiting time of the wireless communication unit 506 is preset based on information held by the storage unit 504 using first completion of the transmission path connection sequence shown in step S602 as the trigger. In addition, when a transmission path connected to the video transmission terminal 102 is the dedicated non-video transmission path 104 and the video transmission terminal 102 is not connected to the dedicated video transmission path 105 in step S602, an operation of notifying the external terminal 101 of the initial value of the transmission right acquisition waiting time pre-stored in the storage unit 504 and causing the external terminal 101 to set the initial value may be performed by controlling the communication control unit 502.

When the acquisition of the right to transmit has succeeded in step S607, the wireless communication unit 506 transmits buffered data to the video reception terminal 103, and issues a data transmission completion notification indicating that the data transmission has succeeded to the terminal control unit 501 (step S608).

When it is determined that there is no video data to be transmitted to the video reception terminal 103 in the storage unit 504 in step S606 or when it is determined that the issued video data transmission completion notification has been received in step S607, the terminal control unit 501 issues a data reception determination process start command for causing a process of determining whether there is data transmitted from the external terminal 101 to the video transmission terminal 102 to be performed to the wireless communication unit 506.

Upon receiving the data reception determination process start command, the wireless communication unit 506 determines whether there is data transmitted from the external terminal 101 to the video transmission terminal 102 by way of the antenna 507 (step S609). The wireless communication unit 506 transitions to the data reception process shown in step S610 when there is data, and issues a data reception completion notification, which indicates that there is no data transmitted from the external terminal 101 to the video transmission terminal 102, to the terminal control unit 501 when there is no data.

When it is determined that there is data transmitted from the external terminal 101 to the video transmission terminal 102 in step S609, the wireless communication unit 506 receives data by way of the antenna 507 and issues a data reception completion notification, which indicates that the data reception has been completed, to the terminal control unit 501 after storing the data in the storage unit 504 (step S610).

When the data transmission completion notification issued in step S608 has been received or when the data reception completion notification issued in steps S609 or S610 has been received, the terminal control unit 501 determines whether a dedicated video transmission path connection end command has been issued (step S611). The terminal control unit 501 starts a process of disconnecting the dedicated video transmission path 105 shown in step S612 when the dedicated video transmission path connection end command has been issued, and determines whether a video transmission process end command has been issued as shown in step S614 when no dedicated video transmission path connection end command has been issued.

Although the dedicated video transmission path connection end command in the first embodiment is a command to be issued using the completion of the video data transmission as the trigger, the command may be issued using the input of a disconnection command of the dedicated video transmission path 105 through the operation of the operation unit 508 as the trigger in a state in which the connection of the dedicated video transmission path 105 has been established. As long as an issuance condition of the dedicated video transmission path connection end command does not depart from the scope of the present invention, the issuance condition is not limited to only the transmission completion of the video data.

When the dedicated video transmission path connection end command has been issued in step S611, the terminal control unit 501 issues a dedicated video transmission path disconnection sequence start command, which is a command for causing a process of disconnecting the dedicated video transmission path 105 to be started, to the network construction unit 503. Upon receiving the dedicated video transmission path disconnection sequence start command, the network construction unit 503 starts a process of disconnecting the dedicated video transmission path 105 with the video reception terminal 103 by way of the wireless communication unit 506 and the antenna 507. When the process of disconnecting the dedicated video transmission path 105 with the video reception terminal 103 is completed, the network construction unit 503 issues a dedicated video transmission path disconnection process completion notification to the terminal control unit 501 (step S612). Also, the process of disconnecting the dedicated video transmission path 105 will be described later.

Upon receiving the dedicated video transmission path disconnection process completion notification, the terminal control unit 501 issues a transmission right acquisition waiting time change command transmission notification, which is a command for causing the transmission right acquisition waiting time change command to be transmitted, to the communication control unit 502. Upon receiving the transmission right acquisition waiting time change command transmission notification, the communication control unit 502 transmits the transmission right acquisition waiting time change command for causing the transmission right acquisition waiting time of the external terminal 101 to be changed to the initial value to the external terminal 101 by way of the wireless communication unit 506 and the antenna 507. Upon completing the transmission of the transmission right acquisition waiting time change command, the communication control unit 502 issues a transmission right acquisition waiting time change command transmission completion notification to the terminal control unit 501 (step S613).

When it is determined that no dedicated video transmission path connection end command has been issued in step S611 or when the transmission right acquisition waiting time change command transmission completion notification issued in step S613 has been received, the terminal control unit 501 determines whether the video transmission process end command has been issued (step S614). The terminal control unit 501 ends the video transmission process of the video transmission terminal when the video transmission process end command has been issued, and re-performs the process from the process of determining whether the connection start command has been issued shown in step S601 when no video transmission process end command has been issued.

Although the video transmission process end command in the first embodiment is a command to be issued using the disconnection of the dedicated non-video transmission path 104 between the external terminal 101 and the video transmission terminal 102 as the trigger, the video transmission process of the video transmission terminal may end using the input of the end command of the video transmission process of the video transmission terminal through the operation of the operation unit 508 as the trigger in a state in which the connection of the dedicated video transmission path 105 has been established. The issuance condition of the video transmission process end command is not limited to only the disconnection of the dedicated non-video transmission path 104.

Figure 7A:
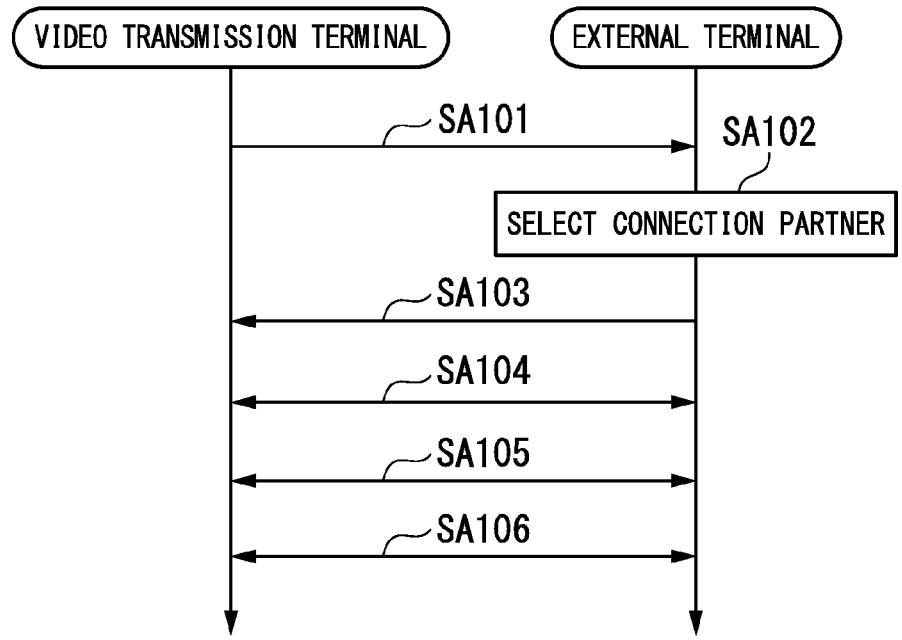
FIG. 7A is a sequence diagram illustrating connection sequences of a dedicated non-video transmission path and a dedicated video transmission path in the first embodiment of the present invention.
Figure 7B:
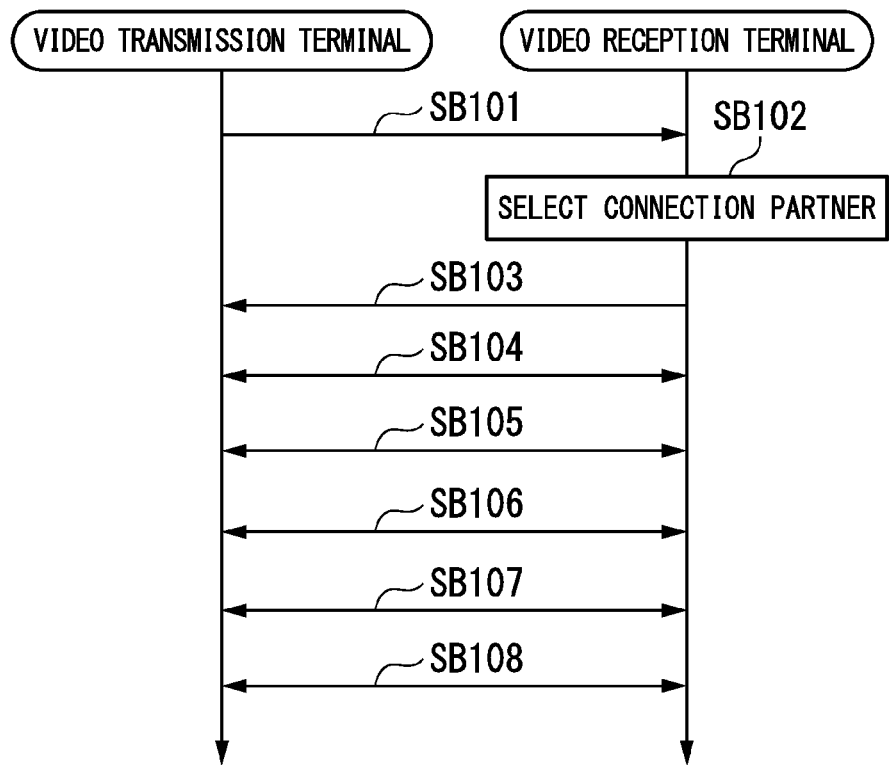
FIG. 7B is a sequence diagram illustrating connection sequences of a dedicated non-video transmission path and a dedicated video transmission path in the first embodiment of the present invention.

Next, the transmission path connection process and the transmission path determination process will be described using FIGS. 7A and 7B. FIGS. 7A and 7B illustrate connection sequences of the dedicated non-video transmission path 104 and the dedicated video transmission path 105, which are transmission paths in the first embodiment. The connection sequence illustrated in FIG. 7A is a connection sequence (second connection process) of the dedicated non-video transmission path 104, and the connection sequence illustrated in FIG. 7B is a connection sequence (first connection process) of the dedicated video transmission path 105. Both the connections of the dedicated video transmission path 105 and the dedicated non-video transmission path 104 start from a search of any connection partner, and are made by multicasting and transmitting a connection acceptance notification from the video transmission terminal 102 serving as the access point to the external terminal 101 (first connection terminal) and the video reception terminal 103 (second connection terminal) (steps SA101 and SB101).

Although a connection acceptance notification is transmitted from the video transmission terminal 102 in the connection sequence of the first embodiment, the search of the connection partner may be bi-directionally performed among the external terminal 101, the video transmission terminal 102, and the video reception terminal 103. As long as the search of the connection partner does not depart from the scope of the present invention, the search of the connection partner is not limited to a condition that the search of the connection partner be performed by a connection acceptance notification transmitted from the video transmission terminal 102.

When the search of the connection partner is completed for the connection sequence of either the dedicated video transmission path 105 or the dedicated non-video transmission path 104, the connection partner is selected by the external terminal 101 or the video transmission terminal 102 serving as the station (steps SA102 and SB102).

Although the connection partner in the first embodiment is assumed to be automatically selected when a connection acceptance notification has been received, the connection partner may be selected by inputting a selection result of the connection partner through the operation of the operation unit.

When the connection partner is selected, connection requests are transmitted from the external terminal 101 and the video reception terminal 103 serving as the stations for a sequence of either the dedicated video transmission path 105 or the dedicated non-video transmission path 104 (steps SA103 and SB103). When the video transmission terminal 102 receives the connection request, communication schemes are determined between the external terminal 101 and the video reception terminal 103 serving as the stations and the video transmission terminal 102 (steps SA104 and SB104).

Also, the communication scheme in the first embodiment is assumed to be either wireless fidelity peer to peer (Wi-Fi® P2P) or tunneled direct link setup (TDLS) in the dedicated video transmission path 105, and is not limited to the two communication schemes in the case of the connection in the dedicated non-video transmission path 104, and various communication schemes are adopted.

When the determination of the communication scheme is completed, a communication link is established between the video reception terminal 103 or the external terminal 101 serving as the station and the video transmission terminal 102 serving as the access point for a connection sequence of either the dedicated video transmission path 105 or the dedicated non-video transmission path 104 (steps SA105 and SB105). Although the data transmission is started in the connection sequence of the dedicated non-video transmission path 104 when the communication link is established (step SA106), a session of video transmission is established (step SB107) after a format of data (one or both of video and music) which the terminal of the connection partner supports has been exchanged (step SB106) after the establishment of a communication link in the connection sequence of the dedicated video transmission path 105, and streaming is started (step SB108).

Although the exchange of the format and the session establishment of the video transmission in the first embodiment are assumed to be performed using a real time streaming protocol (RTSP), the present invention is not limited to the use of an RTSP.

In addition, the transmission path determination unit 505 provided in the video transmission terminal 102 monitors a connection process performed by the network construction unit 503 while the connection sequence of the transmission path is performed, determines that the dedicated video transmission path 105 has been established when at least the exchange of a supported format and the establishment of a video transmission session have been performed together, and determines that the dedicated non-video transmission path 104 has been established when neither the exchange of the supported format nor the establishment of the video transmission session has been performed.

In addition, the connection sequence illustrated in FIG. 7A is an example of the connection sequence of the dedicated non-video transmission path 104, and the connection sequence of the dedicated non-video transmission path 104 is not limited to FIG. 7A unless the exchange of the supported format and the establishment of the video transmission session are performed together.

Figure 8A:
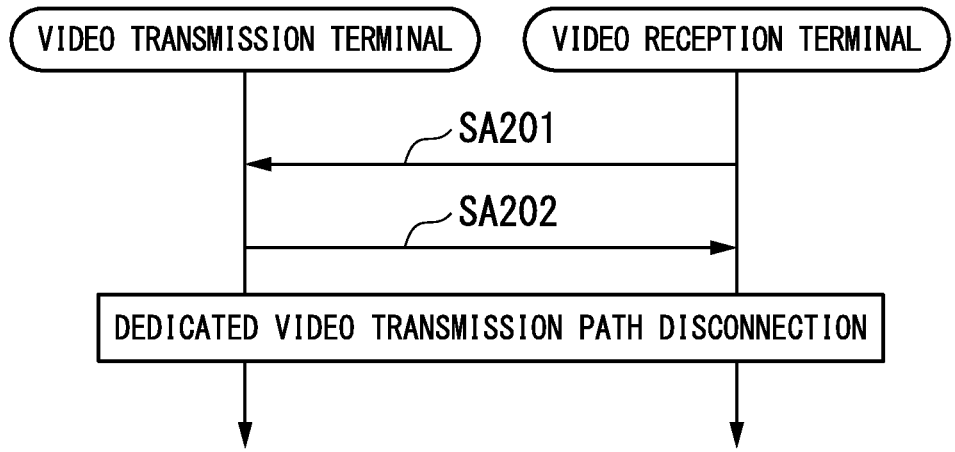
FIG. 8A is a sequence diagram each illustrating a disconnection sequence of a dedicated video transmission path in the first embodiment of the present invention.
Figure 8B:
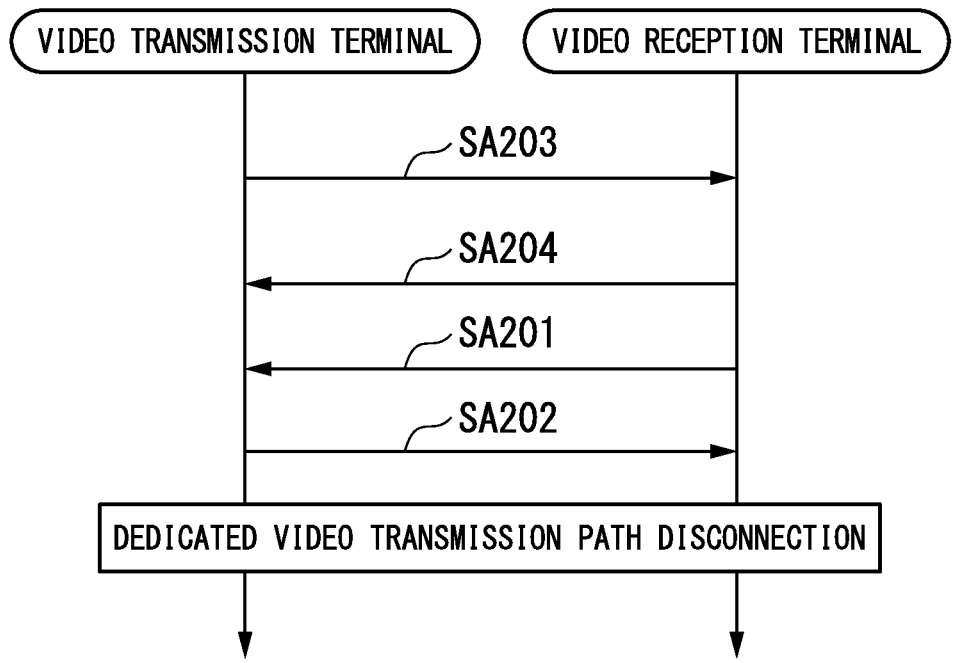
FIG. 8B is a sequence diagram each illustrating a disconnection sequence of a dedicated video transmission path in the first embodiment of the present invention.

The disconnection of the dedicated video transmission path 105 will be described using FIGS. 8A and 8B. FIGS. 8A and 8B illustrate the disconnection sequences of the dedicated video transmission path 105.

The disconnection of the dedicated video transmission path 105 is made in a sequence illustrated in FIG. 8A in which a dedicated video transmission path disconnection request is transmitted from the video reception terminal 103 to the video transmission terminal 102 (step SA201) and a dedicated video transmission path disconnection response, which is a response to the received dedicated video transmission path disconnection request, is transmitted from the video transmission terminal 102 to the video reception terminal 103 (step SA202).

In addition, for the disconnection of the dedicated video transmission path, a dedicated video transmission path disconnection request transmission command transmitted from the video transmission terminal 102 to the video reception terminal 103 (step SA203) and a transmitted dedicated video transmission path disconnection request transmission response, which is a response to the dedicated video transmission path disconnection request transmission command (step SA204), are used as the trigger, so that a sequence illustrated in FIG. 8B in which the sequence illustrated in FIG. 8A is started may be performed.

Figure 9:
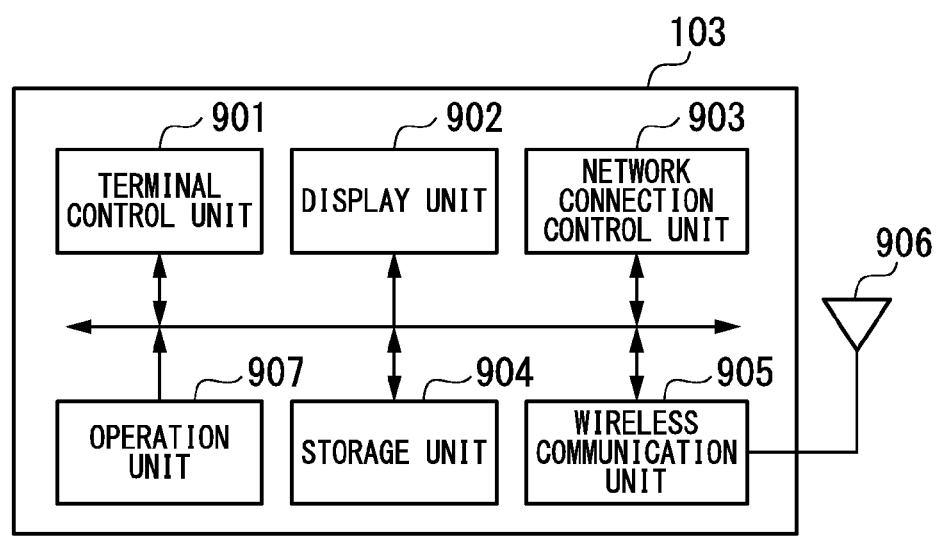
FIG. 9 is a block diagram illustrating a configuration of a video reception terminal in the first embodiment of the present invention.

FIG. 9 illustrates a configuration of the video reception terminal 103. The configuration of the video reception terminal 103 will be described using FIG. 9. The video reception terminal 103 includes a terminal control unit 901, a display unit 902, a network connection control unit 903, a storage unit 904, a wireless communication unit 905, an antenna 906, and an operation unit 907.

The terminal control unit 901 controls an operation of the video reception terminal 103. The display unit 902 displays a video based on video data stored in the storage unit 904 received from the video transmission terminal 102. The network connection control unit 903 establishes a connection in the dedicated video transmission path with the video transmission terminal by way of the wireless communication unit 905 and the antenna 906. The storage unit 904 stores video data received from the video transmission terminal 102. The wireless communication unit 905 and the antenna 906 wirelessly communicate with the video transmission terminal 102. The operation unit 907 is a user interface which receives an input based on the operation performed by the user.

Figure 10:
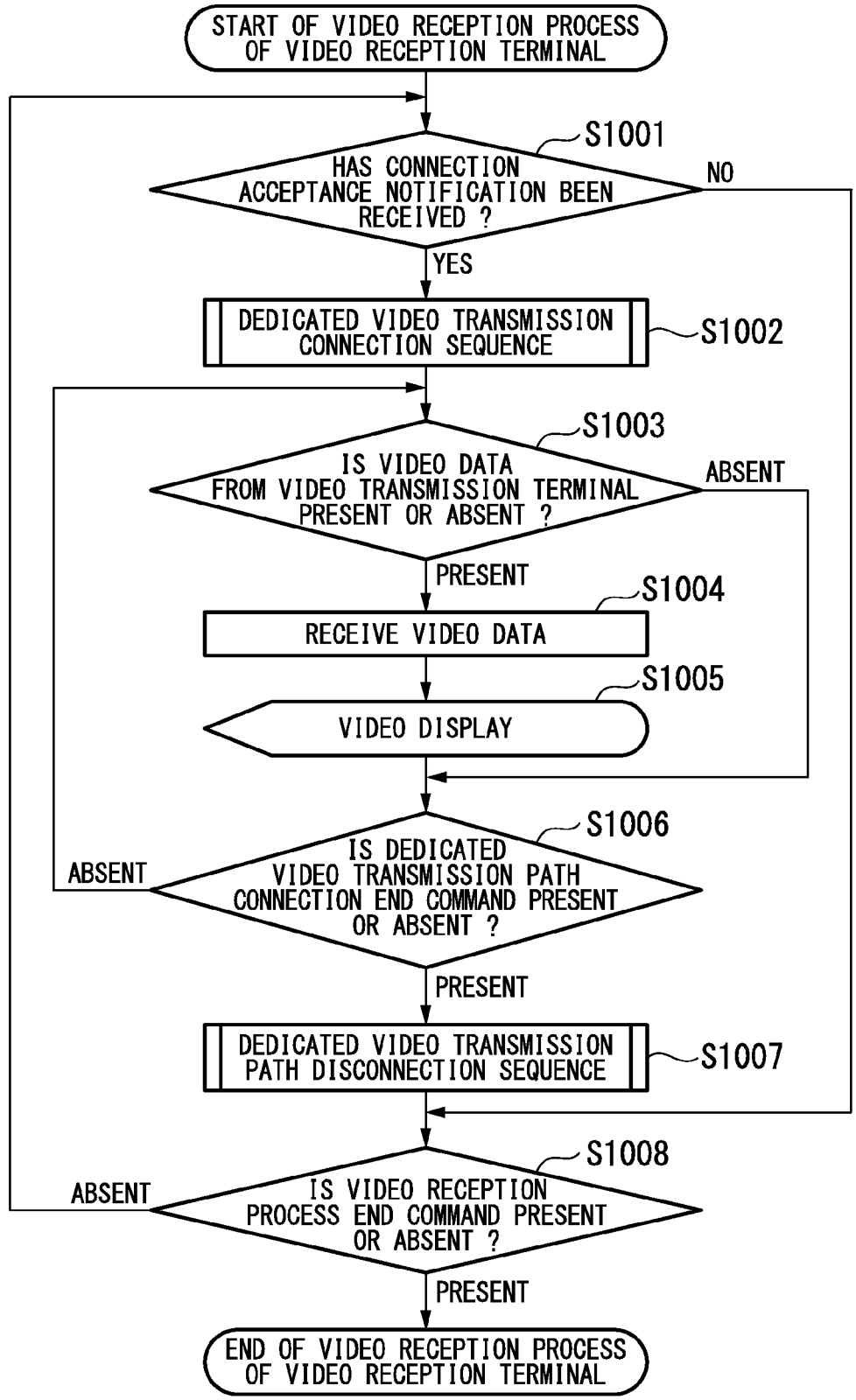
FIG. 10 is a flowchart illustrating a procedure of an operation of the video reception terminal in the first embodiment of the present invention.

FIG. 10 illustrates an operation of the video reception terminal 103. The operation of the video reception terminal 103 will be described using FIG. 10.

The terminal control unit 901 starts a video reception process of the video reception terminal using the activation of power of the terminal through the operation of the operation unit 907 as the trigger.

Although the video reception process of the video reception terminal in the first embodiment is a process to be started using the activation of power of the terminal as the trigger, the video reception process of the video reception terminal may be started using an input of a start command for the video reception process of the video reception terminal through the operation of the operation unit 907 as the trigger. A start condition of the video reception process of the video reception terminal is not limited to only the activation of power to the video reception terminal as long as the start condition does not depart from the scope of the present invention.

When the video reception process of the video reception terminal is started, the terminal control unit 901 issues a connection acceptance notification reception start command, which is a command for causing a connection acceptance notification to be received, to the wireless communication unit 905. Upon receiving the connection acceptance notification reception start command, the wireless communication unit 905 performs a search of whether a connection acceptance notification has been transmitted from the video transmission terminal 102 by the antenna 906 (step S1001). The wireless communication unit 905 issues a connection acceptance notification reception completion notification to the terminal control unit 901 after storing the received connection acceptance notification in the storage unit 904 when the connection acceptance notification has been transmitted, and issues a connection acceptance notification reception failure notification to the terminal control unit 901 when no connection acceptance notification has been transmitted.

Upon receiving the connection acceptance notification reception completion notification, the terminal control unit 901 issues a dedicated video transmission path connection sequence start command, which is a command for causing a process of connecting the dedicated video transmission path 105 to be started, to the network connection control unit 903. Upon receiving the dedicated video transmission path connection sequence start command, the network connection control unit 903 performs a process of connecting the dedicated video transmission path 105 with the video transmission terminal 102 by way of the wireless communication unit 905 and the antenna 906, and starts the connection of the dedicated video transmission path 105 with the video transmission terminal 102. Upon completing the process of connecting the dedicated video transmission path 105 with the video transmission terminal 102, the network connection control unit 903 issues a dedicated video transmission path connection process completion notification to the terminal control unit 901 (step S1002). Also, the process of connecting the dedicated video transmission path 105 is substantially the same as the process of FIG. 7.

Upon receiving the dedicated video transmission path connection process completion notification, the terminal control unit 901 issues a video data reception determination process start command for causing a process of determining whether there is data transmitted from the video transmission terminal 102 to the video reception terminal 103 to the wireless communication unit 905. Upon receiving the video data reception determination process start command, the wireless communication unit 905 determines whether there is video data transmitted from the video transmission terminal 102 to the video reception terminal 103 by way of the antenna 906 (step S1003). The wireless communication unit 905 transitions to a video data reception process shown in step S1004 when there is video data, and issues a video data reception completion notification, which indicates that there is no video data transmitted from the video reception terminal 103 to the video transmission terminal 102, to the terminal control unit 901 when there is no video data.

Upon determining that there is video data in step S1003, the wireless communication unit 905 receives the video data by way of the antenna 906, and issues a video data reception completion notification, which indicates that the storage of the video data has been completed, to the terminal control unit 901 after storing the video data in the storage unit 904 (step S1004). Upon receiving the video data reception completion notification issued in step S1004, the terminal control unit 901 controls the display unit 902 to display a video based on the video data stored in the storage unit 904 (step S1005).

When the video display has been completed in step S1005 or when the video data reception completion notification issued in step S1003 has been received, the terminal control unit 901 determines whether a dedicated video transmission path connection end command has been issued (step S1006). The terminal control unit 901 starts a process of disconnecting the dedicated video transmission path 105 shown in step S1007 when the dedicated video transmission path end command has been issued, and re-performs the process from the scanning of video data transmitted from the video transmission terminal 102 to the video reception terminal 103 shown in step S1003 when no dedicated video transmission path connection end command has been issued.

Although a dedicated video transmission path connection end command in the first embodiment is a command to be issued using the completion of reception of video data as the trigger, the dedicated video transmission path connection end command may be issued using the input of a command for disconnecting the dedicated video transmission path 105 through the operation of the operation unit 907 as the trigger in a state in which the connection of the dedicated video transmission path 105 has been established. As long as an issuance condition of the dedicated video transmission path connection end command does not depart from the scope of the present invention, the issuance condition is not limited to only the reception completion of the video data.

When the dedicated video transmission path connection end command has been issued in step S1006, the terminal control unit 901 issues a dedicated video transmission path disconnection sequence start command, which is a command for causing the process of disconnecting the dedicated video transmission path 105 to be started, to the network connection control unit 903. Upon receiving the dedicated video transmission path disconnection sequence start command, the network connection control unit 903 performs a process of disconnecting the video transmission terminal 102 and the dedicated video transmission path 105 by way of the wireless communication unit 905 and the antenna 906, and starts the disconnection of the dedicated video transmission path 105 with the video transmission terminal 102. Upon completing the process of disconnecting the dedicated video transmission path 105 with the video transmission terminal 102, the network connection control unit 903 issues a dedicated video transmission path disconnection process completion notification to the terminal control unit 901 (step S1007). Also, the process of disconnecting the dedicated video transmission path 105 is substantially the same as the process of FIG. 8.

Upon receiving the connection acceptance notification reception failure notification issued in step S1001 or upon receiving the dedicated video transmission path disconnection process completion notification issued in step S1007, the terminal control unit 901 determines whether a video transmission process end command has been issued (step S1008). The terminal control unit 901 ends the video reception process of the video reception terminal when the video transmission process end command has been issued, and re-performs the process from the process of determining whether the connection acceptance notification has been transmitted shown in step S1001 when no video transmission process end command has been issued.

Although the video reception process end command in the first embodiment is a command to be issued using the deactivation of power of the terminal through the operation of the operation unit 907 as the trigger, the video reception process of the video reception terminal may be ended using an input of an end command of the video reception process of the video reception terminal through the operation of the operation unit 907 as the trigger. An end condition of the video reception process of the video reception terminal is not limited to only the deactivation of power to the video reception terminal as long as the end condition does not depart from the scope of the present invention.

In addition, although communication in the dedicated video transmission path 105 is preferentially performed by determining values of one or both of the AIFS and the CW in which the transmission right acquisition waiting time is longer than a transmission right acquisition waiting time set in the wireless communication unit 506 of the video transmission terminal 102 and setting the determined values in the external terminal 101, both the values of the AIFS and the CW of the external terminal 101 may be set to values infinitely close to maximum values and almost all bands may be substantially allocated to communication in the dedicated video transmission path 105.

The video transmission terminal 102 in the first embodiment corresponds to a wireless communication terminal in the present invention of a highest-order concept. For example, it is possible to configure the wireless communication terminal of the present invention by designating the wireless communication unit 506 as a wireless communication unit in the wireless communication terminal of the present invention, designating the network construction unit 503 as a network construction unit in the wireless communication terminal of the present invention, and designating the communication control unit 502 as a communication control unit in the wireless communication terminal of the present invention.

According to the first embodiment as described above, when data transmission is performed using the dedicated non-video transmission path 104 between the video transmission terminal 102 and the external terminal 101 and video data transmission is performed using the dedicated video transmission path 105 between the video transmission terminal 102 and the video reception terminal 103, a transmission right acquisition waiting time change command is transmitted from the video transmission terminal 102 to the external terminal 101. Thereby, in the external terminal 101, the transmission right acquisition waiting time is changed to be longer than the transmission right acquisition waiting time set in the video transmission terminal 102. Therefore, it is possible to preferentially transmit data having a real time property in the overall wireless communication system including the video transmission terminal 102 serving as the access point (base station).

In addition, when the connection of the dedicated video transmission path 105 between the video transmission terminal 102 and the video reception terminal 103 has been disconnected, a transmission right acquisition waiting time change command for returning the transmission right acquisition waiting time of the external terminal 101 to an initial value is transmitted to the external terminal 101. Thereby, in the external terminal 101, the transmission right acquisition waiting time changed to be longer than that set in the video transmission terminal 102 is returned to the initial value. Therefore, after video data transmission more preferentially performed than other data transmissions has ended, it is possible to return the transmission right acquisition waiting time in each of the other data transmissions to the original.

Second Embodiment

Next, the second embodiment of the present invention will be described. The second embodiment is a modified example of the first embodiment. FIGS. 11A to 11C illustrate examples of a dedicated video transmission path priority system in which communication between an external terminal 1101 and a video transmission terminal 1102 is limited and communication between the video transmission terminal 1102 and a video reception terminal 1103 is preferentially performed when a transmission right acquisition category is preset and the external terminal 1101 and the video transmission terminal 1102 share a transmission right acquisition category. The transmission right acquisition category will be described later.

The examples illustrated in FIGS. 11A to 11C illustrate communication states of respective terminals when the video transmission terminal 1102 and the video reception terminal 1103 have established a connection in the dedicated video transmission path 1105 in an environment in which the external terminal 1101 and the video transmission terminal 1102 have established a connection in the dedicated non-video transmission path 1104 by designating the video transmission terminal 1102 as the access point and designating the external terminal 1101 as the station in a network constructed by the video transmission terminal 1102. In the examples illustrated in FIGS. 11A to 11C, a transmission right acquisition category limitation command for causing a transmission right acquisition category to be used when the external terminal 1101 transmits data to the video transmission terminal 1102 to be limited to a transmission right acquisition category having lower priority than a transmission right acquisition category to be used when the video transmission terminal 1102 transmits video data in the dedicated video transmission path 1105 is transmitted to the external terminal 1101. The transmission right acquisition category of the external terminal 1101 is changed based on a transmission right acquisition category limitation command, and hence an opportunity for the external terminal 1101 to acquire the right to transmit is reduced and communication between the video transmission terminal 1102 and the video reception terminal 1103 has priority. That is, a probability of the video transmission terminal 1102 acquiring the right to transmit is higher than a probability of the external terminal 1101 acquiring the right to transmit.

FIG. 11A illustrates a state in which, in a network constructed by the video transmission terminal 1102, the external terminal 1101 and the video transmission terminal 1102 have established a connection in the dedicated non-video transmission path 1104 and the video transmission terminal 1102 and the video reception terminal 1103 have established a connection in the dedicated video transmission path 1105.

FIG. 11B illustrates a state in which, in a network constructed by the video transmission terminal 1102, the external terminal 1101 and the video transmission terminal 1102 have established a connection in the dedicated non-video transmission path 1104, the video transmission terminal 1102 and the video reception terminal 1103 have established a connection in the dedicated video transmission path 1105, and a transmission right acquisition category limitation command (control data) has been transmitted from the video transmission terminal 1102 to the external terminal 1101.

FIG. 11C illustrates a state in which, in a network constructed by the video transmission terminal 1102, the external terminal 1101 and the video transmission terminal 1102 have established a connection in the dedicated non-video transmission path 1104, the video transmission terminal 1102 and the video reception terminal 1103 have established a connection in the dedicated video transmission path 1105, the transmission right acquisition category of the external terminal 1101 is limited, the opportunity for the external terminal 1101 to acquire the right to transmit is reduced, and the communication between the video transmission terminal 1102 and the video reception terminal 1103 has priority.

The transmission right acquisition category will be described using FIG. 12. The transmission right acquisition category is a parameter group including AIFS, CW, and TXOP parameters in which predetermined values have been set according to a real time property or a type of data to be transmitted. In FIG. 12, four items including Voice corresponding to voice data transmission and Video corresponding to video data transmission, Best Effort, and Back Ground are illustrated. Priority is assigned to each transmission right acquisition category. In FIG. 12, the priority is high in the order of Voice, Video, Best Effort, and Back Ground.

Band limitation of data transmission by the transmission right acquisition category is performed by changing a parameter value to be used according to a real time property or a type of data. For example, the acquisition of the right to transmit is performed using a parameter prescribed in a Video field of FIG. 12 when video is transmitted, and the acquisition of the right to transmit is performed using a parameter prescribed in a Voice field of FIG. 12 when voice is transmitted.

Because control of data transmission by a transmission right acquisition waiting time determined by the AIFS and the CW is transmission control of a data link level of wireless communication, control of data transmission by the transmission right acquisition category is also transmission control of the data link level.

Figure 13:
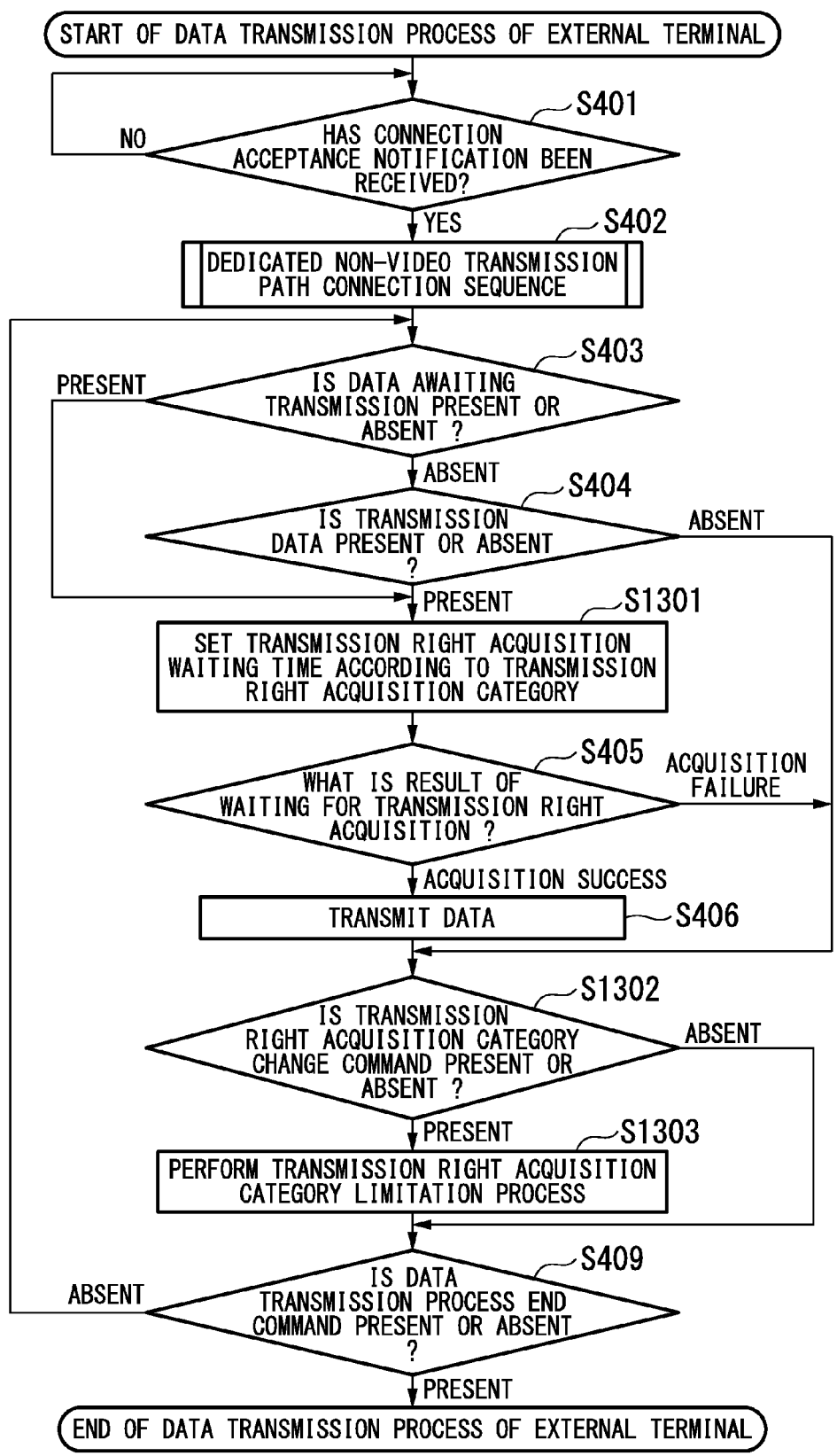
FIG. 13 is a flowchart illustrating a procedure of an operation of an external terminal in the second embodiment of the present invention.

FIG. 13 illustrates an operation of the external terminal 1101. The operation of the external terminal 1101 will be described using FIG. 13.

Also, the configuration of the external terminal 1101 in the second embodiment is the same as the configuration illustrated in FIG. 3. However, they are different in that the communication control unit 302 changes the transmission right acquisition waiting time of the external terminal 1101 according to the parameter prescribed in the transmission right acquisition category and the storage unit 304 stores the transmission right acquisition category and the parameter value prescribed in each category.

In addition, although some of the operations of the external terminal 1101 in the second embodiment are the same as the operations described in the first embodiment, the operations of steps S1301 to S1303 are different from the operations described in the first embodiment. Hereinafter, the operation of each step will be described.

Step S1301 is a process in which the communication control unit 302 sets a transmission right acquisition waiting time according to a transmission right acquisition category prestored in the storage unit 304, presence/absence of limitation of the transmission right acquisition category by the video transmission terminal 1102, and a type or real time property of data to be transmitted when it is determined that there is data awaiting transmission in the wireless communication unit 305 in step S403 or when it is determined that data to be transmitted to the video transmission terminal 1102 is stored in the storage unit 304 in step S404.

For example, when the external terminal 1101 receives the transmission right acquisition category limitation command from the video transmission terminal 1102 and the transmission right acquisition category is limited by the transmission right acquisition category up to the priority of Best Effort according to the transmission right acquisition category limitation command, the transmission right acquisition waiting time of the external terminal 1101 is determined based on a parameter prescribed by Best Effort rather than Video even when video data is transmitted.

Step S1302 is a process in which the terminal control unit 301 determines whether the transmission right acquisition category limitation command has been received from the video transmission terminal 1102 by way of the wireless communication unit 305 and the antenna 306 when it is determined that there is no data to be transmitted in step S404 or when the data transmission completion notification issued in steps S405 or S406 has been received.

Also, the transmission right acquisition category limitation command in the second embodiment is information including at least the transmission right acquisition category limitation information which is information for designating an upper limit of the transmission right acquisition category to be used by the external terminal 1101 at the time of data transmission or releasing the limitation of the transmission right acquisition category.

The terminal control unit 301 transitions to a transmission right acquisition category limitation process shown in step S1303 after the transmission right acquisition category limitation information added to the transmission right acquisition category limitation command has been stored in the storage unit 304 when the transmission right acquisition category limitation command has been received, and transitions to a process of determining whether a data transmission process end command has been issued shown in step S409 when no transmission right acquisition category limitation command has been issued.

Step S1303 is a process in which the terminal control unit 301 issues a transmission right acquisition category limitation notification for notifying the communication control unit 302 that the transmission right acquisition category from the video transmission terminal 1102 is limited. Upon receiving the transmission right acquisition category limitation notification, the communication control unit 302 determines whether the transmission right acquisition category is limited in a transmission right acquisition waiting time setting process shown in step S1301 based on the transmission right acquisition category limitation notification.

When the transmission right acquisition category limitation command including the transmission right acquisition category limitation information for designating the upper limit of the transmission right acquisition category has been received, it is determined that the transmission right acquisition category is limited in step S1303. In this case, in step S1301, the transmission right acquisition waiting time is set in the communication control unit 302 based on the transmission right acquisition category corresponding to priority less than or equal to priority of an upper limit of the transmission right acquisition category indicated by the transmission right acquisition category limitation information stored in the storage unit 304.

In addition, when the transmission right acquisition category limitation command including the transmission right acquisition category limitation information for releasing the limitation of the transmission right acquisition category has been received, it is determined that the transmission right acquisition category is not limited in step S1303. In this case, in step S1301, the transmission right acquisition waiting time based on any one of transmission right acquisition categories stored in the storage unit 304 is set in the communication control unit 302 according to a type and real time property of data to be transmitted.

Figure 14:
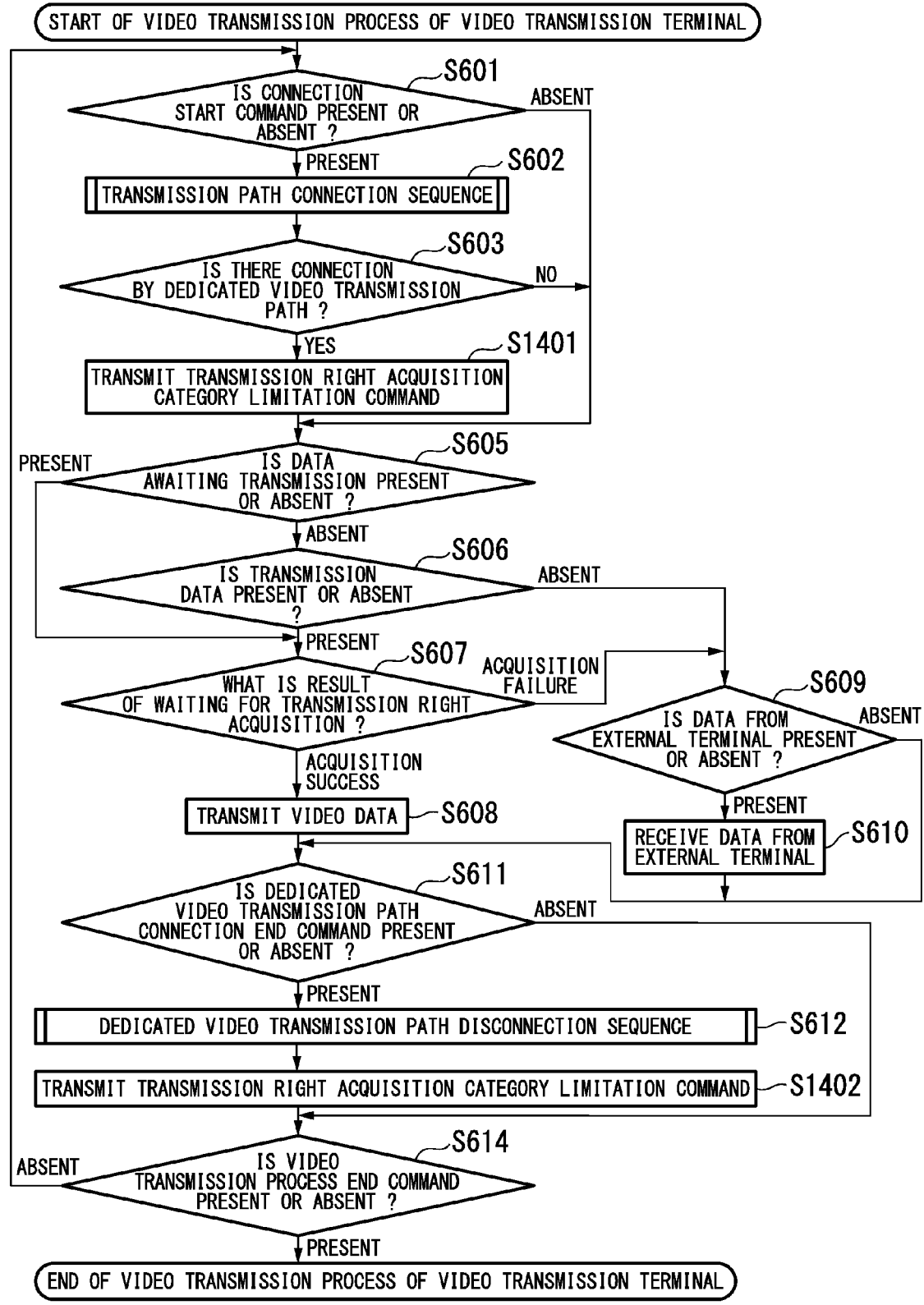
FIG. 14 is a flowchart illustrating a procedure of an operation of a video transmission terminal in the second embodiment of the present invention.

FIG. 14 illustrates an operation of the video transmission terminal 1102. The operation of the video transmission terminal 1102 will be described using FIG. 14.

Also, the configuration of the video transmission terminal 1102 in the second embodiment is the same as the configuration illustrated in FIG. 5. However, they are different in that the communication control unit 502 transmits the transmission right acquisition category limitation command for limiting the transmission right acquisition category to the external terminal 1101 by way of the wireless communication unit 506 and the antenna 507 so that a category having lower priority than the transmission right acquisition category to be used when video data is transmitted to the video reception terminal 1103 is provided, and the storage unit 304 stores the transmission right acquisition category and a parameter value prescribed in each category.

In addition, although some of the operations of the video transmission terminal 1102 in the second embodiment are the same as those described in the first embodiment, the operations of steps S1401 and S1402 are different from those described in the first embodiment. Hereinafter, the operation of each step will be described.

Step S1401 is a process in which, when it is determined that the video transmission terminal 1102 has been connected in the dedicated video transmission path in step S603, the terminal control unit 501 issues the transmission right acquisition category limitation notification to the communication control unit 502 and the communication control unit 502 transmits the transmission right acquisition category limitation command to the external terminal 1101 by way of the wireless communication unit 506 and the antenna 507 upon receiving the transmission right acquisition category limitation notification. The transmission right acquisition category limitation command transmitted in step S1401 includes at least transmission right acquisition category limitation information for causing the priority of the transmission right acquisition category to be used when data is transmitted from the external terminal 1101 to the video transmission terminal 1102 to be limited to priority less than or equal to that of the transmission right acquisition category to be used when video data is transmitted from the video transmission terminal 1102 to the video reception terminal 1103.

For example, when the transmission right acquisition category to be used when the video transmission terminal 1102 transmits video data to the video reception terminal 1103 is Video, the transmission right acquisition category limitation command for causing the transmission right acquisition category to be limited so that the transmission right acquisition category up to Best Effort is used is transmitted to the external terminal 1101.

Step S1402 is a process in which, when the disconnection of the dedicated video transmission path 1105 has been completed in step S612, the terminal control unit 501 issues a transmission right acquisition category limitation release notification to the communication control unit 502 and the communication control unit 502 transmits a transmission right acquisition category limitation command to the external terminal 1101 by way of the wireless communication unit 506 and the antenna 507 upon receiving the transmission right acquisition category limitation release notification. The transmission right acquisition category limitation command transmitted in step S1402 includes at least transmission right acquisition category limitation information for releasing the limitation of the transmission right acquisition category to be used when data is transmitted from the external terminal 1101 to the video transmission terminal 1102.

The configuration and operation of the video reception terminal 1103 in the second embodiment are the same as those of the video reception terminal 103 in the first embodiment.

Although the external terminal 1101 causes communication in the dedicated video transmission path 1105 to be preferentially performed by setting the transmission right acquisition waiting time based on the transmission right acquisition category corresponding to priority less than or equal to priority of an upper limit of the transmission right acquisition category indicated by the transmission right acquisition category limitation information based on reception of a transmission right acquisition category including the transmission right acquisition category limitation information in the second embodiment, the transmission right acquisition category of the external terminal 1101 is set to lowest priority and the video transmission terminal 1102 limits its own transmission right acquisition category to only highest priority, so that almost all bands may be substantially allocated to communication in the dedicated video transmission path 1105.

According to the second embodiment as described above, when data is transmitted using the dedicated non-video transmission path 1104 between the video transmission terminal 1102 and the external terminal 1101 and video data is transmitted using the dedicated video transmission path 1105 between the video transmission terminal 1102 and the video reception terminal 1103, the transmission right acquisition category limitation command for designating the upper limit of the transmission right acquisition category is transmitted from the video transmission terminal 1102 to the external terminal 1101. Thereby, in the external terminal 1101, the transmission right acquisition category is changed to have lower priority than the transmission right acquisition category set in the video transmission terminal 1102. Therefore, in the overall wireless communication system including the video transmission terminal 1102 serving as the access point (base station), it is possible to preferentially transmit data having a real time property.

In addition, when the connection of the dedicated video transmission path 1105 between the video transmission terminal 1102 and the video reception terminal 1103 has been disconnected, the transmission right acquisition category limitation command for releasing the limitation of the transmission right acquisition category of the external terminal 1101 is transmitted to the external terminal 1101. Therefore, the limitation of the transmission right acquisition category is released in the external terminal 1101. Therefore, after the video data transmission with higher priority than other data transmissions has ended, it is possible to release the limitation of the transmission right acquisition category in the other data transmissions.

Third Embodiment

Next, the third embodiment of the present invention will be described. The third embodiment is a modified example of the first embodiment. FIGS. 15A, 15B, and 15C illustrate examples of a dedicated video transmission path priority system in which, when the transmission right acquisition category is preset and the external terminal 1501 and the video transmission terminal 1502 share the transmission right acquisition category, the video transmission terminal 1502 generates a new transmission right acquisition category with highest priority and communication between the video transmission terminal 1502 and the video reception terminal 1503 is preferentially performed by transmitting data in the dedicated video transmission path 1505 from the video transmission terminal 1502 to the video reception terminal 1503 using the new transmission right acquisition category. The new transmission right acquisition category will be described later.

In examples illustrated in FIGS. 15A, 15B, and 15C, communication states of respective terminals when the video transmission terminal 1502 and the video reception terminal 1503 have established the connection in the dedicated video transmission path 1505 in an environment in which the external terminal 1501 and the video transmission terminal 1502 have established the connection in the dedicated non-video transmission path 1504 by designating the video transmission terminal 1502 as the access point and designating the external terminal 1501 as the station in a network constructed by the video transmission terminal 1502 are illustrated. In the examples illustrated in FIGS. 15A, 15B, and 15C, the video transmission terminal 1502 generates a new transmission right acquisition category having higher priority than a preset transmission right acquisition category and transmits video data to the video reception terminal 1503 using the new transmission right acquisition category. Therefore, an opportunity for the external terminal 1501 to acquire the right to transmit is reduced and communication between the video transmission terminal 1502 and the video reception terminal 1503 has priority. That is, a probability of the video transmission terminal 1502 acquiring the right to transmit is higher than a probability of the external terminal 1501 acquiring the right to transmit.

FIG. 15A illustrates a state in which, in a network constructed by the video transmission terminal 1502, the external terminal 1501 and the video transmission terminal 1502 have established a connection in the dedicated non-video transmission path 1504, and the video transmission terminal 1502 and the video reception terminal 1503 have established a connection in the dedicated video transmission path 1505.

FIG. 15B illustrates a state in which, in a network constructed by the video transmission terminal 1502, the external terminal 1501 and the video transmission terminal 1502 have established a connection in the dedicated non-video transmission path 1504, the video transmission terminal 1502 and the video reception terminal 1503 have established a connection in the dedicated video transmission path 1505, the video transmission terminal 1502 generates a new transmission right acquisition category, and the transmission right acquisition category to be used when the video transmission terminal 1502 transmits video data to the video reception terminal 1503 is set to the new transmission right acquisition category.

FIG. 15C illustrates a state in which, in a network constructed by the video transmission terminal 1502, the external terminal 1501 and the video transmission terminal 1502 have established a connection in the dedicated non-video transmission path 1504, the video transmission terminal 1502 and the video reception terminal 1503 have established a connection in the dedicated video transmission path 1505, and the video transmission terminal 1502 transmits video data to the video reception terminal 1503 in a new transmission right acquisition category, so that an opportunity for the external terminal 1501 to acquire the right to transmit is reduced and communication between the video transmission terminal 1502 and the video reception terminal 1503 has priority.

The new transmission right acquisition category will be described using FIG. 16. The new transmission right acquisition category is a transmission right acquisition category in which a parameter of each of the AIFS, the CW, and the TXOP is set to more preferentially have the right to transmit than other transmission right acquisition categories prescribed in the communication protocol of the related art. For example, the new transmission right acquisition category in FIG. 16 is Best Priority having highest priority. Because setting values of the AIFS and the CW are set to be less than setting values of the AIFS and the CW of other transmission right acquisition categories, the transmission right acquisition waiting time becomes short. In addition, because substantially the same magnitude value as that of Video is set for the TXOP, a transmission-enabled period becomes long. That is, it is possible to perform more preferential data transmission when the new transmission right acquisition category is used than when other transmission right acquisition categories are used.

Because control of data transmission by the transmission right acquisition waiting time determined by the AIFS and the CW is transmission control of a data link level of wireless communication, control of data transmission by the new transmission right acquisition category is also transmission control of the data link level.

Figure 17:
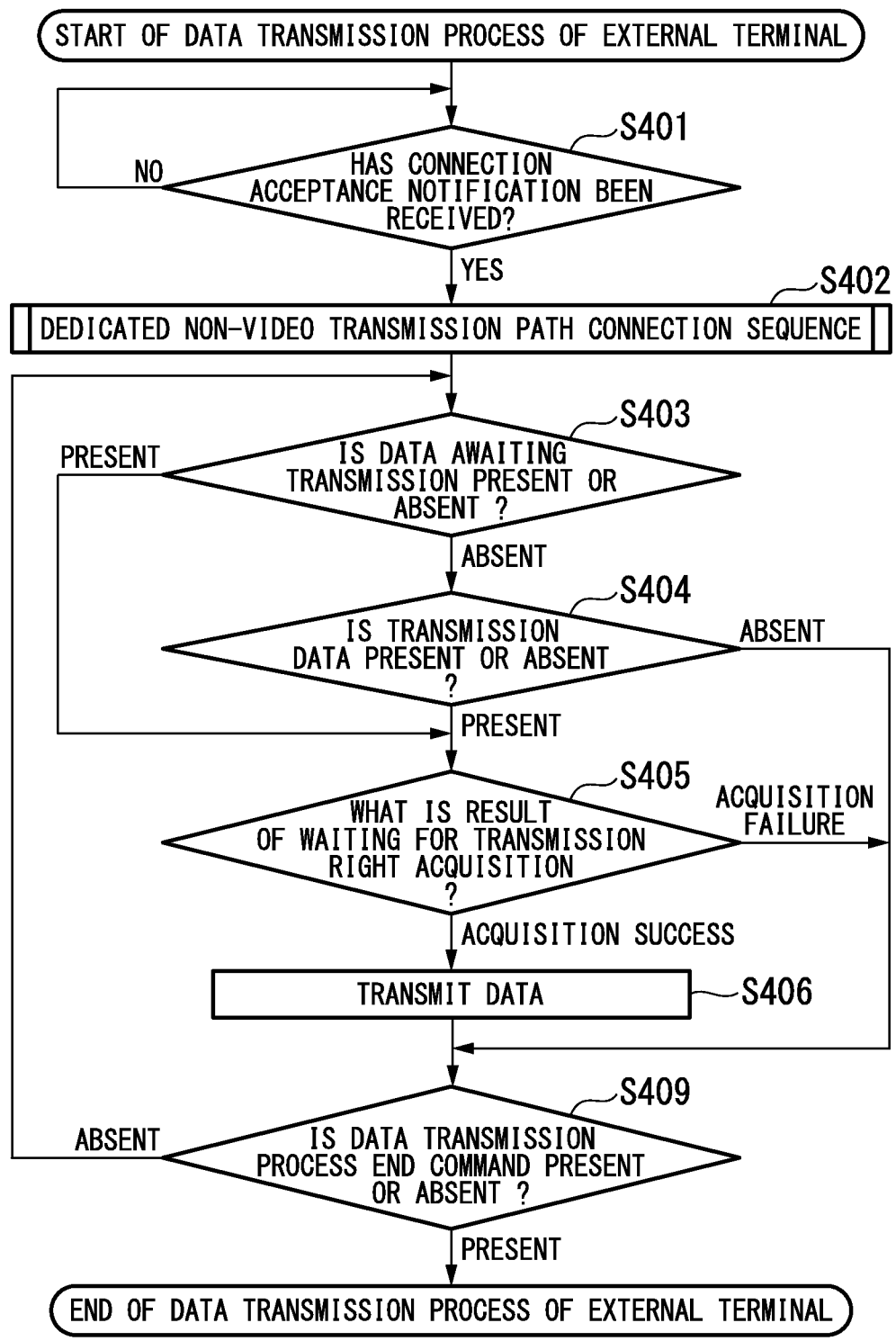
FIG. 17 is a flowchart illustrating a procedure of an operation of an external terminal in the third embodiment of the present invention.

FIG. 17 illustrates an operation of the external terminal 1501. The operation of the external terminal 1501 will be described using FIG. 17.

Also, part of the configuration of the external terminal 1501 in the third embodiment is the same as the configuration illustrated in FIG. 3. However, they are different in that the communication control unit 302 changes the transmission right acquisition waiting time of the external terminal 1501 according to the parameter prescribed in the transmission right acquisition category and the storage unit 304 stores the transmission right acquisition category and the parameter value prescribed in each category.

As illustrated in FIG. 17, the external terminal 1501 in the third embodiment does not perform a process of determining whether the transmission right acquisition waiting time change command has been received shown in step S407 and a process of changing the transmission right acquisition waiting time shown in step S408 in the first embodiment. In addition, the transmission right acquisition waiting process shown in step S405 in the operation of the external terminal 1501 in the third embodiment is different from the transmission right acquisition waiting process in the first embodiment. In step S405, the communication control unit 302 acquires the right to transmit based on the transmission right acquisition waiting time set in the wireless communication unit 305 based on a type and real time property of data to be transmitted.

Figure 18:
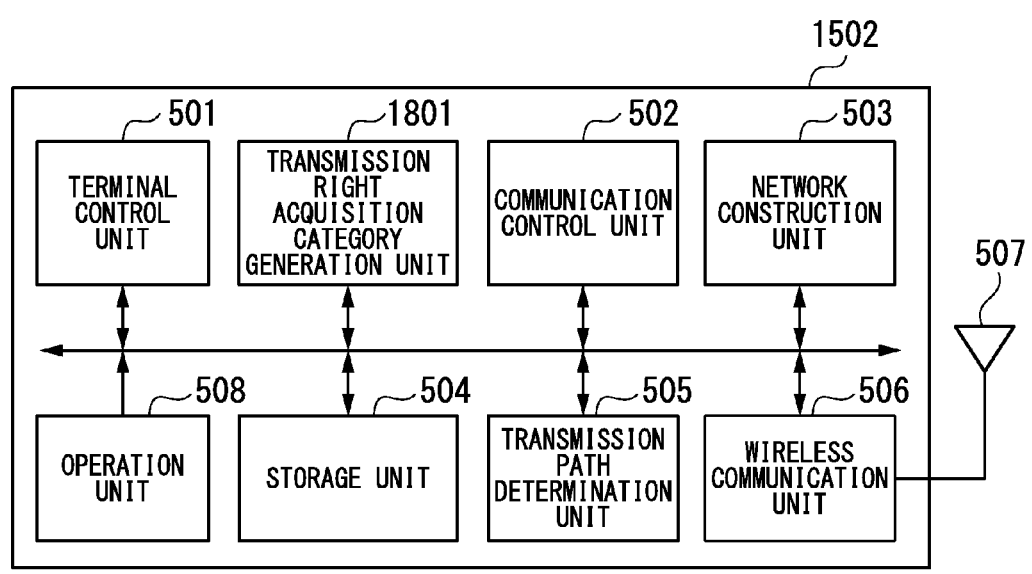
FIG. 18 is a block diagram illustrating a configuration of a video transmission terminal in the third embodiment of the present invention.

FIG. 18 illustrates a configuration of the video transmission terminal 1502. The configuration of the video transmission terminal 1502 will be described using FIG. 18.

The video transmission terminal 1502 in the third embodiment has a transmission right acquisition category generation unit 1801, which generates a new transmission right acquisition category, in addition to the configuration of the video transmission terminal 102 in the first embodiment shown in FIG. 5. In addition, the video transmission terminal 1502 in the third embodiment is different from the video transmission terminal 102 in the first embodiment in that the communication control unit 502 sets the transmission right acquisition waiting time in the wireless communication unit 506 based on the transmission right acquisition category and the new transmission right acquisition category stored in the storage unit 504 and the storage unit 504 further stores a transmission right acquisition category prescribed in the communication protocol of the related art and a new transmission right acquisition category generated by the transmission right acquisition category generation unit 1801.

Figure 19:
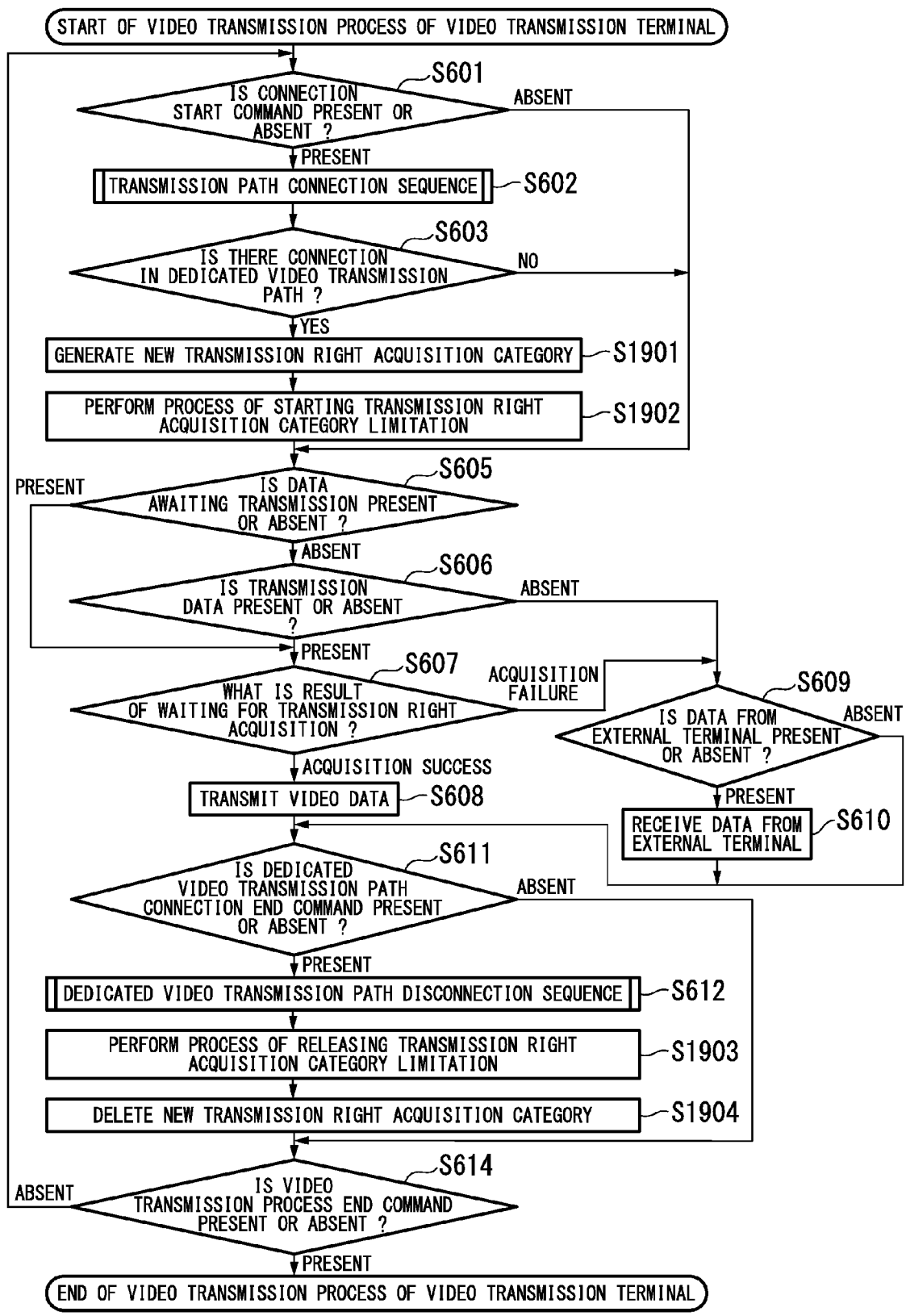
FIG. 19 is a flowchart illustrating a procedure of an operation of the video transmission terminal in the third embodiment of the present invention.

FIG. 19 illustrates an operation of the video transmission terminal 1502. The operation of the video transmission terminal 1502 will be described using FIG. 19.

Although some of operations of the video transmission terminal 1502 in the third embodiment are the same as those described in the first embodiment, the operations of steps S1901 to S1904 are different from those described in the first embodiment. Hereinafter, the operation of each step will be described.

Step S1901 is a process to be performed if the transmission right acquisition category generation unit 1801 receives a new transmission right acquisition category generation command after the new transmission right acquisition category generation command is issued from the terminal control unit 501 to the transmission right acquisition category generation unit 1801 when it is determined that a connection in the dedicated video transmission path 1505 has been made in step S603. In step S1901, the transmission right acquisition category generation unit 1801 newly generates the transmission right acquisition category, which is more preferential than other transmission right acquisition categories, and stores the newly generated transmission right acquisition category in the storage unit 504. Also, a new transmission right acquisition category generation command in the third embodiment is a command for causing the transmission right acquisition category generation unit 1801 to perform a process of generating the new transmission right acquisition category.

Step S1902 is a process to be performed after the new transmission right acquisition category has been generated and stored in the storage unit 504 in step S1901. In step S1902, upon receiving a new transmission right acquisition category setting request issued from the terminal control unit 501 to the communication control unit 502, the communication control unit 502 sets a transmission right acquisition waiting time based on the generated transmission right acquisition category for the wireless communication unit 506. Also, the new transmission right acquisition category setting request in the third embodiment is a command for causing the wireless communication unit 506 to set the transmission right acquisition waiting time based on a parameter of the new transmission right acquisition category for the communication control unit 502. In addition, although the new transmission right acquisition category is a transmission right acquisition category not prescribed in the communication protocol of the related art, the set transmission right acquisition waiting time is only different from the transmission right acquisition waiting time set by the transmission right acquisition category prescribed in the communication category of the related art.

Step S1903 is a process to be performed after the process of disconnecting the dedicated video transmission path 1505 shown in step S612 has been completed. In step S1903, based on a transmission right acquisition category limitation release request issued from the terminal control unit 501 to the communication control unit 502, the communication control unit 502 sets the transmission right acquisition waiting time based on a transmission right acquisition category other than the new transmission right acquisition category for the wireless communication unit 506. Also, the transmission right acquisition category limitation release request in the third embodiment is a command for causing the wireless communication unit 506 to set the transmission right acquisition waiting time based on a parameter of the transmission right acquisition category other than the new transmission right acquisition category for the communication control unit 502.

Step S1904 is a process to be performed after a transmission right acquisition category limitation release process of step S1903 has been completed. In step S1904, the terminal control unit 501 deletes (erases) the new transmission right acquisition category stored in the storage unit 504.

A configuration and operation of the video reception terminal 1503 in the third embodiment are the same as the configuration and operation of the video reception terminal 103 in the first embodiment.

In addition, although the video transmission terminal 1502 causes communication in the dedicated video transmission path 1505 to be preferentially performed by newly generating the transmission right acquisition category having higher priority than other transmission right acquisition categories and further performing communication in the dedicated video transmission path 1505 based on a transmission right acquisition category having higher priority than other transmission right acquisition categories in the dedicated video transmission path 1505 in the third embodiment, the video transmission terminal 1502 may set both the values of the AIFS and the CW to values infinitely close to minimum values upon generating the new transmission right acquisition category and almost all bands may be substantially allocated to communication in the dedicated video transmission path 1505.

The video transmission terminal 1502 in the third embodiment corresponds to a wireless communication terminal in the present invention of a highest-order concept. For example, it is possible to configure the wireless communication terminal of the present invention by designating the wireless communication unit 506 as a wireless communication unit in the wireless communication terminal of the present invention, designating the network construction unit 503 as a network construction unit in the wireless communication terminal of the present invention, and designating the communication control unit 502 as a communication control unit in the wireless communication terminal of the present invention.

According to the third embodiment as described above, when data transmission is performed using the dedicated non-video transmission path 1504 between the video transmission terminal 1502 and the external terminal 1501 and video data transmission is performed using the dedicated video transmission path 1505 between the video transmission terminal 1502 and the video reception terminal 1503, the video transmission terminal 1502 generates a new transmission right acquisition category having higher priority than the transmission right acquisition category prescribed in the communication protocol of the related art and sets the generated category in its own terminal. Therefore, it is possible to preferentially transmit data having a real time property in the overall wireless communication system including the video transmission terminal 1502 serving as the access point (base station).

In addition, when the connection of the dedicated video transmission path 1505 between the video transmission terminal 1502 and the video reception terminal 1503 has been disconnected, the new transmission right acquisition category of the video transmission terminal 1502 is released. Thereby, in the video transmission terminal 1502, the transmission right acquisition waiting time changed to be shorter than the transmission right acquisition waiting time set in the external terminal 1501 is changed to the transmission right acquisition waiting time based on the transmission right acquisition category prescribed in the communication protocol of the related art. Therefore, after video data transmission more preferentially performed than other data transmissions has ended, it is possible to return the transmission right acquisition category in the video data transmission to the original.

Fourth Embodiment

Next, the fourth embodiment of the present invention will be described. FIGS. 20A to 20D illustrate examples of a dedicated video transmission path priority system for limiting communication between an external terminal 2001 and a video transmission terminal 2002 and causing communication between the video transmission terminal 2002 and a video reception terminal 2003 to be preferentially performed by causing a transmission suppression instruction to be transmitted from the video transmission terminal 2002 to the external terminal 2001 when the video transmission terminal 2002 has already been connected to the external terminal 2001 in a dedicated non-video transmission path 2004 at a timing at which the video transmission terminal 2002 that transmits a video and the video reception terminal 2003 that receives and displays the video transmitted from the video transmission terminal 2002 have been connected in a dedicated video transmission path 2005.

The examples illustrated in FIGS. 20A to 20D illustrate communication states of respective terminals when the video transmission terminal 2002 and the video reception terminal 2003 have established a connection in the dedicated video transmission path 2005 in an environment in which the external terminal 2001 and the video transmission terminal 2002 have established a connection in the dedicated non-video transmission path 2004 by designating the video transmission terminal 2002 as the access point and designating the external terminal 2001 as the station in a network constructed by the video transmission terminal 2002. In the examples illustrated in FIGS. 20A to 20D, the video transmission terminal 2002 transmits a transmission instruction to the external terminal 2001 only when video data transmitted from the video transmission terminal 2002 to the video reception terminal 2003 has been buffered by only a predetermined amount (number of frames), so that data transmission of the external terminal 2001 is limited and communication between the video transmission terminal 2002 and the video reception terminal 2003 has priority. That is, a probability of the video transmission terminal 2002 acquiring the right to transmit is higher than a probability of the external terminal 2001 acquiring the right to transmit. Because the video transmission terminal 2002 may wait for video data to be transmitted if a sufficient amount of video data is buffered in the video reception terminal 2003, data is transmitted from the external terminal 2001 to the video transmission terminal 2002 using a waiting time.

Figure 20A:
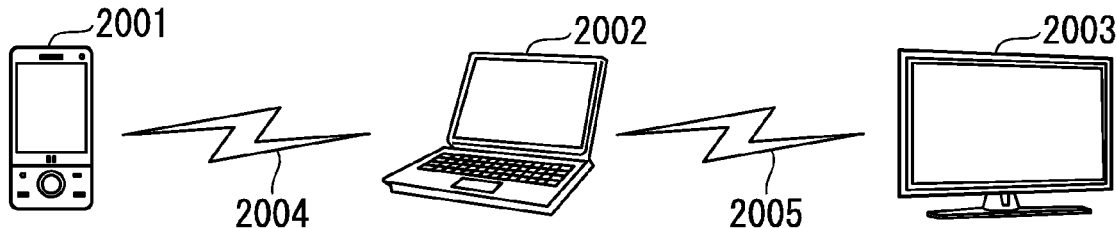
FIG. 20A is a reference diagram each illustrating a communication state in a system according to a fourth embodiment of the present invention.

FIG. 20A illustrates a state in which, in a network constructed by the video transmission terminal 2002, the external terminal 2001 and the video transmission terminal 2002 have established a connection in the dedicated non-video transmission path 2004 and the video transmission terminal 2002 and the video reception terminal 2003 have established a connection in the dedicated video transmission path 2005.

Figure 20B:
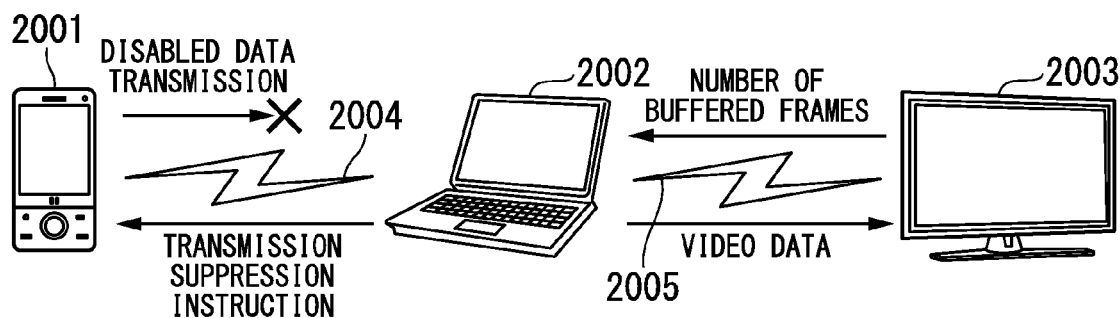
FIG. 20B is a reference diagram each illustrating a communication state in a system according to the fourth embodiment of the present invention.

FIG. 20B illustrates a state in which, in a network constructed by the video transmission terminal 2002, the external terminal 2001 and the video transmission terminal 2002 have established a connection in the dedicated non-video transmission path 2004, the video transmission terminal 2002 and the video reception terminal 2003 have established a connection in the dedicated video transmission path 2005, the video transmission terminal 2002 and the video reception terminal 2003 perform transmission of video data and transmission and reception of information about the number of buffered frames, and the video transmission terminal 2002 transmits a transmission suppression instruction (control data) to the external terminal 2001 during the information transmission and reception, so that communication between the external terminal 2001 and the video transmission terminal 2002 is limited.

Figure 20C:
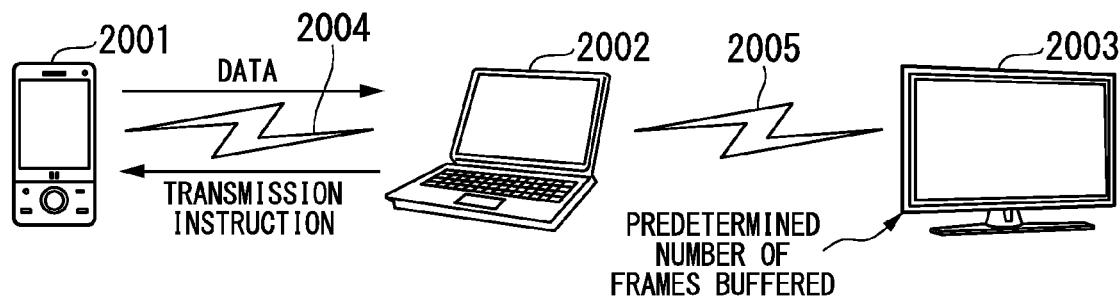
FIG. 20C is a reference diagram each illustrating a communication state in a system according to the fourth embodiment of the present invention.

FIG. 20C illustrates a state in which, in a network constructed by the video transmission terminal 2002, the external terminal 2001 and the video transmission terminal 2002 have established a connection in the dedicated non-video transmission path 2004, the video transmission terminal 2002 and the video reception terminal 2003 have established a connection in the dedicated video transmission path 2005, and further a transmission instruction is transmitted from the video transmission terminal 2002 to the external terminal 2001 and data is transmitted from the external terminal 2001 to the video transmission terminal 2002 in a state in which a predetermined number of frames for video data transmitted from the video transmission terminal 2002 to the video reception terminal 2003 have been buffered by the video reception terminal 2003.

Figure 20D:
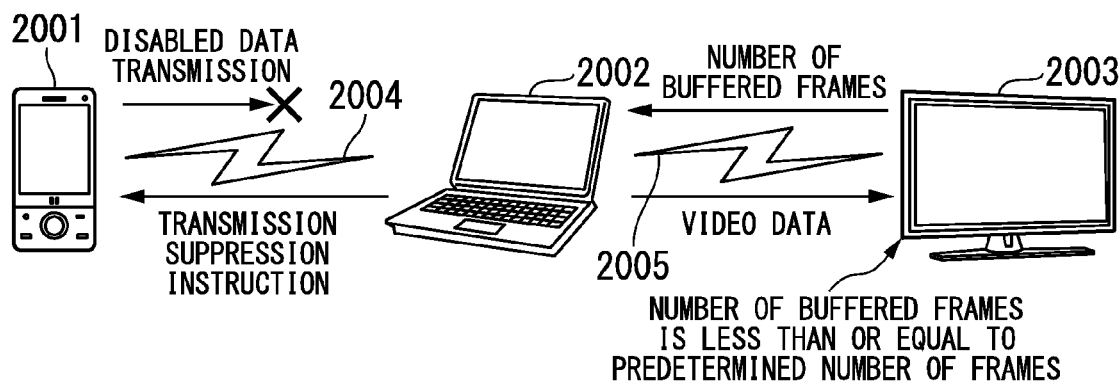
FIG. 20D is a reference diagram each illustrating a communication state in a system according to the fourth embodiment of the present invention.

FIG. 20D illustrates a state in which, in a network constructed by the video transmission terminal 2002, the external terminal 2001 and the video transmission terminal 2002 have established a connection in the dedicated non-video transmission path 2004, the video transmission terminal 2002 and the video reception terminal 2003 have established a connection in the dedicated video transmission path 2005, and further the video transmission terminal 2002 and the video reception terminal 2003 re-perform transmission of video data and transmission and reception of information about the number of buffered frames and communication between the external terminal 2001, and the video transmission terminal 2002 is limited during the transmission and reception, in a state in which data transmission from the external terminal 2001 to the video transmission terminal 2002 has been completed based on a transmission instruction of the video transmission terminal 2002.

Also, in the fourth embodiment, it is assumed that the above-described transmission instruction and transmission suppression instruction are made based on hybrid coordination function (HCF) control channel access (HCCA) defined in Institute of Electrical and Electronics Engineers (IEEE) 802.11e, and control of data transmission by HCCA serves as transmission control of a data link level of wireless communication.

Figure 21:
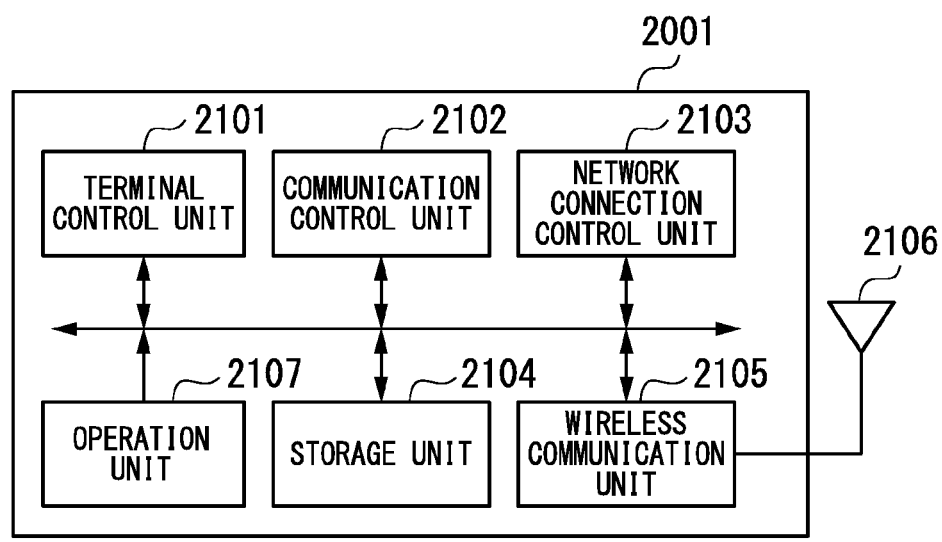
FIG. 21 is a block diagram illustrating a configuration of an external terminal in the fourth embodiment of the present invention.

FIG. 21 illustrates a configuration of the external terminal 2001. The configuration of the external terminal 2001 will be described using FIG. 21. The external terminal 2001 includes a terminal control unit 2101, a communication control unit 2102, a network connection control unit 2103, a storage unit 2104, a wireless communication unit 2105, an antenna 2106, and an operation unit 2107.

The terminal control unit 2101 controls an operation of the external terminal 2001. The communication control unit 2102 controls data transmission by way of the wireless communication unit 2105 and the antenna 2106 based on the transmission instruction or the transmission suppression instruction received from the video transmission terminal 102. The network connection control unit 2103 establishes a network connection in the dedicated non-video transmission path 2004 by way of the wireless communication unit 2105 and the antenna 2106. The storage unit 2104 stores data to be transmitted or the like. The wireless communication unit 2105 and the antenna 2106 communicate with the video transmission terminal 2002. The operation unit 2107 is a user interface which receives an input based on an operation performed by the user.

Figure 22:
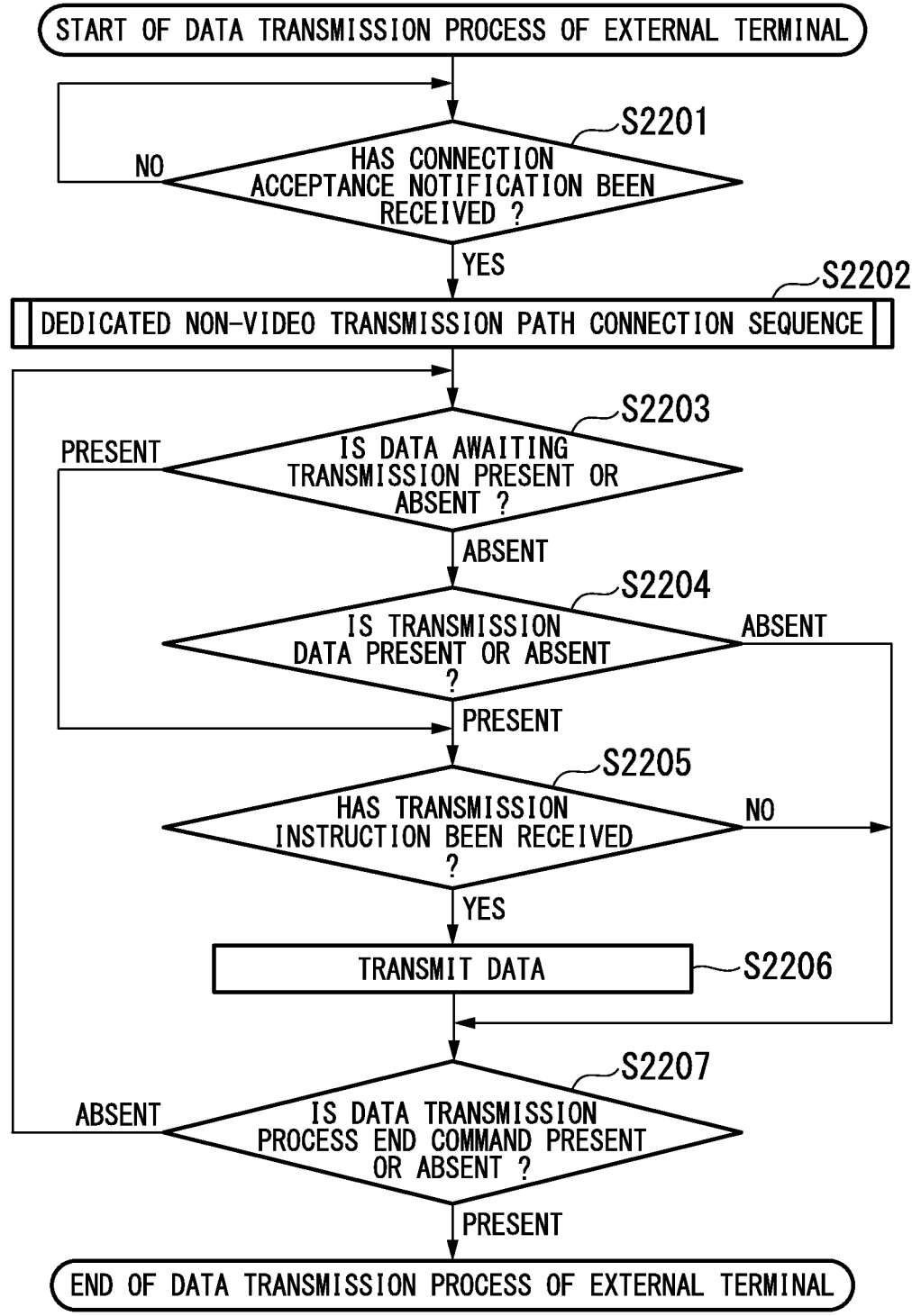
FIG. 22 is a flowchart illustrating a procedure of an operation of the external terminal in the fourth embodiment of the present invention.

FIG. 22 illustrates an operation of the external terminal 2001. The operation of the external terminal 2001 will be described using FIG. 22.

The terminal control unit 2101 starts a data transmission process of the external terminal using the activation of power of the external terminal 2001 through the operation of the operation unit 2107 as the trigger.

Although the data transmission process of the external terminal in the fourth embodiment is a process to be started using the activation of power of the external terminal 2001 as the trigger, the data transmission process may be started using an input of a start command for the data transmission process of the external terminal through the operation of the operation unit 2107 as the trigger. A start condition of the data transmission process of the external terminal is not limited to only the activation of power to the external terminal 2001 as long as the start condition does not depart from the scope of the present invention.

When the data transmission process of the external terminal is started, the terminal control unit 2101 issues a connection acceptance notification reception command, which is a command for causing the connection acceptance notification reception process to be performed, to the wireless communication unit 2105. Upon receiving the connection acceptance notification reception command, the wireless communication unit 2105 searches for whether a connection acceptance notification has been transmitted from the video transmission terminal 102 by way of the antenna 2106 (step S2201). The terminal control unit 2101 issues a connection acceptance notification reception completion notification to the terminal control unit 2101 after storing the connection acceptance notification in the storage unit 2104 when a connection acceptance notification has been transmitted, and re-performs a search of whether the connection acceptance notification has been transmitted shown in step S2201 after waiting for a fixed time when no connection acceptance notification has been transmitted.

Upon receiving the connection acceptance notification reception completion notification, the terminal control unit 2101 issues a dedicated non-video transmission path connection start command, which is a command for causing a connection sequence in the dedicated non-video transmission path 2004 to be started with the video transmission terminal 2002, to the communication control unit 2102. Upon receiving the dedicated non-video transmission path connection start command, the communication control unit 2102 starts the connection sequence in the dedicated non-video transmission path 2004 with the video transmission terminal 2002, and issues a connection completion notification for providing a notification indicating that a connection of the dedicated non-video transmission path 2004 has been completed to the terminal control unit 2101 (step S2202).

Upon receiving the connection completion notification, the terminal control unit 2101 determines whether there is data awaiting transmission in the wireless communication unit 2105 (step S2203). The terminal control unit 2101 transitions to a process of determining reception of the transmission instruction shown in step S2205 when there is data awaiting transmission, and transitions to a process of determining the presence/absence of transmission data shown in step S2204 when there is no data awaiting transmission. The data awaiting transmission in the fourth embodiment is data to be buffered in the wireless communication unit 2105 when the transmission suppression instruction has been received in step S2205.

When it is determined that there is no data awaiting transmission in the wireless communication unit 2105 in step S2203, the terminal control unit 2101 determines whether data to be transmitted to the video transmission terminal 2002 is stored in the storage unit 2104 (step S2204). The terminal control unit 2101 stores transmission data in the wireless communication unit 2105 and transitions to the process of determining the reception of the transmission instruction shown in step S2205 when data to be transmitted to the video transmission terminal 2002 is stored, and transitions to a process of determining whether a data transmission process end command has been issued shown in step S2207 when no data to be transmitted to the video transmission terminal 2002 is stored.

When it is determined that there is data awaiting transmission in the wireless communication unit 2105 in step S2203 or when it is determined that the data to be transmitted to the video transmission terminal 2002 is stored in the storage unit 2104 in step S2204, the terminal control unit 2101 issues a data transmission command to the communication control unit 2102. Upon receiving the data transmission command, the communication control unit 2102 determines whether the transmission instruction has been received from the video transmission terminal 2002 by way of the wireless communication unit 2105 and the antenna 2106 (step S2205). The terminal control unit 2101 transitions to a data transmission process shown in step S2206 when the transmission instruction has been received, and issues a data transmission completion notification indicating that the data transmission has failed to the terminal control unit 2101 when the transmission suppression instruction has been received instead of the transmission instruction.

When it is determined that the transmission instruction has been received from the video transmission terminal 2002 in step S2205, the communication control unit 2102 controls the wireless communication unit 2105 and the antenna 2106 to transmit data buffered in the wireless communication unit 2105 to the video transmission terminal 2002, and issues a data transmission completion notification indicating that the data transmission has succeeded to the terminal control unit 2101 (step S2206).

When it is determined that no data to be transmitted to the video transmission terminal 2002 is stored in step S2204 or when the data transmission completion notification issued in steps S2205 or S2206 has been received, the terminal control unit 2101 determines whether a data transmission process end command has been issued (step S2207). The terminal control unit 2101 ends the data transmission process of the external terminal when the data transmission process end command has been issued, and re-performs the process from the process of determining whether there is data awaiting transmission shown in step S2203 when no data transmission process end command has been issued.

Although the data transmission process end command in the fourth embodiment is a command to be issued using a disconnection of the dedicated non-video transmission path 2004 between the external terminal 2001 and the video transmission terminal 2002 as the trigger, the command may be issued using an input of the data transmission process end command through the operation of the operation unit 2107 as the trigger. As long as a condition of issuance of the data transmission process end command does not depart from the scope of the present invention, the condition is not limited to only the disconnection of the dedicated non-video transmission path 2004.

Figure 23:
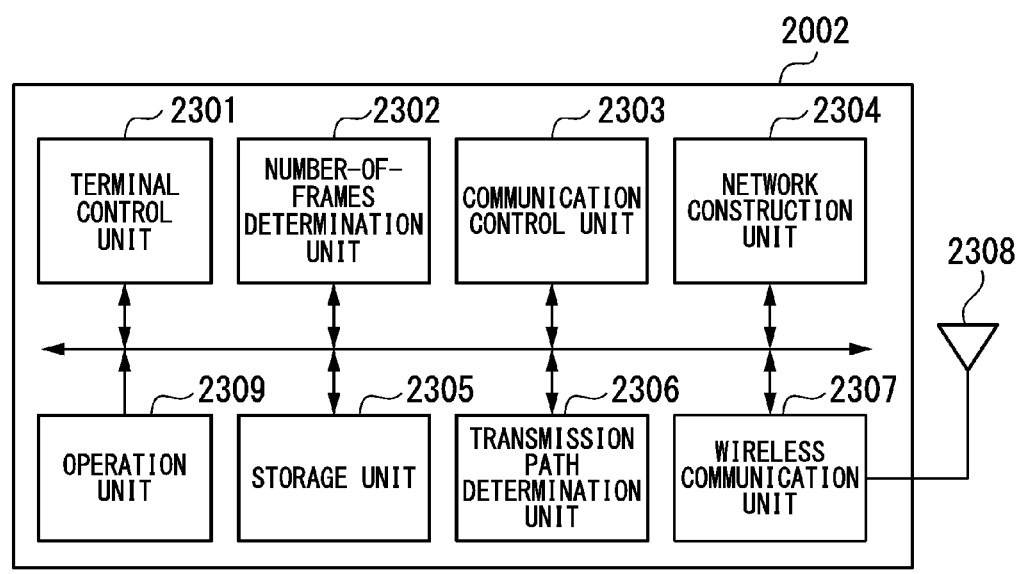
FIG. 23 is a block diagram illustrating a configuration of a video transmission terminal in the fourth embodiment of the present invention.

FIG. 23 illustrates a configuration of the video transmission terminal 2002. The configuration of the video transmission terminal 2002 will be described using FIG. 23. The video transmission terminal 2002 includes a terminal control unit 2301, a number-of-frames determination unit 2302, a communication control unit 2303, a network construction unit 2304, a storage unit 2305, a transmission path determination unit 2306, a wireless communication unit 2307, an antenna 2308, and an operation unit 2309.

The terminal control unit 2301 controls an operation of the video transmission terminal 2002. The number-of-frames determination unit 2302 determines whether video data of a predetermined number of frames has been buffered in the video reception terminal 2003 based on information about the number of buffered frames including at least information indicating the number of frames of video data buffered in the video reception terminal 2003 received from the video reception terminal 2003. The communication control unit 2303 transmits a transmission instruction and a transmission suppression instruction to the external terminal 2001 by way of the wireless communication unit 2307 and the antenna 2308, and controls data transmission by way of the wireless communication unit 2307 and the antenna 2308. The network construction unit 2304 constructs a network in which the external terminal 2001 and the video reception terminal 2003 can participate, establishes a connection of the dedicated non-video transmission path 2004 with the external terminal 2001 and establishes a connection of the dedicated video transmission path 2005 with the video reception terminal 2003.

The storage unit 2305 stores data received from the external terminal 2001 by way of the wireless communication unit 2307 and the antenna 2308 and video data to be transmitted to the video reception terminal 2003. The transmission path determination unit 2306 determines which of connections of the dedicated non-video transmission path 2004 and the dedicated video transmission path 2005 is a connection established by the network construction unit 2304 by way of the wireless communication unit 2307 and the antenna 2308. The wireless communication unit 2307 and the antenna 2308 wirelessly communicate with the external terminal 2001 and the video reception terminal 2003. The operation unit 2309 is a user interface which receives an input based on an operation performed by the user.

Figure 24:
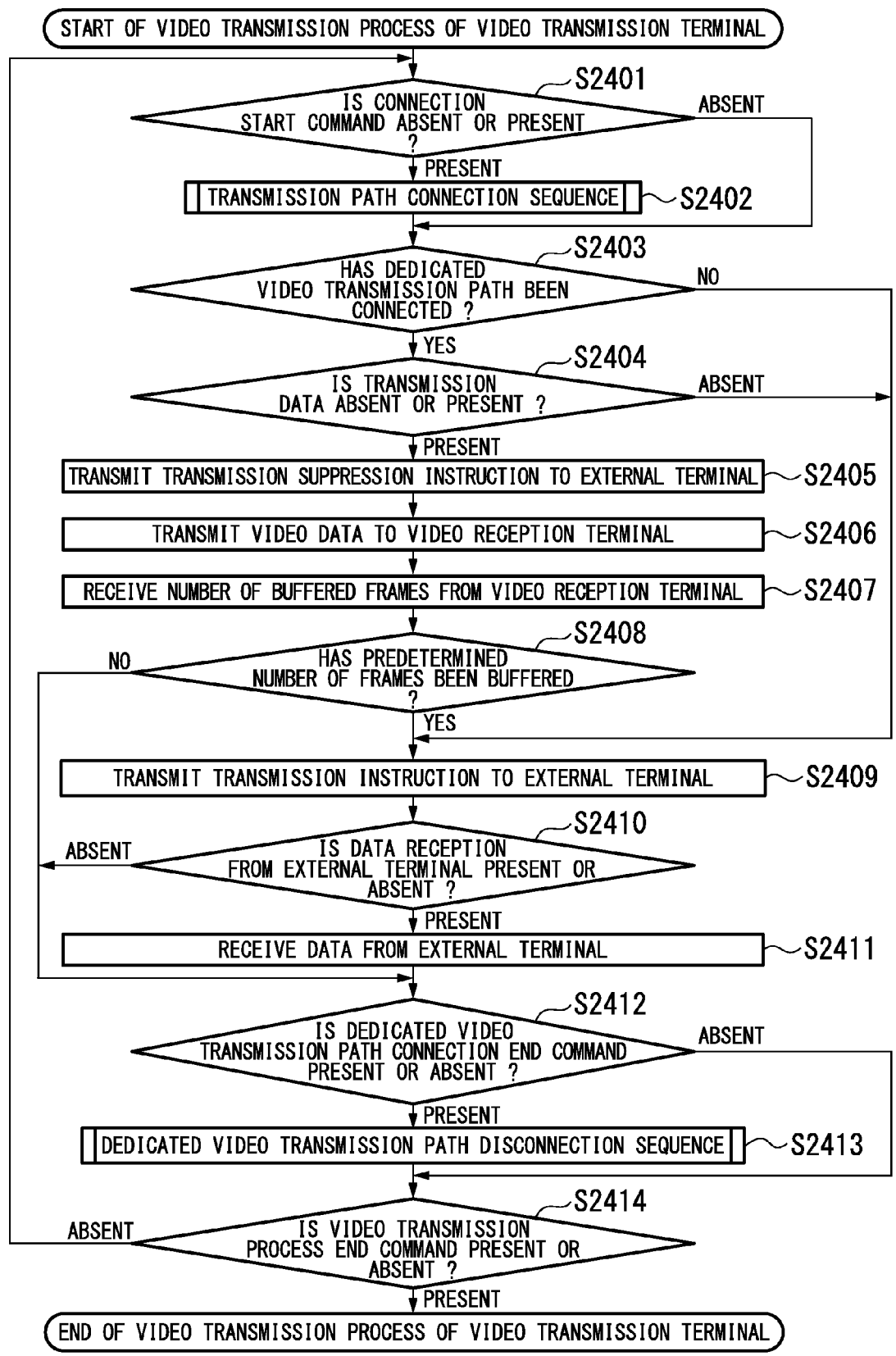
FIG. 24 is a flowchart illustrating a procedure of an operation of the video transmission terminal in the fourth embodiment of the present invention.

FIG. 24 illustrates an operation of the video transmission terminal 2002. The operation of the video transmission terminal 2002 will be described using FIG. 24.

The terminal control unit 2301 starts a data transmission process of the video transmission terminal using the activation of power of the video transmission terminal 2002 through an operation of the operation unit 2309 as the trigger.

Although the data transmission process of the video transmission terminal in the fourth embodiment is a process to be started using the activation of power of the video transmission terminal 2002 as the trigger, the data transmission process may be started using an input of a start command for the data transmission process of the video transmission terminal through the operation of the operation unit 2309 as the trigger in the state in which the connection of the dedicated non-video transmission path 2004 has been established. A start condition of the data transmission process of the video transmission terminal is not limited to only the activation of power to the video transmission terminal 2002 as long as the start condition does not depart from the scope of the present invention.

When the video transmission process of the video transmission terminal is started, the terminal control unit 2301 determines whether a connection start command has been issued (step S2401). The terminal control unit 2301 transitions to a transmission path connection process shown in step S2402 when the connection start command has been issued, and transitions to a process of determining whether the dedicated video transmission path 2005 has been connected shown in step S2403 when no connection start command has been issued.

Also, when the video transmission process of the video transmission terminal is started, the video transmission terminal 2002 in the fourth embodiment controls the network construction unit 2304 to construct a network using the video transmission terminal 2002 as the access point. In addition, when the video transmission process of the video transmission terminal is started and the network using the video transmission terminal 2002 as the access point is constructed, the video transmission terminal 2002 in the fourth embodiment starts cyclic transmission by multicasting a connection acceptance notification indicating that the video transmission terminal 2002 is in a connection reception state by way of the wireless communication unit 2307 and the antenna 2308.

In addition, the connection acceptance notification is information including at least an SSID of the network in which the network construction unit 2304 of the video transmission terminal 2002 has been constructed. In addition, the connection start command in the fourth embodiment is a command issued using reception of a dedicated non-video transmission path connection request or a dedicated video transmission path connection request as the trigger from the external terminal 2001 or the video reception terminal 2003 by way of the wireless communication unit 2307 and the antenna 2308.

When the connection start command has been issued in step S2401, the terminal control unit 2301 issues a transmission path connection sequence start command, which is a command for starting a transmission path connection sequence, to the network construction unit 2304. Upon receiving the transmission path connection sequence start command, the network construction unit 2304 performs a transmission path connection process with the external terminal 2001 or the video reception terminal 2003 transmitting a connection request to the video transmission terminal 2002 by way of the wireless communication unit 2307 and the antenna 2308 and simultaneously controls the transmission path determination unit 2306 to monitor a transmission path connection sequence. When a connection of a transmission path to the external terminal 2001 or the video reception terminal 2003 is completed, the network construction unit 2304 issues a connection completion notification to the terminal control unit 2301 (step S2402).

Also, simultaneously, when the connection of the transmission path is completed, the transmission path determination unit 2306 stores transmission path determination result information, which includes at least information indicating which of the dedicated non-video transmission path 2004 and the dedicated video transmission path 2005 is the connected transmission path, in the storage unit 2305.

When it is determined that no connection start command has been issued in step S2401 or when it is determined that the connection completion notification issued in step S2402 has been received, the terminal control unit 2301 determines whether the video transmission terminal 2002 has been connected to the dedicated video transmission path 2005 based on transmission path determination result information stored in the storage unit 2305 (step S2403). The terminal control unit 2301 transitions to a process of determining whether there is video data to be transmitted to the video reception terminal 2003 in the storage unit 2305 shown in step S2404 when it is determined that the video transmission terminal 2002 has been connected to the dedicated video transmission path 2005, and transitions to a process of transmitting the transmission instruction to the external terminal 2001 shown in step S2409 when it is determined that the video transmission terminal 2002 has not been connected to the dedicated video transmission path 2005.

When it is determined that the video transmission terminal 2002 has been connected to the dedicated video transmission path 2005 in step S2403, the terminal control unit 2301 determines whether there is video data to be transmitted to the video reception terminal 2003 in the storage unit 2305 (step S2404). The terminal control unit 2301 stores the video data to be transmitted in the wireless communication unit 2307 and transitions to a process of transmitting the transmission suppression instruction to the external terminal shown in step S2405 when there is video data to be transmitted in the video reception terminal 2003, and transitions to a process of transmitting the transmission instruction to the external terminal 2001 shown in step S2409 when there is no video data to be transmitted to the video reception terminal 2003.

When it is determined that there is video data to be transmitted to the video reception terminal 2003 in step S2404, the terminal control unit 2301 issues a data transmission suppression instruction transmission command to the communication control unit 2303. Upon receiving the data transmission suppression instruction transmission command, the communication control unit 2303 controls the wireless communication unit 2307 and the antenna 2308 to transmit the data transmission suppression instruction to the external terminal 2001, and issues a data transmission suppression instruction transmission completion notification to the terminal control unit 2301 (step S2405).

Upon receiving the data transmission suppression instruction transmission completion notification issued in step S2405, the terminal control unit 2301 issues a video data transmission command to the wireless communication unit 2307. Upon receiving the video data transmission command, the wireless communication unit 2307 transmits video data stored in the wireless communication unit 2307 to the video reception terminal 2003 by way of the antenna 2308, and issues a video data transmission completion notification to the terminal control unit 2031 (step S2406).

Upon receiving the data transmission completion notification issued in step S2406, the terminal control unit 2301 issues a number-of-buffered-frames information reception command for causing number-of-buffered-frames information to be received to the wireless communication unit 2307. Upon receiving the number-of-buffered-frames information reception command, the wireless communication unit 2307 issues a number-of-buffered-frames information reception completion notification to the terminal control unit 2301 after receiving the number-of-buffered-frames information from the video reception terminal 2003 by way of the antenna 2308 and storing the received information in the storage unit 2305 (step S2407).

Upon receiving the number-of-buffered-frames information reception completion notification, the terminal control unit 2301 determines whether the number of buffered frames indicated by the number-of-buffered-frames information stored in the storage unit 2305 is greater than or equal to the predetermined number of frames (step S2408). The terminal control unit 2301 transitions to a process of transmitting the transmission instruction to the external terminal 2001 shown in step S2409 when it is determined that the number of buffered frames is greater than or equal to the predetermined number of frames, and transitions to a process of determining whether a dedicated video transmission path connection end command has been issued shown in step S2412 when it is determined that the number of buffered frames is not greater than or equal to the predetermined number of frames (or that the number of buffered frames is less than the predetermined number of frames).

When it is determined that the video transmission terminal 2002 has not been connected to the dedicated video transmission path 2005 in step S2403 or when there is no video data to be transmitted to the video reception terminal 2003 in step S2404 or when it is determined that the number of buffered frames is greater than or equal to the predetermined number of frames in step S2408, the terminal control unit 2301 issues a data transmission instruction transmission command to the communication control unit 2303. Upon receiving the data transmission instruction transmission command, the communication control unit 2303 controls the wireless communication unit 2307 and the antenna 2308 to transmit the data transmission instruction to the external terminal 2001 and issues a data transmission instruction transmission completion notification to the terminal control unit 2301 (step S2409).

Upon receiving the data transmission instruction transmission completion notification issued in step S2409, the terminal control unit 2301 issues an external terminal transmission data reception command to the wireless communication unit 2307. Upon receiving the external terminal transmission data reception command, the wireless communication unit 2307 determines whether there is data to be transmitted from the external terminal 2001 to the video transmission terminal 2002 by way of the antenna 2308 (step S2410). The terminal control unit 2301 transitions to a process of receiving data from the external terminal 2001 shown in step S2411 when there is data, and issues an external terminal transmission data reception completion notification indicating that there is no data from the external terminal 2001 to the terminal control unit 2301 when there is no data.

When it is determined that there is data transmitted from the external terminal 2001 to the video transmission terminal 2002 in step S2411, the wireless communication unit 2307 issues an external terminal transmission data reception completion notification indicating that data has been received from the external terminal 2001 to the terminal control unit 2301 after receiving the data transmitted from the external terminal 2001 by way of the antenna 2308 and storing the received data in the storage unit 2305 (step S2411).

When it is determined that the number of buffered frames is not greater than or equal to the predetermined number of frames in step S2408 or when the external terminal transmission data reception completion notification issued in steps S2410 or S2411 has been received, the terminal control unit 2301 determines whether a dedicated video transmission path connection end command has been issued (step S2412). The terminal control unit 2301 transitions to a process of disconnecting the dedicated video transmission path 2005 shown in step S2413 when it is determined that the dedicated video transmission path connection end command has been issued, and transitions to a process of determining whether a video transmission process end command has been issued shown in step S2414 when it is determined that no dedicated video transmission path connection end command has been issued.

Although the dedicated video transmission path connection end command in the fourth embodiment is a command to be issued using the completion of the video data transmission as the trigger, the command may be issued using the input of a disconnection command of the dedicated video transmission path 2005 through the operation of the operation unit 2309 as the trigger in a state in which the connection of the dedicated video transmission path 2005 has been established. As long as an issuance condition of the dedicated video transmission path connection end command does not depart from the scope of the present invention, the issuance condition is not limited to only the transmission completion of the video data.

When the dedicated video transmission path connection end command has been issued in step S2412, the terminal control unit 2301 issues a dedicated video transmission path disconnection sequence start command, which is a command for causing a process of disconnecting the dedicated video transmission path 2005 to be started, to the network construction unit 2304. Upon receiving the dedicated video transmission path disconnection sequence start command, the network construction unit 2304 starts a process of disconnecting the dedicated video transmission path 2005 with the video reception terminal 2003 by way of the wireless communication unit 2307 and the antenna 2308. When the process of disconnecting the dedicated video transmission path 2005 with the video reception terminal 2003 is completed, the network construction unit 2304 issues a dedicated video transmission path disconnection process completion notification to the terminal control unit 2301 (step S2413).

When it is determined that no dedicated video transmission path connection end command has been issued in step S2412 or when the dedicated video transmission path disconnection process completion notification has been received in step S2413, the terminal control unit 2301 determines whether a video transmission process end command has been issued (step S2414). The terminal control unit 2301 ends the video transmission terminal video transmission process when the video transmission process end command has been issued, and re-performs the process from the process of determining whether a connection start command has been issued shown in step S2401.

Although the video transmission process end command in the fourth embodiment is a command to be issued using the disconnection of the dedicated non-video transmission path 2004 between the external terminal 2001 and the video transmission terminal 2002 as the trigger, the command may be issued using the input of the end command of the video transmission process of the video transmission terminal through the operation of the operation unit 2309 as the trigger. The issuance condition of the video transmission process end command is not limited to only the disconnection of the dedicated non-video transmission path 2004 as long as the issuance condition does not depart from the scope of the embodiment of the present invention.

Figure 25:
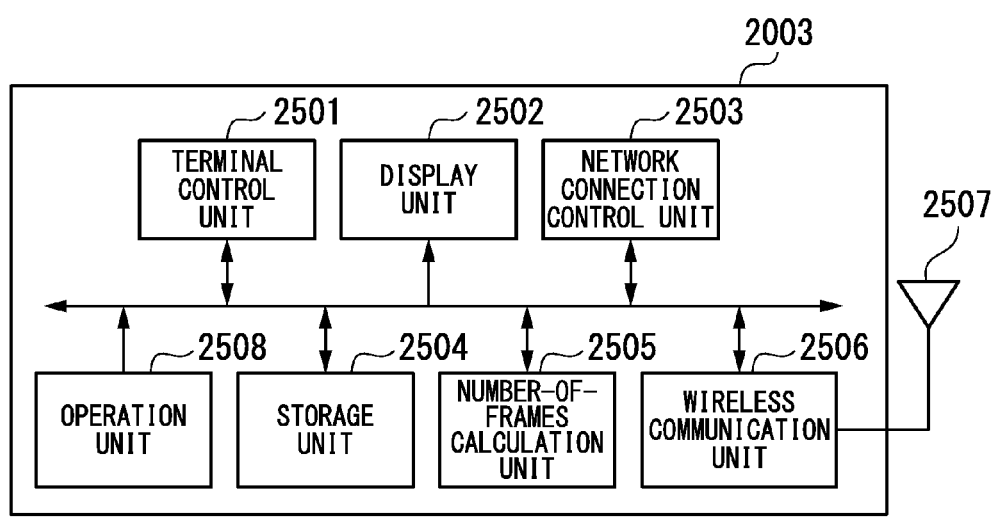
FIG. 25 is a block diagram illustrating a configuration of a video reception terminal in the fourth embodiment of the present invention.

FIG. 25 illustrates a configuration of the video reception terminal 2003. The configuration of the video reception terminal 2003 will be described using FIG. 25. The video reception terminal 2003 includes a terminal control unit 2501, a display unit 2502, a network connection control unit 2503, a storage unit 2504, a number-of-frames calculation unit 2505, a wireless communication unit 2506, an antenna 2507, and an operation unit 2508.

The terminal control unit 2501 controls an operation of the video reception terminal 2003. The display unit 2502 displays a video based on video data stored in the storage unit 2504 received from the video transmission terminal 2002. The network connection control unit 2503 establishes a connection in the dedicated video transmission path 2005 with the video transmission terminal by way of the wireless communication unit 2506 and the antenna 2507. The storage unit 2504 stores video data and the number of buffered frames received from the video transmission terminal 2002. The number-of-frames calculation unit 2505 compares the total number of frames of the video data received from the video transmission terminal 2002 to the number of frames displayed by the display unit 2502 (the number of displayed frames), and calculates the number of buffered frames. The wireless communication unit 2506 and the antenna 2507 wirelessly communicate with the video transmission terminal 2002. The operation unit 2508 is a user interface which receives an input based on an operation performed by the user.

Figure 26:
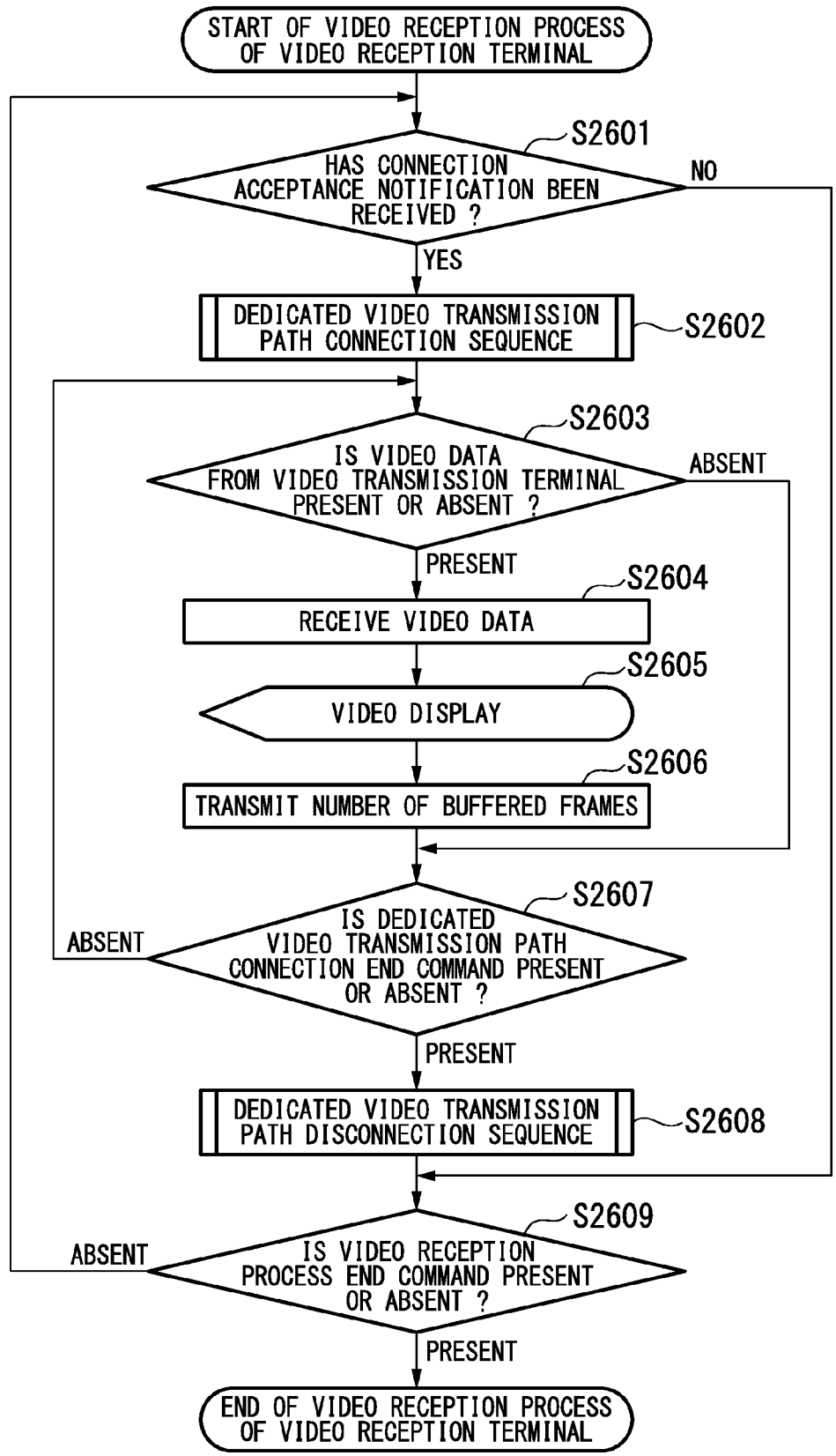
FIG. 26 is a flowchart illustrating a procedure of an operation of the video reception terminal in the fourth embodiment of the present invention.

FIG. 26 illustrates an operation of the video reception terminal 2003. The operation of the video reception terminal 2003 will be described using FIG. 26.

The terminal control unit 2501 starts a video reception process of the video reception terminal using the activation of power of the terminal through the operation of the operation unit 2508 as the trigger.

Although the video reception process of the video reception terminal in the fourth embodiment is a process to be started using the activation of power of the terminal as the trigger, the video reception process of the video reception terminal may be started using an input of a start command for the video reception process of the video reception terminal through the operation of the operation unit 2508 as the trigger. A start condition of the video reception process of the video reception terminal is not limited to only the activation of power to the video reception terminal as long as the start condition does not depart from the scope of the present invention.

When the video reception process of the video reception terminal is started, the terminal control unit 2501 issues a connection acceptance notification reception start command, which is a command for causing a connection acceptance notification to be received, to the wireless communication unit 2506. Upon receiving the connection acceptance notification reception start command, the wireless communication unit 2506 performs a search of whether the connection acceptance notification has been transmitted from the video transmission terminal 2002 by way of the antenna 2507 (step S2601). The wireless communication unit 2506 issues a connection acceptance notification reception completion notification to the terminal control unit 2501 after storing the received connection acceptance notification in the storage unit 2504 when the connection acceptance notification has been transmitted, and issues a connection acceptance notification reception failure notification to the terminal control unit 2501 when no connection acceptance notification has been transmitted.

Upon receiving the connection acceptance notification reception completion notification issued in step S2601, the terminal control unit 2501 issues a dedicated video transmission path connection sequence start command, which is a command for causing a process of connecting the dedicated video transmission path 2005 to be started, to the network connection control unit 2503. Upon receiving the dedicated video transmission path connection sequence start command, the network connection control unit 2503 performs the process of connecting the dedicated video transmission path 2005 with the video transmission terminal 2002 by way of the wireless communication unit 2506 and the antenna 2507, and starts the connection of the dedicated video transmission path 2005 with the video transmission terminal 2002. When the process of connecting the dedicated video transmission path 2005 with the video transmission terminal 2002 is completed, the network connection control unit 2503 issues a dedicated video transmission path connection process completion notification to the terminal control unit 2501 (step S2602).

Upon receiving the dedicated video transmission path connection process completion notification, the terminal control unit 2501 issues a video data reception determination process start command for causing a process of determining whether there is data transmitted from the video transmission terminal 2002 to the video reception terminal 2003 to be performed to the wireless communication unit 2506.

Upon receiving the video data reception determination process start command, the wireless communication unit 2506 determines whether there is video data transmitted from the video transmission terminal 2002 to the video reception terminal 2003 by way of the antenna 2507 (step S2603). The wireless communication unit 2506 transitions to a process of receiving video data shown in step S2604 when there is video data, and issues a video data reception completion notification, which indicates that there is no video data transmitted from the video reception terminal 2003 to the video transmission terminal 2002, to the terminal control unit 2501 when there is no video data.

Upon determining that there is video data in step S2603, the wireless communication unit 2506 receives the video data by way of the antenna 2507, and issues a video data reception completion notification, which indicates that the storage of the video data has been completed, to the terminal control unit 2501 after storing the video data in the storage unit 2504 (step S2604). Upon receiving the video data reception completion notification issued in step S2604, the terminal control unit 2501 controls the display unit 2502 to display a video based on the video data stored in the storage unit 2504 (step S2605).

When the video display is completed in step S2605, the terminal control unit 2501 issues a number-of-frames calculation command, which is a command for causing the number of buffered frames to be calculated, to the number-of-frames calculation unit 2505. Upon receiving the number-of-frames calculation command, the number-of-frames calculation unit 2505 compares the number of currently displayed frames to the total number of frames of received video data, and issues a number-of-frames calculation completion notification to the terminal control unit 2501 after calculating the number of buffered frames and storing the calculated number of buffered frames in the storage unit 2504. The number of buffered frames, for example, is calculated by subtracting the number of currently displayed frames from the total number of frames of the received video data.

Upon receiving the number-of-frames calculation completion notification, the terminal control unit 2501 controls the wireless communication unit 2506 to transmit number-of-buffered-frames information including at least information about the number of buffered frames stored in the storage unit 2504 to the video transmission terminal 2002 by way of the wireless communication unit 2506 and the antenna 2507 (step S2606).

Upon receiving the video data reception completion notification issued in step S2603 or upon completing the transmission of number-of-buffered-frames information in step S2606, the terminal control unit 2501 determines whether a dedicated video transmission path connection end command has been issued (step S2607). The terminal control unit 2501 starts a process of disconnecting the dedicated video transmission path 2005 shown in step S2608 when a dedicated video transmission path connection end command has been issued, and re-performs the process from the scanning of video data transmitted from the video transmission terminal 2002 to the video reception terminal 2003 shown in step S2603 when no dedicated video transmission path connection end command has been issued.

Although a dedicated video transmission path connection end command in the fourth embodiment is a command to be issued using the completion of reception of video data as the trigger, the dedicated video transmission path connection end command may be issued using the input of a command for disconnecting the dedicated video transmission path 2005 through the operation of the operation unit 2508 as the trigger in a state in which the connection of the dedicated video transmission path 2005 has been established. As long as an issuance condition of the dedicated video transmission path connection end command does not depart from the scope of the present invention, the issuance condition is not limited to only the reception completion of the video data.

When the dedicated video transmission path connection end command has been issued in step S2607, the terminal control unit 2501 issues a dedicated video transmission path disconnection sequence start command, which is a command for causing a process of disconnecting the dedicated video transmission path 2005 to be started, to the network connection control unit 2503. Upon receiving the dedicated video transmission path disconnection sequence start command, the network connection control unit 2503 performs a process of disconnecting the dedicated video transmission path 2005 from the video transmission terminal 2002 by way of the wireless communication unit 2506 and the antenna 2507, and starts a disconnection of the dedicated video transmission path 2005 from the video transmission terminal 2002. Upon completion the process of disconnecting the dedicated video transmission path 2005 from the video transmission terminal 2002, the network connection control unit 2503 issues a dedicated video transmission path disconnection process completion notification to the terminal control unit 2501 (step S2608).

Upon receiving the connection acceptance notification reception failure notification issued in step S2601 or upon receiving the dedicated video transmission path disconnection process completion notification issued in step S2608, the terminal control unit 2501 determines whether a video transmission process end command has been issued (step S2609). The terminal control unit 2501 ends a video reception process of the video reception terminal when the video transmission process end command has been issued, and re-performs the process from the process of determining whether the connection acceptance notification has been transmitted shown in step S2601 when no video transmission process end command has been issued.

Although the video reception process end command in the fourth embodiment is a command to be issued using the deactivation of power of the terminal through the operation of the operation unit 2508 as the trigger, the video reception process of the video reception terminal may be ended using an input of an end command of the video reception process of the video reception terminal through the operation of the operation unit 2508 as the trigger. An end condition of the video reception process of the video reception terminal is not limited to only the deactivation of power to the video reception terminal as long as the end condition does not depart from the scope of the present invention.

In addition, in the fourth embodiment, a transmission instruction is transmitted to the external terminal 2001 only when an amount of video data buffered by the video reception terminal 2003 is greater than or equal to a predetermined amount, so that communication in the dedicated non-video transmission path 2004 is limited and communication in the dedicated video transmission path 2005 is preferentially performed, but the video transmission terminal 2002 does not transmit any transmission instructions to the external terminal 2001 for a period in which the communication in the dedicated video transmission path 2005 is performed. All bands may be allocated to communication in the dedicated video transmission path 2005. All the bands may be occupied by the dedicated video transmission path 2005 as long as the bands do not depart from the scope of the present invention.

According to the fourth embodiment as described above, when data transmission is performed using the dedicated non-video transmission path 2004 between the video transmission terminal 2002 and the external terminal 2001 and video data transmission is performed using the dedicated video transmission path 2005 between the video transmission terminal 2002 and the video reception terminal 2003, the transmission instruction is transmitted to the external terminal 2001 if the amount of video data buffered by the video reception terminal 2003 (the number of buffered frames in the above-described example) is greater than or equal to the predetermined amount, and the transmission suppression instruction is transmitted to the external terminal 2001 if the amount of video data buffered by the video reception terminal 2003 is less than the predetermined amount. The external terminal 2001 transmits data upon receiving the transmission instruction, and does not transmit data upon receiving the transmission suppression instruction.

Therefore, it is possible to preferentially transmit data having a real time property in the overall wireless communication system including the video transmission terminal 2002 serving as the access point (base station).

Fifth Embodiment

Next, the fifth embodiment of the present invention will be described. The fifth embodiment is a modified example of the fourth embodiment. FIGS. 27A to 27E illustrate examples of a dedicated video transmission path priority system in which, in a wireless communication system capable of transmitting data only when a video transmission terminal 2702 has received a data transmission request from an external terminal 2701, the video transmission terminal 2702 rejects the data transmission request of the external terminal 2701 while a video is transmitted to a video reception terminal 2703 and accepts the data transmission request of the external terminal 2701 for only a transmission time necessary to transmit a video of one frame after video transmission of a predetermined number of frames has been completed, so that data transmission between the video transmission terminal 2702 and the external terminal 2701 is limited and communication between the video transmission terminal 2702 and the video reception terminal 2703 is preferentially performed.

In the examples illustrated in FIGS. 27A to 27E, communication states of respective terminals when the video transmission terminal 2702 and the video reception terminal 2703 have established a connection in the dedicated video transmission path 2705 in an environment in which the external terminal 2701 and the video transmission terminal 2702 establish a connection in the dedicated non-video transmission path 2704 by designating the video transmission terminal 2702 as the access point and designating the external terminal 2701 as the station in a network constructed by the video transmission terminal 2702 are illustrated. In the examples illustrated in FIGS. 27A to 27E, the video transmission terminal 2702 rejects the data transmission request from the external terminal 2701 until the transmission of video data of a predetermined number of frames to the video reception terminal 2703 ends, and accepts the data transmission request from the external terminal 2701 for only a transmission time necessary to transmit video data of one frame after the transmission of the video data of the predetermined number of frames to the video reception terminal 2703 has ended. Thereby, communication between the video transmission terminal 2702 and the video reception terminal 2703 has priority. That is, a probability of the video transmission terminal 2702 acquiring the right to transmit is higher than a probability of the external terminal 2701 acquiring the right to transmit. Because a sufficient amount of video data is expected to be buffered by the video reception terminal in the video reception terminal 2703 and the video transmission terminal 2702 may wait for video data to be transmitted if a sufficient amount of video data is buffered in the video reception terminal 2703, data is transmitted from the external terminal 2701 to the video transmission terminal 2702 using a waiting time.

Figure 27A:
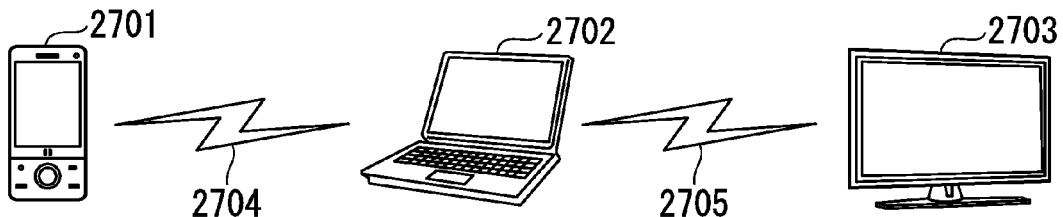
FIG. 27A is a reference diagram each illustrating a communication state in a system according to the fifth embodiment of the present invention.

FIG. 27A illustrates a state in which, in a network constructed by the video transmission terminal 2702, the external terminal 2701 and the video transmission terminal 2702 have established a connection in the dedicated non-video transmission path 2704, and the video transmission terminal 2702 and the video reception terminal 2703 have established a connection in the dedicated video transmission path 2705.

Figure 27B:
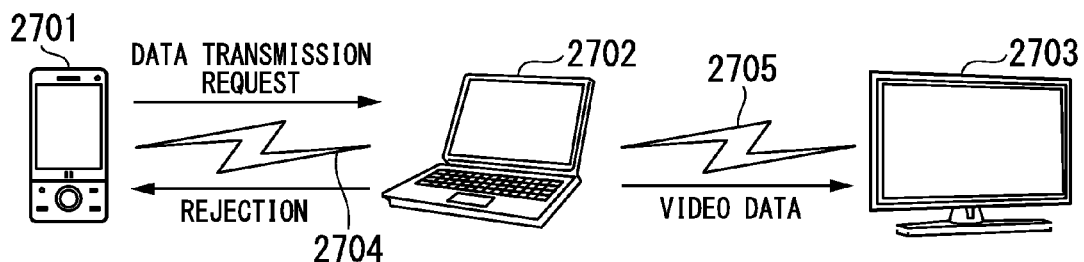
FIG. 27B is a reference diagram each illustrating a communication state in a system according to the fifth embodiment of the present invention.

FIG. 27B illustrates a state in which, in a network constructed by the video transmission terminal 2702, the external terminal 2701 and the video transmission terminal 2702 have established a connection in the dedicated non-video transmission path 2704, the video transmission terminal 2702 and the video reception terminal 2703 have established a connection in the dedicated video transmission path 2705, video data is transmitted from the video transmission terminal 2702 to the video reception terminal 2703, and the video transmission terminal 2702 rejects a data transmission request transmitted from the external terminal 2701 to the video transmission terminal 2702.

Figure 27C:
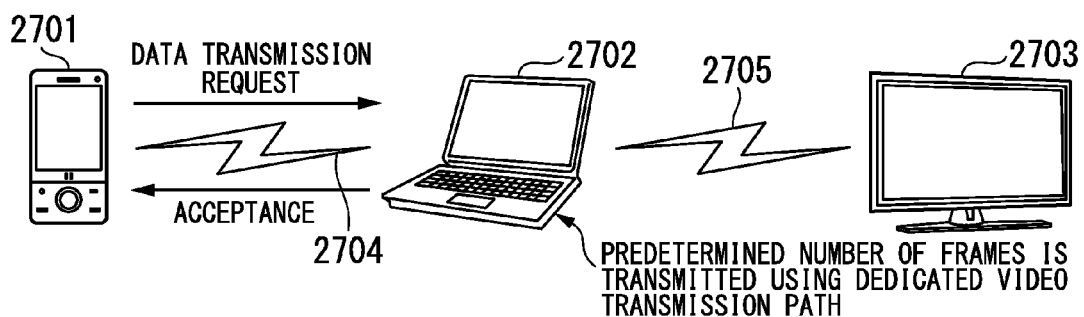
FIG. 27C is a reference diagram each illustrating a communication state in a system according to the fifth embodiment of the present invention.

FIG. 27C illustrates a state in which, in a network constructed by the video transmission terminal 2702, the external terminal 2701 and the video transmission terminal 2702 have established a connection in the dedicated non-video transmission path 2704, the video transmission terminal 2702 and the video reception terminal 2703 have established a connection in the dedicated video transmission path 2705, the video transmission terminal 2702 ends the transmission of video data of a predetermined number of frames to the video reception terminal 2703, and the video transmission terminal 2702 accepts a data transmission request transmitted from the external terminal 2701 to the video transmission terminal 2702.

Figure 27D:
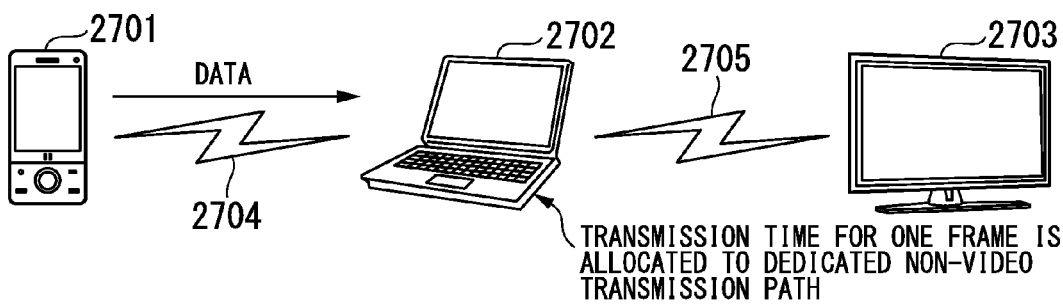
FIG. 27D is a reference diagram each illustrating a communication state in a system according to the fifth embodiment of the present invention.

FIG. 27D illustrates a state in which, in a network constructed by the video transmission terminal 2702, the external terminal 2701 and the video transmission terminal 2702 have established a connection in the dedicated non-video transmission path 2704, the video transmission terminal 2702 and the video reception terminal 2703 have established a connection in the dedicated video transmission path 2705, and the external terminal 2701 transmits data to the video transmission terminal 2702 for a transmission time allocated from the video transmission terminal 2702.

Figure 27E:
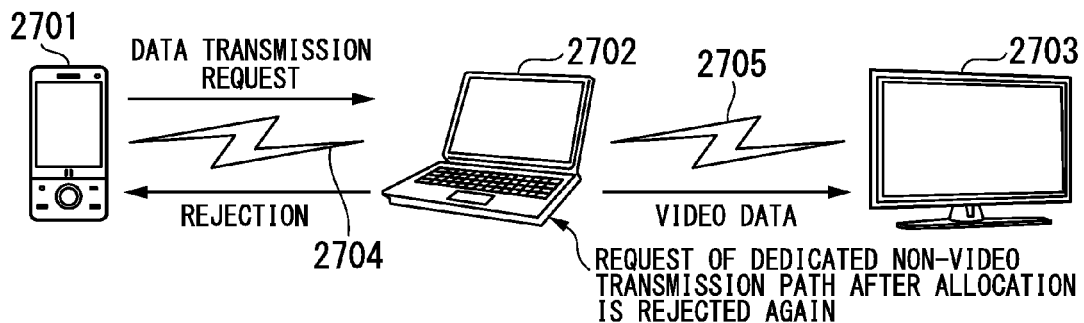
FIG. 27E is a reference diagram each illustrating a communication state in a system according to the fifth embodiment of the present invention.

FIG. 27E illustrates a state in which, in a network constructed by the video transmission terminal 2702, the external terminal 2701 and the video transmission terminal 2702 have established a connection in the dedicated non-video transmission path 2704, the video transmission terminal 2702 and the video reception terminal 2703 have established a connection in the dedicated video transmission path 2705, the video transmission terminal 2702 re-rejects the data transmission request transmitted from the external terminal 2701 to the video transmission terminal 2702 after a transmission time allocated to the external terminal 2701 has elapsed, and video data is transmitted from the video transmission terminal 2702 to the video reception terminal 2703.

Also, in the fifth embodiment, it is assumed that data transmission control by the above-described data transmission request is performed based on a technique defined by Wi-Fi Multimedia™ (WMM®)-admission control, and control of data transmission by WMM®-admission control serves as transmission control of a data link level of wireless communication.

Figure 28:
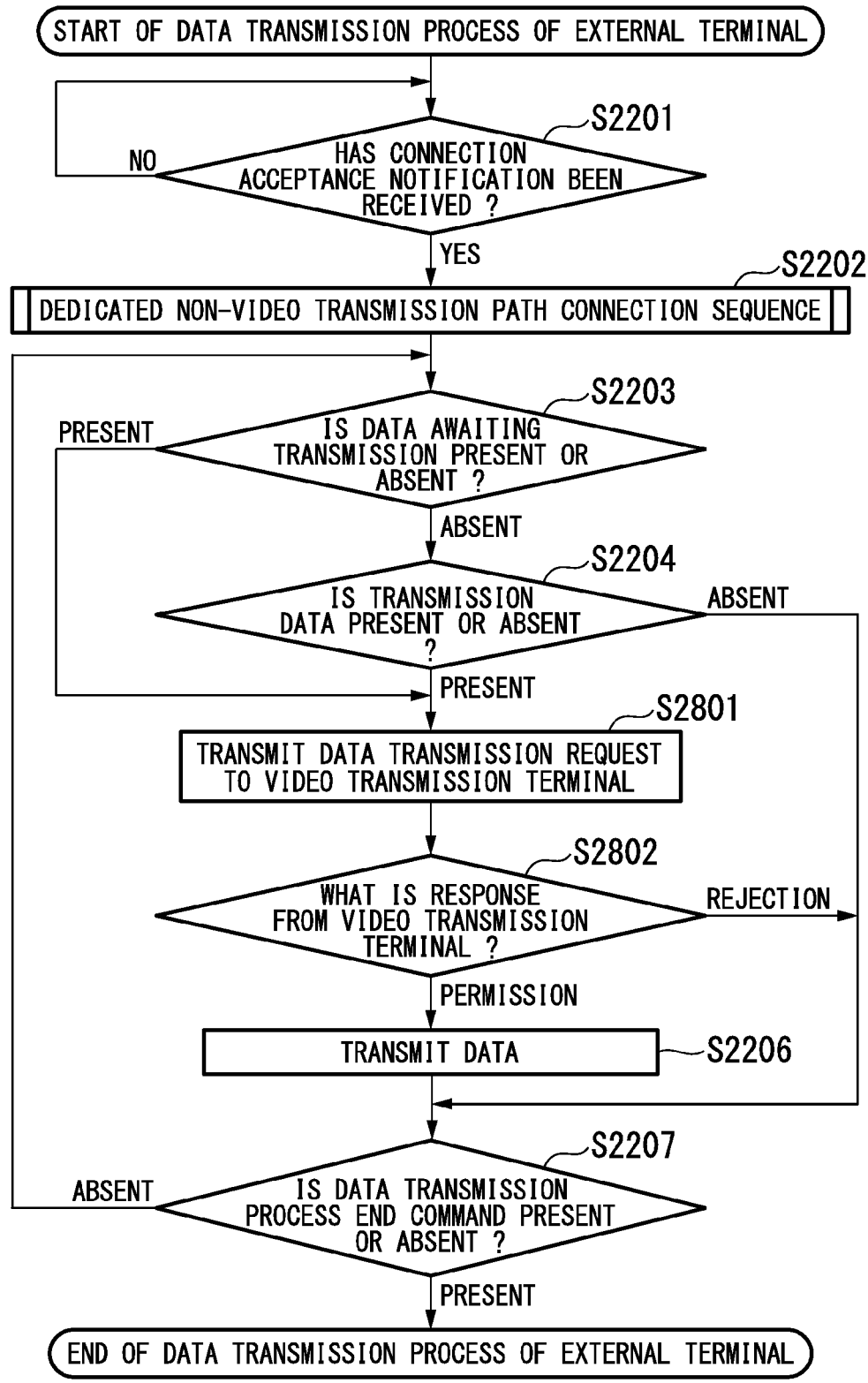
FIG. 28 is a flowchart illustrating a procedure of an operation of an external terminal in the fifth embodiment of the present invention.

FIG. 28 is an operation of the external terminal 2701. The operation of the external terminal 2701 will be described using FIG. 28.

Although part of the configuration of the external terminal 2701 in the fifth embodiment is the same as the configuration illustrated in FIG. 21, they are different in that the communication control unit 2102 transmits a data transmission request to the video transmission terminal 2702. In addition, although some of the operations of the external terminal 2701 in the fifth embodiment are the same as those described in the fourth embodiment, the operations of steps S2801 and S2802 are different from those described in the fourth embodiment. Hereinafter, the operation of each step will be described.

Step S2801 is a process of issuing a data transmission request transmission command to the communication control unit 2102 when it is determined that there is data awaiting transmission in the wireless communication unit 2105 in step S2203 or when it is determined that data to be transmitted to the video transmission terminal 2702 has been stored in the storage unit 2104 in step S2204. In step S2801, the communication control unit 2102 transmits a data transmission request to the video transmission terminal 2702 by way of the wireless communication unit 2105 and the antenna 2106 upon receiving the data transmission request transmission command (step S2801).

Upon transmitting the data transmission request, the communication control unit 2102 controls the wireless communication unit 2105 and the antenna 2106 to receive a response from the video transmission terminal 2702, and refers to content of the response from the video transmission terminal 2702 (step S2802). The communication control unit 2102 issues a data transmission completion notification indicating that the data transmission has failed to the terminal control unit 2101 when the response from the video transmission terminal 2702 indicates rejection, and transitions to a data transmission process shown in step S2206 when the response from the video transmission terminal 2702 indicates acceptance.

Figure 29:
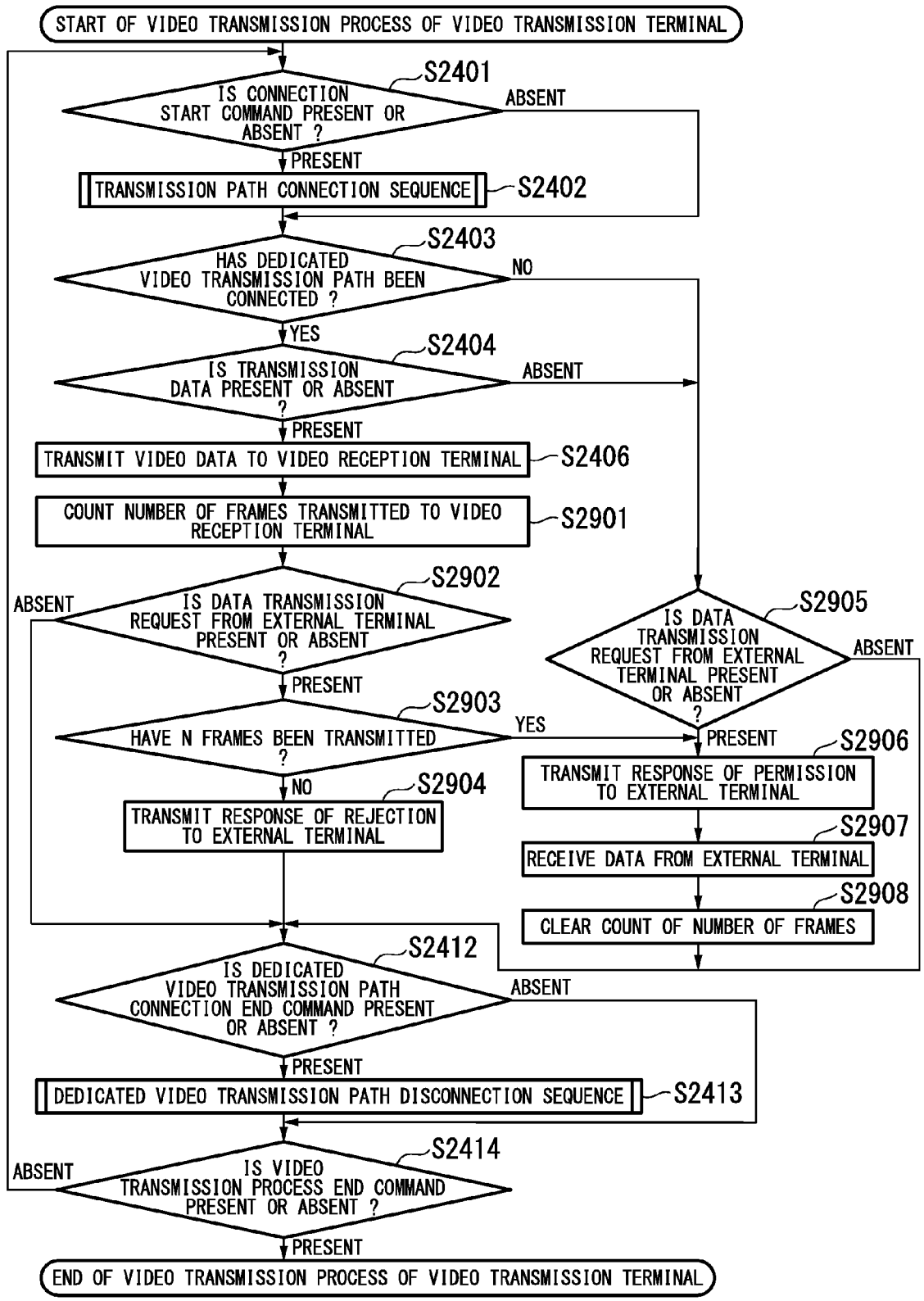
FIG. 29 is a flowchart illustrating a procedure of an operation of the video transmission terminal in the fifth embodiment of the present invention.

FIG. 29 illustrates an operation of the video transmission terminal 2702 in the fifth embodiment. The operation of the video transmission terminal 2702 will be described using FIG. 29.

Although part of the configuration of the video transmission terminal 2702 in the fifth embodiment is the same as that illustrated in FIG. 23, they are different in that the number-of-frames determination unit 2302 counts the number of frames of video data transmitted from the video transmission terminal 2702 to the video reception terminal 2703 and determines whether video data of a predetermined number of frames has been transmitted and the communication control unit 2303 controls the reception of a data transmission request transmitted from the external terminal 2701 and the transmission of a data transmission response, which is a response to the data transmission request, by controlling the wireless communication unit 2307 and the antenna 2308. Also, the number-of-frames determination unit 2302 internally holds the number of frames (a count number) of video data transmitted from the video transmission terminal 2702 to the video reception terminal 2703, and updates the held number of frames according to a count-up operation when the count-up operation has been performed.

In addition, although some operations of the video transmission terminal 2702 in the fifth embodiment of the present invention are the same as those described in the fourth embodiment, operations of steps S2901 to S2908 are different from those described in the fourth embodiment. Hereinafter, the operation of each step will be described.

Step S2901 is a process to be performed after transmission of video data to the video reception terminal 2703 of step S2406 has been completed. In step S2901, the terminal control unit 2301 controls the number-of-frames determination unit 2302 to count the number of frames of transmitted video data when the transmission of the video data to the video reception terminal 2703 is completed. The number-of-frames determination unit 2302 counts up the number of transmitted video data, and updates the internally held number of frames.

Step S2902 is a process to be performed after the operation of counting up the number of frames of the transmitted video data of step S2901 has been completed. In step S2902, the terminal control unit 2301 controls the wireless communication unit 2307 and the antenna 2308 to scan whether a data transmission request has been transmitted from the external terminal 2701. The terminal control unit 2301 performs a process of determining whether a predetermined number of frames of video data have been transmitted shown in step S2903 when the data transmission request has been transmitted, and transitions to a process of determining whether a dedicated video transmission path connection end command has been issued shown in step S2412 when no data transmission request has been transmitted.

Step S2903 is a process to be performed when it is determined that the data transmission request has been transmitted from the external terminal 2701 in step S2902. In step S2903, the terminal control unit 2301 controls the number-of-frames determination unit 2302 to determine whether a predetermined number (a predetermined natural number N in FIG. 29) of frames of video data have been transmitted to the video reception terminal 2703 when the data transmission request has been transmitted from the external terminal 2701. The terminal control unit 2301 transitions to a process of returning a response of acceptance to the data transmission request received from the external terminal 2701 shown in step S2906 when it is determined that a predetermined number of frames of video data have been transmitted, and transitions to a process of returning a response of rejection to the data transmission request received from the external terminal 2701 shown in step S2904 when it is determined that a predetermined number of frames of video data have not been transmitted (the number frames of transmitted video data is less than the predetermined number of frames).

Step S2904 is a process to be performed when it is determined that a predetermined number of frames of video data have not been transmitted in step S2903. In step S2904, the terminal control unit 2301 controls the wireless communication unit 2307 and the antenna 2308 to return a response of rejection to the data transmission request received from the external terminal 2701.

Step S2905 is a process to be performed when it is determined that the video transmission terminal 2702 has not been connected to the dedicated video transmission path in step S2430. In step S2905, the terminal control unit 2301 controls the wireless communication unit 2307 and the antenna 2308 to scan whether the data transmission request has been transmitted from the external terminal 2701. The terminal control unit 2301 transitions to a process of returning a response of acceptance to the data transmission request received from the external terminal 2701 shown in step S2906 when the data transmission request has been transmitted, and transitions to a process of determining whether a dedicated video data transmission path connection end command has been issued shown in step S2412 when no data transmission request has been transmitted.

Step S2906 is a process to be performed when it is determined that a predetermined number of frames of video data have been transmitted in step S2903 or when it is determined that the data transmission request has been transmitted from the external terminal 2701 in step S2905. In step S2906, the terminal control unit 2301 controls the wireless communication unit 2307 and the antenna 2308 to return a response of acceptance to the data transmission request received from the external terminal 2701.

Step S2907 is a process to be performed after a response of acceptance has been returned in step S2906. In step S2907, the terminal control unit 2301 controls the wireless communication unit 2307 and the antenna 2308 to receive data transmitted from the external terminal 2701 to the video transmission terminal 2702 after transmitting the response of acceptance in step S2906, and stores the received data in the storage unit 2305.

Step S2908 is a process to be performed after data has been received from the external terminal 2701 and stored in the storage unit 2305 in step S2907. In step S2908, the terminal control unit 2301 controls the number-of-frames determination unit 2302 to clear the count of the number of frames of the transmitted video data (resets the count to an initial value) after receiving data from the external terminal 2701 and storing the data in the storage unit 2305 in step S2907 (step S2908). Therefore, the number of frames internally held by the number-of-frames determination unit 2302 is cleared. Also, a value obtained by counting the number of frames of transmitted video data is set to an initial value (for example, 0) at the initiation of the operation illustrated in FIG. 29.

Figure 30:
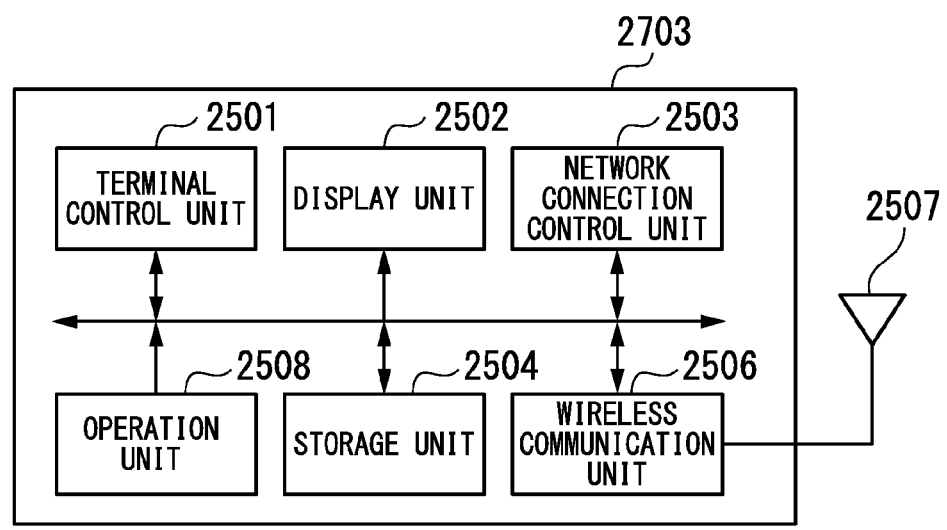
FIG. 30 is a block diagram illustrating a configuration of a video reception terminal in the fifth embodiment of the present invention.

FIG. 30 illustrates a configuration of the video reception terminal 2703. The configuration of the video reception terminal 2703 in the fifth embodiment is a configuration obtained by excluding the number-of-frames calculation unit 2505 from the configuration of the video reception terminal 2003 illustrated in FIG. 25.

Figure 31:
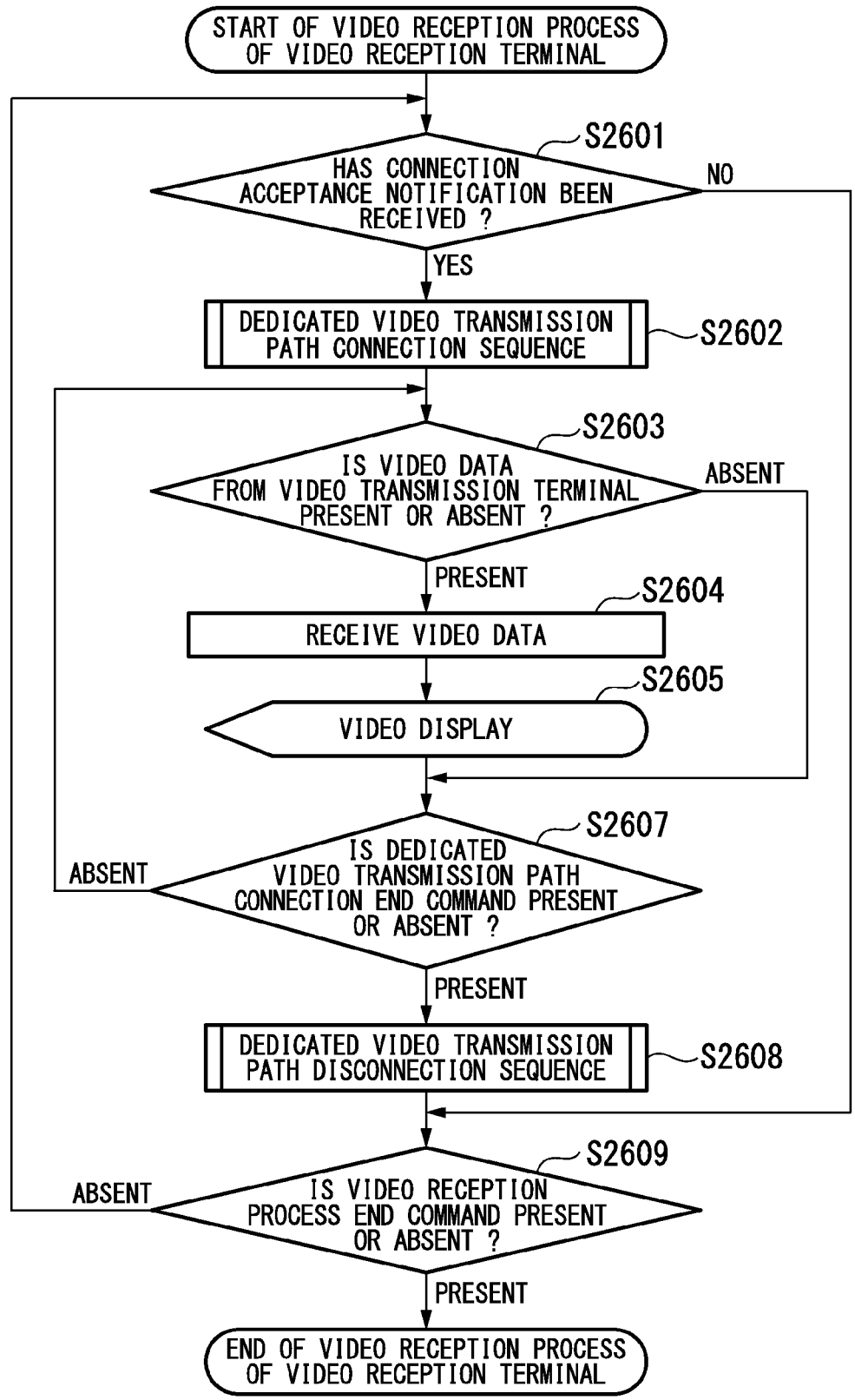
FIG. 31 is a flowchart illustrating a procedure of an operation of the video reception terminal in the fifth embodiment of the present invention.

FIG. 31 illustrates an operation of the video reception terminal 2703. An operation of the video reception terminal 2703 in the fifth embodiment serves as an operation in which a process of transmitting the number of buffered frames shown in step S2606 is not performed in the operation of the video reception terminal 2003 illustrated in FIG. 26.

In the fifth embodiment, a response for permitting data transmission is transmitted to the external terminal 2701 only when an amount of video data transmitted by the video transmission terminal 2702 is greater than or equal to a predetermined amount, so that communication in the dedicated non-video transmission path 2704 is limited and communication in the dedicated video transmission path 2705 is preferentially performed. However, the video transmission terminal 2702 may continuously transmit a response for constantly rejecting the data transmission to the external terminal 2701 for a period in which the communication in the dedicated video transmission path 2705 is performed. All bands may be allocated to communication in the dedicated video transmission path 2705. All the bands may be occupied by the dedicated video transmission path 2705 as long as the bands do not depart from the scope of the present invention.

According to the fifth embodiment as described above, when data is transmitted using the dedicated non-video transmission path 2704 between the video transmission terminal 2702 and the external terminal 2701 and video data is transmitted using the dedicated video transmission path 2705 between the video transmission terminal 2702 and the video reception terminal 2703, a response of permission for the data transmission request is transmitted to the external terminal 2001 if an amount of video data (the number of frames in the above-described example) transmitted from the video transmission terminal 2702 to the video reception terminal 2703 is greater than or equal to a predetermined amount, and a response of rejection for the data transmission request is transmitted to the external terminal 2001 if the amount of video data transmitted from the video transmission terminal 2702 to the video reception terminal 2703 is less than the predetermined amount. The external terminal 2001 transmits data upon receiving the response of the permission for the data transmission request, and does not transmit data upon receiving the response of the rejection for the data transmission request. Therefore, it is possible to preferentially transmit data having a real time property in the overall wireless communication system including the video transmission terminal 2702 serving as the access point (base station).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A wireless communication terminal comprising:
    a wireless communicator performing wireless communication of streaming data for use in streaming of content and control data for use in control of the streaming;
    a network constructor performing one of a first connection process of acquiring format information of streaming data that another wireless communication terminal supports and a second connection process in which no format information is acquired when a wireless network is constructed, a connection request from the other wireless communication terminal for the constructed wireless network is received by the wireless communicator, and a connection to the other wireless communication terminal is made; and
    a communication controller setting a communication parameter in which a probability of acquiring a right to transmit at a data link level of the wireless communication is higher in its own wireless communication terminal than in a second connection terminal in the wireless communicator or to cause control data to be transmitted from the wireless communicator to the second connection terminal, wherein the control data is used to cause the second connection terminal to set a communication parameter in which the probability is lower in the second connection terminal than in its own wireless communication terminal when the first connection process is performed by designating a first connection terminal as an object to be connected and the second connection process is performed by designating the second connection terminal as an object to be connected.

2. The wireless communication terminal according to claim 1, wherein the communication controller causes the control data including a communication parameter in which an acquisition waiting period of the right to transmit is longer in the second connection terminal than in its own wireless communication terminal to be transmitted from the wireless communicator to the second connection terminal.

3. The wireless communication terminal according to claim 2, wherein the communication parameter is a frame transmission interval or a random number value of the number of slots waiting for transmission.

4. The wireless communication terminal according to claim 1, wherein the communication controller causes the control data including a communication parameter in which an acquisition waiting period of the right to transmit is longer than an initial value to be transmitted from the wireless communicator to the second connection terminal.

5. The wireless communication terminal according to claim 1, wherein, in relation to a transmission right acquisition category including a plurality of communication parameters prescribing an acquisition waiting time of the right to transmit, the communication controller causes the control data for limiting a transmission right acquisition category in wireless communication with the second connection terminal to a transmission right acquisition category having a lower acquisition probability of the right to transmit than a transmission right acquisition category in wireless communication with the first connection terminal to be transmitted from the wireless communicator to the second connection terminal.

6. The wireless communication terminal according to claim 1, wherein, in relation to a transmission right acquisition category including a plurality of communication parameters prescribing an acquisition waiting time of the right to transmit, the communication control unit sets the plurality of communication parameters included in a transmission right acquisition category having a higher acquisition probability of the right to transmit than a transmission right acquisition category in wireless communication with the second connection terminal in the wireless communicator when wireless communication with the first connection terminal is performed.

7. The wireless communication terminal according to claim 6, further comprising:
    a generator generating a transmission right acquisition category having higher priority than a transmission right acquisition category prescribed in a communication protocol,
    wherein the communication controller sets the plurality of communication parameters included in the transmission right acquisition category generated by the generation unit in the wireless communicator.

8. The wireless communication terminal according to claim 7, wherein the generator generates a transmission right acquisition category having higher priority than a transmission right acquisition category related to voice data wherein the transmission right acquisition category is prescribed in a communication protocol.

9. The wireless communication terminal according to claim 1, wherein the communication controller causes the control data for suppressing wireless communication with the second connection terminal to be transmitted from the wireless communicator to the second connection terminal according to a transmission state of streaming data for the first connection terminal.

10. The wireless communication terminal according to claim 9, further comprising:

a determinator determining whether a buffer amount of streaming data in the first connection terminal is less than a predetermined amount,
wherein the wireless communicator further receives the control data indicating a buffer amount of streaming data from the first connection terminal, and
wherein, when the determinator determines that the buffer amount indicated by the control data received by the wireless communicator is less than the predetermined amount, the communication controller causes the control data for suppressing wireless communication with the second connection terminal to be transmitted from the wireless communicator to the second connection terminal.

11. The wireless communication terminal according to claim 9, further comprising:
a determinator determining whether the number of frames of streaming data transmitted to the first connection terminal is less than a predetermined number, wherein, when the determinator determines that the number of frames is less than the predetermined number, the communication controller causes the control data for suppressing wireless communication with the second connection terminal to be transmitted from the wireless communicator to the second connection terminal.

12. The wireless communication terminal according to claim 11, wherein the determinator holds the number of frames of streaming data transmitted to the first connection terminal, updates the held number of frames according to the number of frames of transmitted streaming data when the streaming data is transmitted to the first connection terminal, and resets the number of frames to an initial value when the number of frames reaches the predetermined number.

13. The wireless communication terminal according to claim 1, wherein, when wireless communication of streaming data by the wireless communicator for the first connection terminal has ended and when a disconnection process has been performed by causing the network construction unit to perform the disconnection process of disconnecting a connection established with the first connection terminal, the communication controller restores the communication parameter set in the wireless communicator or causes the control data for restoring the communication parameter set in the second connection terminal to be transmitted from the wireless communicator to the second connection terminal.

14. The wireless communication terminal according to claim 13, wherein, when the disconnection process has been performed, the communication controller returns the communication parameter set in the wireless communication unit to an initial value or causes the control data for returning the communication parameter set in the second connection terminal to an initial value to be transmitted from the wireless communicator to the second connection terminal.

15. The wireless communication terminal according to claim 1, further comprising:
an operation device receiving a trigger for transmitting streaming data to another terminal from a user,
wherein the network constructor performs the first connection process when the trigger has been received and the connection request has been received by the wireless communicator.

16. A wireless communication method for use in a wireless communication terminal for constructing a wireless network and performing wireless communication of streaming data for use in streaming of content and control data for use in control of the streaming, the wireless communication method comprising:
performing a first connection process of establishing a connection to a first connection terminal by acquiring format information of streaming data that the first connection terminal supports after a connection request from the first connection terminal for the wireless network has been received by a wireless communication unit;
performing a second connection process of establishing a connection to a second connection terminal without acquiring the format information after a connection request from the second connection terminal for the wireless network has been received by the wireless communication unit; and
setting a communication parameter in which a probability of acquiring a right to transmit at a data link level of the wireless communication is higher in the wireless communication terminal than in a second connection terminal in the wireless communication unit or causing control data to be transmitted from the wireless communication unit to the second connection terminal, wherein the control data is used to cause the second connection terminal to set a communication parameter in which the probability is lower in the second connection terminal than in the wireless communication terminal.

17. A computer program product, embodied on a non-transitory computer readable recording device, for causing a computer of a wireless communication terminal for constructing a wireless network and performing wireless communication of streaming data for use in streaming of content and control data for use in control of the streaming to execute:
performing a first connection process of establishing a connection to a first connection terminal by acquiring format information of streaming data that the first connection terminal supports after a connection request from the first connection terminal for the wireless network has been received by a wireless communication unit;
performing a second connection process of establishing a connection to a second connection terminal without acquiring the format information after a connection request from the second connection terminal for the wireless network has been received by the wireless communication unit; and
setting a communication parameter in which a probability of acquiring a right to transmit at a data link level of the wireless communication is higher in the wireless communication terminal than in a second connection terminal in the wireless communication unit or causing control data to be transmitted from the wireless communication unit to the second connection terminal, wherein the control data is used to cause the second connection terminal to set a communication parameter in which the probability is lower in the second connection terminal than in the wireless communication terminal.

* * * * *